US012658022B2

(12) United States Patent
Farnsworth et al.

(10) Patent No.: US 12,658,022 B2
(45) Date of Patent: Jun. 16, 2026

(54) CONTINUOUS ACTIVE MODE FOR SECURITY AND AUTOMATION SYSTEMS

(71) Applicant: Vivint, Inc., Provo, UT (US)

(72) Inventors: Anthony Scott Farnsworth, Provo, UT (US); Stephen Edward Boynton, Provo, UT (US); Julie Manzi, Provo, UT (US)

(73) Assignee: Vivint LLC, Provo, UT (US)

( * ) Notice: Subject to any disclaimer, the term of this patent is extended or adjusted under 35 U.S.C. 154(b) by 19 days.

(21) Appl. No.: 18/969,894

(22) Filed: Dec. 5, 2024

(65) Prior Publication Data

US 2025/0095477 A1 Mar. 20, 2025

Related U.S. Application Data

(63) Continuation of application No. 18/433,260, filed on Feb. 5, 2024, now Pat. No. 12,190,708, which is a continuation of application No. 17/038,144, filed on Sep. 30, 2020, now Pat. No. 11,893,875.

(51) Int. Cl.

| | |
|---|---|
| ***G08B 25/00*** | (2006.01) |
| ***G08B 13/22*** | (2006.01) |
| ***G08B 25/10*** | (2006.01) |
| ***G08C 17/02*** | (2006.01) |

(52) U.S. Cl.

CPC ........... *G08B 25/008* (2013.01); *G08B 13/22* (2013.01); *G08B 25/10* (2013.01); *G08C 17/02* (2013.01)

(58) Field of Classification Search

CPC ...... G08B 25/008; G08B 13/22; G08B 25/10; G08C 17/02

USPC .......................................................... 340/541

See application file for complete search history.

(56) References Cited

U.S. PATENT DOCUMENTS

| | | | | |
|---|---|---|---|---|
| 6,654,732 | B1 | 11/2003 | Naito et al. | |
| 6,661,343 | B1 * | 12/2003 | Rocci ..................... | G08B 13/19 340/541 |
| 6,748,343 | B2 | 6/2004 | Alexander et al. | |
| 7,193,644 | B2 | 3/2007 | Carter | |

(Continued)

OTHER PUBLICATIONS

Hossain et al., "Adaptive Interaction Support in Ambient-Aware Environments Based on Quality of Context Information" in Multimed tools Appl (2013) 67: pp. 409-432 (Year: 2013).

(Continued)

*Primary Examiner* — Naomi J Small

(74) *Attorney, Agent, or Firm* — Nolte Lackenbach Siegel; N. Alexander Nolte

(57) ABSTRACT

Methods, systems, and devices for a security and automation system are described. A security and automation device, for example, such as a control panel may be configured to support a continuous active mode for the security and automation system. The continuous active mode may be a mode in which the security and automation system is continuously providing various types of security and automation features, such as monitoring, sensing, communication, notification, among other examples. The continuous active mode may also support active switching between multiple states (e.g., an 'armed away' state, an 'armed stay' state, and a 'standby' state) of the security and automation systems. Thus, irrespective of the different states the security and automation system may be continuously active (e.g., always ON).

20 Claims, 22 Drawing Sheets

(56) References Cited

U.S. PATENT DOCUMENTS

| | | | |
|---|---|---|---|
| 7,956,739 | B2 | 6/2011 | Hong et al. |
| 8,139,095 | B2 | 3/2012 | Carter |
| 8,144,183 | B2 | 3/2012 | Carter |
| 8,144,184 | B2 | 3/2012 | Carter |
| 8,154,581 | B2 | 4/2012 | Carter |
| 8,164,614 | B2 | 4/2012 | Carter |
| 9,064,394 | B1 * | 6/2015 | Trundle ........... G08B 13/19663 |
| 9,414,030 | B2 | 8/2016 | Carter |
| 9,432,638 | B2 | 8/2016 | Carter |
| 9,485,478 | B2 | 11/2016 | Carter |
| 9,516,284 | B2 | 12/2016 | Carter |
| 9,648,290 | B2 | 5/2017 | Carter |
| 9,653,323 | B2 | 5/2017 | Chew et al. |
| 10,674,120 | B2 | 6/2020 | Carter |
| 10,986,717 | B1 | 4/2021 | Fu et al. |
| 11,195,398 | B1 | 12/2021 | Fu et al. |
| 11,581,099 | B1 | 2/2023 | Rufo et al. |
| 2002/0070859 | A1 | 6/2002 | Gutta et al. |
| 2002/0071033 | A1 * | 6/2002 | Gutta ........................ G07C 9/37 348/E7.086 |
| 2002/0086660 | A1 | 7/2002 | Sullivan et al. |
| 2003/0117280 | A1 | 6/2003 | Prehn |
| 2003/0118216 | A1 | 6/2003 | Goldberg |
| 2005/0176400 | A1 | 8/2005 | Mullet et al. |
| 2005/0281435 | A1 | 12/2005 | Aggarwal |
| 2006/0041500 | A1 | 2/2006 | Diana et al. |
| 2007/0142927 | A1 * | 6/2007 | Nelson ................... G08B 29/24 700/11 |
| 2007/0279209 | A1 * | 12/2007 | Kogan ................ B60R 25/1004 340/541 |
| 2009/0048859 | A1 | 2/2009 | McCarthy et al. |
| 2009/0299825 | A1 | 12/2009 | Olawski et al. |
| 2009/0299854 | A1 | 12/2009 | Olawski et al. |
| 2010/0082174 | A1 | 4/2010 | Weaver et al. |
| 2010/0289643 | A1 | 11/2010 | Trundle et al. |
| 2011/0054973 | A1 | 3/2011 | Deich et al. |
| 2012/0023145 | A1 | 1/2012 | Brannon et al. |
| 2012/0284777 | A1 | 11/2012 | Eugenio et al. |
| 2012/0316690 | A1 | 12/2012 | Li et al. |
| 2014/0015981 | A1 | 1/2014 | Dietl |
| 2014/0266681 | A1 | 9/2014 | Small |
| 2014/0278028 | A1 | 9/2014 | Nye et al. |
| 2014/0282048 | A1 | 9/2014 | Shapiro et al. |
| 2014/0324192 | A1 | 10/2014 | Baskaran et al. |
| 2015/0022338 | A1 * | 1/2015 | Hwang .............. G06Q 10/1093 340/501 |
| 2015/0039105 | A1 | 2/2015 | Lee et al. |
| 2015/0088329 | A1 | 3/2015 | Thiruvengada et al. |
| 2015/0108901 | A1 | 4/2015 | Greene et al. |
| 2015/0228419 | A1 | 8/2015 | Fadell et al. |
| 2016/0142407 | A1 | 5/2016 | Chun et al. |
| 2016/0261425 | A1 | 9/2016 | Horton et al. |
| 2016/0274230 | A1 | 9/2016 | Wu et al. |
| 2016/0350654 | A1 | 12/2016 | Lee et al. |
| 2017/0018167 | A1 * | 1/2017 | Dey ....................... G08B 25/14 |
| 2017/0262706 | A1 | 9/2017 | Sun et al. |
| 2018/0035901 | A1 | 2/2018 | Cronin et al. |
| 2018/0047274 | A1 | 2/2018 | Miwa |
| 2018/0114420 | A1 | 4/2018 | Siminoff et al. |
| 2018/0165933 | A1 | 6/2018 | Siminoff |
| 2018/0189913 | A1 | 7/2018 | Knopp et al. |
| 2018/0240454 | A1 | 8/2018 | Raj et al. |
| 2018/0294047 | A1 | 10/2018 | Hosseini et al. |
| 2018/0341835 | A1 | 11/2018 | Siminoff |
| 2019/0087646 | A1 | 3/2019 | Goulden et al. |
| 2019/0108404 | A1 | 4/2019 | Xu |
| 2019/0156601 | A1 | 5/2019 | Sinha et al. |
| 2019/0327448 | A1 | 10/2019 | Fu et al. |
| 2020/0180506 | A1 | 6/2020 | Nakayama et al. |
| 2020/0204684 | A1 * | 6/2020 | Hashimoto ............. G10L 17/26 |
| 2020/0358787 | A1 * | 11/2020 | Barker .................. H04L 63/123 |
| 2021/0056184 | A1 | 2/2021 | Modani et al. |
| 2022/0165036 | A1 | 5/2022 | Daley et al. |

OTHER PUBLICATIONS

Unboxing The Ring Video Dorrbell is it Worth it video.

* cited by examiner

CONTINUOUS ACTIVE MODE FOR SECURITY AND AUTOMATION SYSTEMS

CROSS-REFERENCE TO RELATED APPLICATIONS

This application is a continuation of U.S. patent application Ser. No. 18/433,260, filed Feb. 5, 2024 which is a continuation of U.S. patent application Ser. No. 17/038,144, filed Sep. 30, 2020, each of which is incorporated by reference in its entirety.

FIELD OF TECHNOLOGY

The present disclosure, for example, relates to security and automation systems, and more particularly to a continuous active mode for security and automation systems.

BACKGROUND

Security and automation systems are widely deployed (e.g., in a residential, a commercial, or an industrial setting) to provide various types of security features such as monitoring, communication, notification, and/or others. These systems may be capable of providing notifications which may notify personnel of a mode of a security and automation system (also referred to as a state of the security and automation system). The security and automation system may, in accordance with the mode, arm a residential structure, a commercial building (e.g., an office, grocery store, or retail store), or an industrial facility (e.g., manufacturing factory), among other examples. Some security and automation systems may incorporate arming and disarming of the security and automation systems based on manual inputs from personnel, which may be inconvenient. These security and automation systems are thereby inefficient and often involve unnecessary intervention by the personnel.

SUMMARY

The described techniques relate to improved methods, systems, or apparatuses that support a continuous active mode for security and automation systems. The continuous active mode may be a mode in which the security and automation system is continuously providing various types of security and automation features, such as monitoring, sensing, communication, notification, among other examples. The continuous active mode may also support active switching between multiple states (e.g., an 'armed away' state, an 'armed stay' state, and a 'standby' state) of the security and automation systems. Particular aspects of the subject matter described herein and related to the continuous active mode may be implemented to realize one or more of the following potential improvements, among others. In some examples, the described techniques may promote enhanced efficiency and reliability for monitoring and predicting activity for an environment safeguarded by the security and automation system. In other examples, the described techniques may support autonomous switching between a state (e.g., an 'armed away' state, an 'armed stay' state, and a 'standby' state) of the security and automation system with a high degree of accuracy based on an adaptive user model.

A method of a security and automation system is described. The method may include collecting user information associated with one or more users of the security and automation system or sensor information from one or more sensors of the security and automation system, or both, generating a set of data points based on the collecting, determining a pattern associated with the set of data points using a learning network, and changing a state of the security and automation system based on the determining.

An apparatus for a security and automation system is described. The apparatus may include a processor, memory coupled with the processor, and instructions stored in the memory. The instructions may be executable by the processor to cause the apparatus to collect user information associated with one or more users of the security and automation system or sensor information from one or more sensors of the security and automation system, or both, generate a set of data points based on the collecting, determine a pattern associated with the set of data points using a learning network, and change a state of the security and automation system based on the determining.

Another apparatus for a security and automation system is described. The apparatus may include means for collecting user information associated with one or more users of the security and automation system or sensor information from one or more sensors of the security and automation system, or both, generating a set of data points based on the collecting, determining a pattern associated with the set of data points using a learning network, and changing a state of the security and automation system based on the determining.

A non-transitory computer-readable medium storing code for a security and automation system is described. The code may include instructions executable by a processor to collect user information associated with one or more users of the security and automation system or sensor information from one or more sensors of the security and automation system, or both, generate a set of data points based on the collecting, determine a pattern associated with the set of data points using a learning network, and change a state of the security and automation system based on the determining.

Some examples of the method, apparatuses, and non-transitory computer-readable medium described herein may further include operations, features, means, or instructions for comparing the set of data points to an additional set of data points associated with previous collected user information associated with the one or more users of the security and automation system or previous collected sensor information from the one or more sensors of the security and automation system, or both. In some aspects, changing the state of the security and automation system may be based on the comparing.

Some examples of the method, apparatuses, and non-transitory computer-readable medium described herein may further include operations, features, means, or instructions for determining a pattern associated with the additional set of data points using the learning network. In some aspects, comparing the set of data points to an additional set of data points includes comparing the pattern associated with the set of data points and the pattern associated with the additional set of data points.

In some examples of the method, apparatuses, and non-transitory computer-readable medium described herein, collecting the user information associated with the one or more users of the security and automation system may include operations, features, means, or instructions for receiving one or more discovery signals from one or more user devices associated with the security and automation system, and determining one or more of occupancy information or user profile information based on the one or more discovery signals.

In some examples of the method, apparatuses, and non-transitory computer-readable medium described herein, the one or more discovery signals includes a Bluetooth signal, a cellular signal, a Wi-Fi signal, or a GPS signal, a radio frequency (RF) signal, a radar signal, an acoustic signal, an infrared signal, or a fluid sensing signal, or any combination thereof.

Some examples of the method, apparatuses, and non-transitory computer-readable medium described herein may further include operations, features, means, or instructions for receiving device information from the one or more user devices associated with the security and automation system, the device information including a state of the one or more user devices, a device identifier associated with each device of the one or more user devices, or both. In some aspects, determining one or more of the occupancy information or the user profile information may be based on the device information.

In some examples of the method, apparatuses, and non-transitory computer-readable medium described herein, collecting the sensor information from the one or more sensors of the security and automation system may include operations, features, means, or instructions for receiving motion information from the one or more sensors of the security and automation system, the one or more sensors including one or more of a radio frequency (RF) motion sensor, an infrared motion sensor, a radar motion sensor, an audio recognition sensor, or an ultrasonic sensor, or any combination thereof. In some aspects, the sensor information includes the motion information sensed by the one or more sensors of the security and automation system.

In some examples of the method, apparatuses, and non-transitory computer-readable medium described herein, collecting the sensor information from the one or more sensors of the security and automation system may include operations, features, means, or instructions for receiving multimedia information from the one or more sensors of the security and automation system. In some aspects, the sensor information includes the multimedia information sensed by the one or more sensors of the security and automation system, and the multimedia information includes audio or video, or both.

Some examples of the method, apparatuses, and non-transitory computer-readable medium described herein may further include operations, features, means, or instructions for tracking one or more of the set of data points or the pattern associated with the set of data points using the learning network over one or more temporal periods. In some aspects, changing the state of the security and automation system may be based on the tracking.

Some examples of the method, apparatuses, and non-transitory computer-readable medium described herein may further include operations, features, means, or instructions for determining a change in one or more of the set of data points or the pattern associated with the set of data points over the one or more temporal periods based on the tracking. In some aspects, changing the state of the security and automation system may be based on the change in one or more of the set of data points or the pattern associated with the set of data points over the one or more temporal periods.

Some examples of the method, apparatuses, and non-transitory computer-readable medium described herein may further include operations, features, means, or instructions for mapping, using the learning network, the user information associated with one or more users of the security and automation system to the sensor information from the one or more sensors of the security and automation system, generating, using the learning network, a user model associated with a user of the one more users of the security and automation system based on the mapping, the user model including a representation of user activity and user occupancy related to a premises associated with the security and automation system. In some aspects, changing the state of the security and automation system may be based on the user model.

Some examples of the method, apparatuses, and non-transitory computer-readable medium described herein may further include operations, features, means, or instructions for adaptively modifying the user model based on one or more of an additional set of data points associated with additional collected user information, a user input from the user associated with the user model, or both.

Some examples of the method, apparatuses, and non-transitory computer-readable medium described herein may further include operations, features, means, or instructions for modifying the user model based on an additional set of data points associated with additional collected user information associated with the one or more users of the security and automation system or additional collected sensor information from the one or more sensors of the security and automation system, or both. In some aspects, changing the state of the security and automation system may be based on the modified user model.

Some examples of the method, apparatuses, and non-transitory computer-readable medium described herein may further include operations, features, means, or instructions for receiving an input from the user associated with the user model, and modifying the user model based on the received input from the user. In some aspects, changing the state of the security and automation system may be based on the modified user model.

Some examples of the method, apparatuses, and non-transitory computer-readable medium described herein may further include operations, features, means, or instructions for outputting a representation including one or more of an indication of changing the state of the security and automation system or a request message to confirm changing the state of the security and automation system. In some aspects, changing the state of the security and automation system may be based on the outputting.

Some examples of the method, apparatuses, and non-transitory computer-readable medium described herein may further include operations, features, means, or instructions for automatically changing the state of the security and automation system based on an absence of receiving a response message within a temporal period.

In some examples of the method, apparatuses, and non-transitory computer-readable medium described herein, changing the state of the security and automation system may include operations, features, means, or instructions for arming the security and automation system or disarming the security and automation system.

Some examples of the method, apparatuses, and non-transitory computer-readable medium described herein may further include operations, features, means, or instructions for managing a database including the set of data points associated with the user information associated with one or more users of the security and automation system or the sensor information from one or more sensors of the security and automation system, or both, managing in the database the pattern associated with the set of data points, authenticating the one or more users of the security and automation system based on the database. In some aspects, the database includes a user directory. In some aspects, changing the state of the security and automation system may be based on the authenticating.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein-including their organization and method of operation-together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components-including those having a dash and a second reference label-apply to other similar components. If only the first reference label is used in the specification, the description is applicable to any one of the similar components having the same first reference label irrespective of the second reference label.

DETAILED DESCRIPTION

Figure 1:
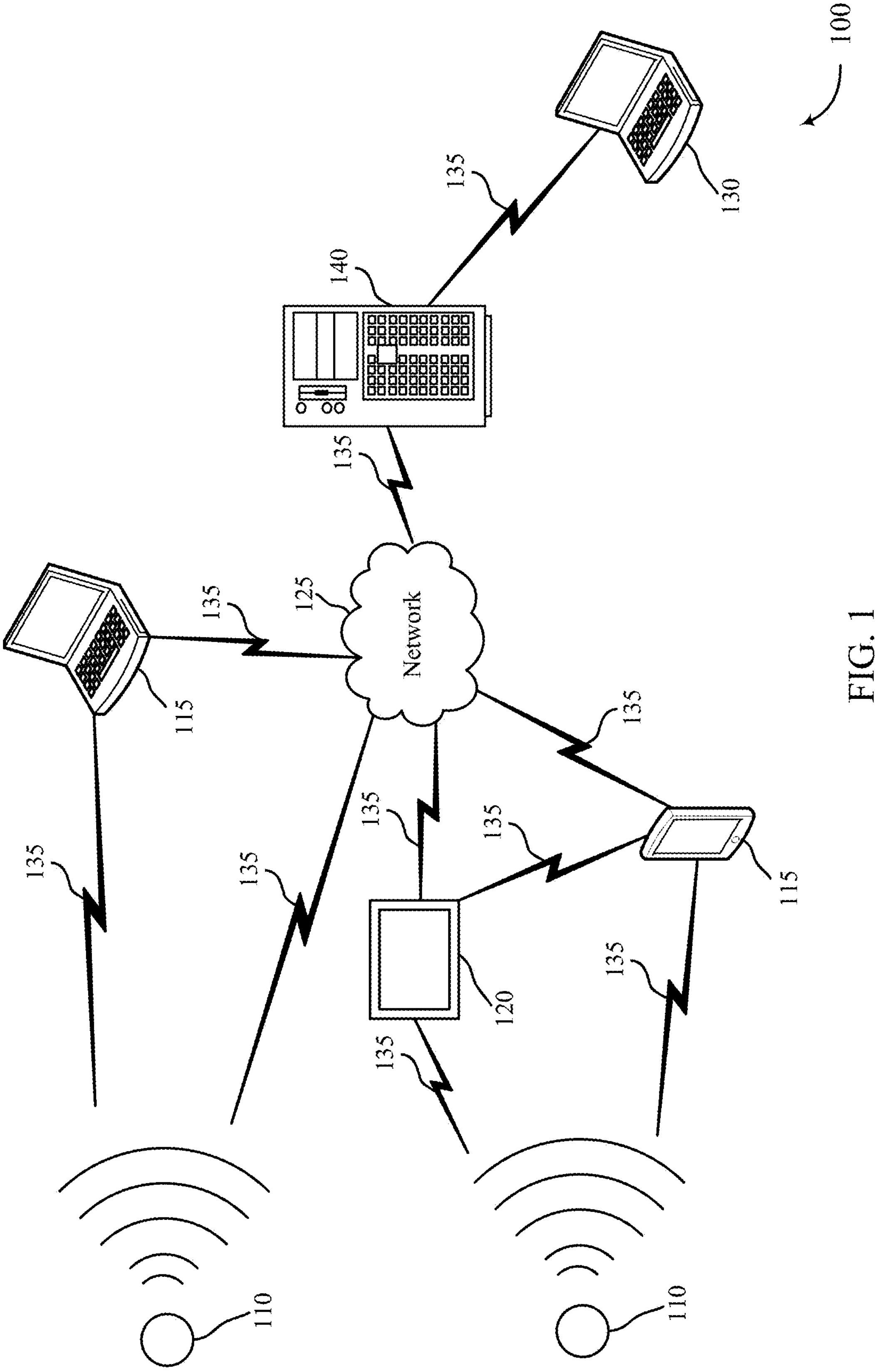
FIG. 1 illustrates an example of a system that supports a continuous active mode for security and automation systems in accordance with aspects of the present disclosure.

A security and automation system may provide various types of security and automation features such as monitoring, communication, notification, among other examples. The security and automation system may be configured to provide a notification, which may inform personnel of a mode of the security and automation system (also referred to as a state of the security and automation system). In some cases, changing a state of the security and automation system may be prone to false alarms or alarm failures and demand explicit intervention (e.g., manual inputs) by a personnel. In some cases, the personnel may unintentionally refrain from arming the security and automation system due to an operator error (e.g., neglecting to arm the security and automation system, forgetting a personal identification number (PIN) for arming the security and automation system, etc.). In some cases, the personnel may intentionally refrain from arming the security and automation system due to an inconvenience (e.g., having to manually arm or disarm, a history of false alarms by the security and automation system, etc.). Additionally, in some cases, disarming the security and automation system may involve deactivating the security and automation system (e.g., turning off the security and automation system entirely). Therefore, it may be desirable to provide a continuous active mode for a security and automation system to autonomously facilitate various types of security and automation features (e.g., access to a premises for authorized personnel and prevents access by unauthorized personnel, among other examples).

Various aspects of the described techniques relate to configuring a security and automation device, otherwise known as a control panel, and a security and automation system to support a continuous active mode for the security and automation system. The continuous active mode may be a mode in which the security and automation system is continuously providing various types of security and automation features, such as monitoring, sensing, communication, notification, among other examples. The continuous active mode may support multiple states (e.g., an 'armed away' state, an 'armed stay' state, and a 'standby' state) of the security and automation systems. The continuous active mode may also support active switching between the multiple states. In some examples, arming a security and automation system according to the continuous active mode described herein may include setting the security and automation system to the 'armed away' state or the 'armed stay' state. In some examples, disarming the security and automation system according to the continuous active mode described herein may include setting the security and automation system to the 'standby' state. Therefore, irrespective of the different states the security and automation system may be continuously active (e.g., always ON).

The control panel of the security and automation system may monitor and scan a number of devices (e.g., sensors, sensor devices, user devices) in a smart environment. In some examples, the control panel may monitor and scan for a number of discovery signals (also referred to as beacon signals) from the number of devices in the smart environment. The smart environment may be, for example, a residential structure, a commercial building (e.g., an office, grocery store, or retail store), or an industrial facility (e.g., manufacturing factory), among others. The control panel may be in communication with a combination of sensing devices and user devices to monitor a parameter of the security and automation system in association with the smart environment. The parameter may include a presence (e.g., an occupancy state) or activity related to personnel associated with the smart environment. In some examples, the parameter may include activity related to a premises protected by the smart environment.

The control panel may automatically arm or disarm the security and automation system (e.g., set the security and automation system to the 'armed away' state, the 'armed stay' state, or the 'standby' state) without intervention by personnel (e.g., users), for example, based on information collected from the sensing devices and user devices. For example, the control panel may determine (e.g., detect) whether the premises protected by the security and automation system is empty or occupied based on monitoring a combination of physical sensors of the security and automation system and discovery signals from user devices associated (e.g., registered) with the security and automation system. The control panel may automatically arm or disarm a system (e.g., set the security and automation system to the 'armed away' state, the 'armed stay' state, or the 'standby' state) without intervention by personnel, for example, based on the determination.

The control panel may collect user information associated with the users of the security and automation system, for example, via received discovery signals from the user devices associated with the security and automation system. In some aspects, the control panel may collect sensor information from the physical sensors of the security and automation system. The control panel may generate a set of data points based on the collected user information, the collected sensor information, or both. In some examples, the control panel may determine a pattern associated with the data points, for example, by using a learning network. The control panel (e.g., using the learning network) may track real-time data associated with the physical sensors and discovery signals and performing a statistical analysis, using the real-time data and historical data. The control panel may change a state of the security and automation system based on the determined pattern.

The control panel may generate and adaptively modify a user model for personnel associated (e.g., registered) with the security and automation system. For example, the control panel may map collected user information to the sensor information and generate a user model based on the mapping. The user model may include, for example, a representation of user activity and user occupancy related to the premises protected by the security and automation system. The control panel may apply machine learning techniques to generate the user model. The control panel may change the state of the security and automation system (e.g., arm or disarm the security and automation system) based on the user model. In some aspects, the control panel may adaptively modify the user model based on additional data points associated with additionally collected user information (e.g., based on additional discovery signals) or additionally collected sensor information. In some examples, the control panel may adaptively modify the user model based on a user input from the user associated with the user model (e.g., a user input confirming or rejecting an automated change of state of the security and automation system by the control panel).

Particular aspects of the subject matter described herein and related to the continuous active mode may be implemented to realize one or more of the following potential improvements, among others. In some examples, the described techniques may promote enhanced efficiency and reliability for monitoring and predicting activity for an environment safeguarded by the security and automation system. In other examples, the described techniques may support autonomous switching between a state (e.g., an 'armed away' state, an 'armed stay' state, and a 'standby' state) of the security and automation system with a high degree of accuracy based on an adaptive user model.

FIG. 1 illustrates an example of a system 100 that supports a continuous active mode for security and automation systems in accordance with aspects of the present disclosure. The system 100 may be a security and automation system. The system 100 may include sensor devices 110, local computing devices 115, a network 125, a server 140, a control panel 120, and a remote computing device 130. Sensor devices 110 may communicate via wired or wireless communication links 135 with one or more of the local computing devices 115 or the network 125. The network 125 may communicate via wired or wireless communication links 135 with the control panel 120 and the remote computing device 130 via server 140. In some aspects, the network 125 may be integrated with any one of the local computing devices 115, server 140, or remote computing device 130, for example, as a single component. The network 125 may include multiple local computing devices 115, control panels 120, or remote computing devices 130.

The local computing devices 115 and remote computing device 130 may be custom computing entities configured to interact with sensor devices 110 via network 125, and in some aspects, via server 140. In some examples, the local computing devices 115 and remote computing device 130 may be general purpose computing entities such as a personal computing device, for example, a desktop computer, a laptop computer, a netbook, a tablet personal computer (PC), a control panel, an indicator panel, a multi-site dashboard, an iPod®, an iPad®, a smartphone, a smart display, a mobile phone, a personal digital assistant (PDA), and/or any other suitable device operable to send and receive signals, store and retrieve data, and/or execute modules.

Control panel 120 may be a display panel of a smart home automation system, for example, an interactive display panel mounted on at a location (e.g., a wall) in a smart home. Control panel 120 may receive data via the sensor devices 110, the local computing devices 115, the remote computing device 130, the server 140, and the network 125. Control panel 120 may be in direct communication with the sensor devices 110 (e.g., via wired or wireless communication links 135) or in indirect communication with the sensor devices 110 (e.g., via local computing devices 115 or network 125). Control panel 120 may be in direct communication with the local computing devices 115 (e.g., via wired or wireless communication links 135, for example, via Bluetooth® communications) or in indirect communication with the local computing devices 115 (e.g., via network 125). Control panel 120 may be in indirect communication with the server 140 and the remote computing device 130 (e.g., via network 125).

In some aspects, the control panel 120 may receive sensor data (e.g., sensor information) from the sensor devices 110.

The sensor devices 110 may include physical sensors such as, for example, an RF motion sensor, an infrared motion sensor (e.g., a passive infrared motion sensor), a radar motion sensor, an audio recognition sensor, an ultrasonic sensor (e.g., echolocation), a camera device, or the like. The sensor data (e.g., sensor information) may include, for example, motion information (e.g., motion detection information), multimedia information (e.g., video, audio), presence information detected by the sensor devices 110, or a combination thereof. The sensor data may include a set of data points associated with the motion information, the multimedia information, the presence information, or a combination thereof.

The sensor devices 110 may conduct periodic or ongoing automatic measurements related to a continuous active mode for security and automation systems. Each sensor device 110 may be capable of providing multiple types of data. In some aspects, separate sensor devices 110 may respectively provide different types of data. For example, a sensor device 110 (e.g., an RF motion sensor) may detect motion and provide motion information, while another sensor device 110 (e.g., a camera device) (or, in some aspects, the same sensor device 110) may detect and capture audio signals and provide multimedia information (e.g., audio signals).

In some aspects, the control panel 120 may receive discovery signals from the local computing devices 115. The discovery signals may include a Bluetooth® signal, a cellular signal, a Wi-Fi signal, a global positioning system (GPS) signal, a radio frequency (RF) signal, a radar signal, an acoustic signal, an infrared signal, a fluid sensing signal, or the like. In some other aspects, the control panel 120 may receive sensor data as described herein from the local computing devices 115. For example, the local computing devices 115 may include or be integrated with one or more physical sensors as described herein, such as an RF motion sensor, an infrared motion sensor (e.g., a passive infrared motion sensor), a radar motion sensor, an audio recognition sensor, an ultrasonic sensor (e.g., echolocation), a camera device, or the like.

The control panel 120 and the local computing devices 115 may each include memory, a processor, an output, a data input and a communication module. The processor may be a general purpose processor, a Field Programmable Gate Array (FPGA), an Application Specific Integrated Circuit (ASIC), a Digital Signal Processor (DSP), and/or the like. The processor may be configured to retrieve data from and/or write data to the memory. The memory may be, for example, a random access memory (RAM), a memory buffer, a hard drive, a database, an erasable programmable read only memory (EPROM), an electrically erasable programmable read only memory (EEPROM), a read only memory (ROM), a flash memory, a hard disk, a floppy disk, cloud storage, and/or so forth. In some aspects, the local computing devices 115 may each include one or more hardware-based modules (e.g., DSP, FPGA, ASIC) and/or software-based modules (e.g., a module of computer code stored at the memory and executed at the processor, a set of processor-readable instructions that may be stored at the memory and executed at the processor) associated with executing an application, such as, for example, receiving, displaying, or modifying data from the sensor devices 110 (e.g., sensor data) or data from the control panel 145 (e.g., a state of the security and automation system, settings associated with the security and automation system, data points associated with the security and automation system, user models associated with users of the security and automation system, or the like).

The processor of a local computing device 115 may be operable to control operation of an output (e.g., an output component) of the local computing device 115. The output component may include a television, a liquid crystal display (LCD) monitor, a cathode ray tube (CRT) monitor, speaker, tactile output device, and/or the like. In some cases, the output component may be integrated with the local computing device 115. Similarly stated, the output component may be directly coupled to the processor. For example, the output component may be a display (e.g., a display component) of a tablet and/or smart phone. In some cases, an output module may include, for example, a High Definition Multimedia Interface™ (HDMI) connector, a Video Graphics Array (VGA) connector, a Universal Serial Bus™ (USB) connector, a tip, ring, sleeve (TRS) connector, and/or any other suitable connector operable to couple the local computing device 115 to the output component.

The remote computing device 130 may be a computing entity operable to enable remote personnel to monitor the output of the sensor devices 110. The remote computing device 130 may be functionally and/or structurally similar to the local computing devices 115 and may be operable to receive data streams from and/or send signals to at least one of the sensor devices 110 via the network 125. The network 125 may be the Internet, an intranet, a personal area network, a local area network (LAN), a wide area network (WAN), a virtual network, a telecommunications network implemented as a wired network and/or wireless network, etc. The remote computing device 130 may receive and/or send signals over the network 125 via wireless communication links 135 and server 140.

Data gathered by the sensor devices 110 may be communicated to the local computing devices 115, for example, via data transmissions supported by a personal area network (e.g., Bluetooth® communications, IR communications), a local area network, or a wide area network. The local computing devices 115 may be, in some examples, a thermostat or other wall-mounted input/output smart home display. In other examples, the local computing devices 115 may include a personal computer or smart phone. The local computing devices 115 may each include and execute a dedicated application directed to collecting sensor data from the sensors 110 (or from a sensor integrated with the local computing device 115). The local computing device 115 may communicate the sensor data to the control panel 120, and the control panel 120 may arm or disarm the security and automation system (e.g., set the security an automation system to an 'armed away' state, an 'armed stay' state, or a 'standby' state) based on the sensor data. In some aspects, the local computing devices 115 or the control panel 120 (separately or in combination) may process the sensor data and generate user models associated with a continuous active mode for security and automation systems. In some examples, the remote computing device 130 may include and execute a dedicated application directed to collecting sensor data from the sensors 110 via the network 125 and the server 140 (or from a sensor integrated with the remote computing device 130). The remote computing device 130 may process the sensor data and generate user models associated with a continuous active mode for security and automation systems.

In some cases, the local computing devices 115 may communicate with remote computing device 130 or control panel 120 via network 125 and server 140. Examples of network 125 include cloud networks, LAN, WAN, virtual private networks (VPN), wireless networks (e.g., Institute of Electrical and Electronics Engineers (IEEE) 802.11 (Wi-Fi), for example), and/or cellular networks (e.g., using third generation (3G) systems, fourth generation (4G) systems such as Long Term Evolution (LTE) systems, LTE-Advanced (LTE-A) systems, or LTE-A Pro systems, or fifth generation (5G) systems which may be referred to as New Radio (NR) systems), etc. In some configurations, the network 125 may include the Internet. In some examples, personnel may access functions of the local computing devices 115 from remote computing device 130. For example, in some aspects, remote computing device 130 may include a mobile application that interfaces with one or more functions of local computing device 115.

The server 140 may be configured to communicate with the sensor devices 110, the local computing devices 115, the remote computing device 130, and control panel 120. The server 140 may perform additional processing on signals received from the sensor devices 110 or local computing devices 115, or may forward the received information to the remote computing device 130 and control panel 120.

Server 140 may be a computing device operable to receive data streams (e.g., from sensor devices 110, the local computing devices 115, and/or remote computing device 130), store and/or process data, and/or transmit data and/or data summaries (e.g., to remote computing device 130). For example, server 140 may receive a first stream of sensor data from a first sensor device 110, a second stream of sensor data from the first sensor device 110 or a second sensor device 110, and a third stream of sensor data from the first sensor device 110 or third sensor device 110. In some aspects, server 140 may "pull" the data streams (e.g., by querying the sensor devices 110, the local computing devices 115, and/or the control panel 120). In some cases, the data streams may be "pushed" from the sensor devices 110 and/or the local computing devices 115 to the server 140. For example, a device (e.g., the sensor devices 110 and/or the local computing devices 115) may be configured to transmit data as the data is generated by or entered into the device. In some instances, the sensor devices 110 and/or the local computing devices 115 may periodically transmit data (e.g., as a block of data or as one or more data points).

The server 140 may include a database (e.g., in memory) containing sensor data received from the sensor devices 110 and/or the local computing devices 115. Additionally, as described in further detail herein, software (e.g., stored in memory) may be executed on a processor of the server 140. Such software (executed on the processor) may be operable to cause the server 140 to monitor, process, summarize, present, and/or send a signal associated with resource usage data.

The system 100 may include a machine learning component. The machine learning component may include a machine learning network (e.g., a neural network, a deep neural network, a cascade neural network, a convolutional neural network, a cascaded convolutional neural network, a trained neural network, etc.). The machine learning network may include or refer to a set of instructions and/or hardware (e.g., modeled loosely after the human brain) designed to recognize patterns. In some examples, the machine learning network may interpret sensory data through a kind of machine perception, labeling or clustering raw input. In some examples, the machine learning component may perform learning-based pattern recognition of content (e.g., user information, sensor information) and changing a state of the system 100 supportive of a continuous active mode for security and automation systems according to the techniques described herein. In some examples, the machine learning component may be implemented in a central processing unit (CPU), or the like, in the control panel 120. For example, the machine learning component may be implemented by aspects of a processor of the control panel 120, for example, such as processor 1020 described in FIG. 10. In some examples, the machine learning component may be implemented in a CPU, or the like, in the local computing devices 115, the remote computing device 130, or the server 140.

A machine learning network may be a neural network (e.g., a deep neural network) including one or more layers (e.g., neural network layers, convolution layers). In some examples, the machine learning network may receive one or more input signals at an input layer or a first layer and provide output signals via an output layer or a last layer. The machine learning network may process the one or more input signals, for example, utilizing one or more intermediate layers (e.g., one or more intermediate hidden layers). In some examples, each of the layers of the machine learning network may include one or more nodes (e.g., one or more neurons) arranged therein and may provide one or more functions.

The machine learning network may also include connections (e.g., edges, paths) between the one or more nodes included in adjacent layers. Each of the connections may have an associated weight (e.g., a weighting factor, a weighting coefficient). The weights, for example, may be assignable by the machine learning network. In some examples, the local computing devices 115, the control panel 120, the remote computing device 130, or the server 140 may train and implement the machine learning network at various processing stages to provide improvements related to a continuous active mode for security and automation systems in accordance with aspects of the present disclosure.

The control panel 120 (or the local computing devices 115, the remote computing device 130, or the server 140) may implement the machine learning component for learning-based pattern recognition of content (e.g., user information, sensor information) and changing a state of the system 100 supportive of a continuous active mode for security and automation systems. In some examples, the control panel 120 (or the local computing devices 115, the remote computing device 130, or the server 140) may implement the machine learning component for learning-based pattern recognition of content (e.g., user information, sensor information) and changing a state of the system 100 supportive of a continuous active mode for security and automation systems. In some examples, the machine learning component may include training models (e.g., learning models). The control panel 120 (or the local computing devices 115, the remote computing device 130, or the server 140) may train the machine learning component (e.g., train the training models), for example, based on data points associated with collected user information (e.g., discovery signals), collected sensor information (e.g., motion information, multimedia information), and user inputs from personnel associated (e.g., registered) with the system 100. The training models may include, for example, user models for users associated (e.g., registered) with the system 100.

The data points (and patterns associated with the data points) may be used by the control panel 120 (or the local computing devices 115, the remote computing device 130, or the server 140) for training learning models (e.g., user models) included in the machine learning component. In some aspects, the data points (and patterns associated with the data points) may be stored on a database stored on the local computing devices 115, the remote computing device 130, or the server 140. In some examples, the control panel 120 and the local computing devices 115 (or the remote computing device 130, or the server 140) may apply the learning models for providing a continuous active mode for security and automation systems associated with the system 100. The techniques described herein for a continuous active mode for security and automation systems using the learning models may support autonomous or semi-autonomous functions related to, for example, changing a state of the system 100 (e.g., arming or disarming the system) based on user information and sensor information. Thereby, a continuous active mode for security and automation systems for changing the state of the system 100 may be established with a high-degree of accuracy.

According to examples of aspects described herein, the control panel 120 may collect user information associated with users of the system 100. For example, the control panel 120 may receive discovery signals from user devices (e.g., local computing devices 115, remote computing device 130) associated with the system 100. The discovery signals may include a Bluetooth signal, a cellular signal, a Wi-Fi signal, a GPS signal, an RF signal, a radar signal, an acoustic signal, an infrared signal, or a fluid sensing signal, or any combination thereof. In some aspects, the control panel 120 may receive device information from the user devices. The device information may include a state of the user devices, a device identifier associated with each of the user devices, or both. The control panel 120 may determine occupancy information for a premises associated with (e.g., protected by) the system 100 based on the discovery signals, the device information, or both. In some aspects, the control panel 120 may determine user profile information for users associated (e.g., registered) with the system 100 based on the discovery signals, the device information, or both.

The control panel 120 may collect sensor information from sensor devices 110 of the system 100. The sensor information may include, for example, motion information (e.g., motion detection information), multimedia information (e.g., video, audio), or a combination thereof. The control panel 120 may generate a set of data points based on the user information, the sensor information, or both. In some examples, the control panel 120 may determine a pattern associated with the set of data points by using a learning network. The pattern or the data points may indicate activity patterns of personnel associated (e.g., registered) with the system 100.

The control panel 120 may track the set of data points or the pattern associated with the set of data points using the learning network over one or more temporal periods. The control panel 120 (e.g., using the learning network) may determine a change in the set of data points or the pattern associated with the set of data points over the one or more temporal periods. For example, the control panel 120 may compare a set of data points associated with the collected user information (or the pattern associated with the set of data points) to an additional set of data points associated with previous collected user information (or a pattern associated with the additional set of data points). In some aspects, the control panel 120 may compare a set of data points associated with the collected sensor information (or the pattern associated with the set of data points) to an additional set of data points associated with previous collected sensor information (or a pattern associated with the additional set of data points). In some aspects, the control panel 120 may manage a database including sets of data points (and patterns associated with the sets of data points) associated with users of the system 100. The control panel 120 may authenticate users associated (e.g., registered) with the system 100 based on the database (e.g., a user directory included in the database).

The control panel 120 may change a state of the system 100 (e.g., arm or disarm the system 100) based on the pattern associated with the data points. For example, the control panel 120 may change a state of the system 100 based on tracking the data points over the one or more temporal periods. In an example, the control panel 120 may change a state of the system 100 based on the change in the set of data points (or the pattern associated with the set of data points) over the one or more temporal periods (e.g., based on the collected user information, the previously collected user information, the collected sensor information, or the previous collected sensor information). In some aspects, the control panel 120, the local computing device 115, or the remote computing device 130 may output a representation including an indication of changing the state of the system 100, a request message to confirm changing the state of the system 100, or both. The control panel 120 may automatically change the state of the system 100 based on an absence of receiving a response message within a temporal period.

In some aspects, the control panel 120 may generate and adaptively modify a user model for personnel associated (e.g., registered) with the system 100. For example, the control panel 120 may map the user information to the sensor information and generate a user model based on the mapping. The user model may include, for example, a representation of user activity and user occupancy related to the premises associated with (e.g., protected by) the system. The control panel 120 may change the state of the system 100 (e.g., arm or disarm the system 100) based on the user model.

The control panel 120 may adaptively modify the user model based on additional data points associated with additionally collected user information (e.g., based on additional discovery signals from the local computing device 115 or the remote computing device 130) or additionally collected sensor information (e.g., from the sensors 110, the local computing device 115, or the remote computing device 130). In some examples, the control panel 120 may adaptively modify the user model based on a user input from the user associated with the user model (e.g., a user input via the local computing device 115, the remote computing device 130, or the control panel 120, confirming or rejecting an automated change of state of the system 100 by the control panel 120).

Benefits of the system 100 include a continuous active mode for security and automation systems for intelligently monitoring and predicting activity for a premises protected by the system 100. The control panel 120 in communication with the sensor devices 110, the local computing device 115, and/or the remote computing device 130 may intelligently monitor and predict activity for a premises protected by the system 100. The control panel 120, separately or in communication with the sensor devices 110, the local computing device 115, and/or the remote computing device 130, may generate and adaptively modify a user model for personnel associated (e.g., registered) with the system 100. The control panel 120 may autonomously change a state of the system 100 with a high degree of accuracy based on an adaptively modified user model.

Figure 2A:
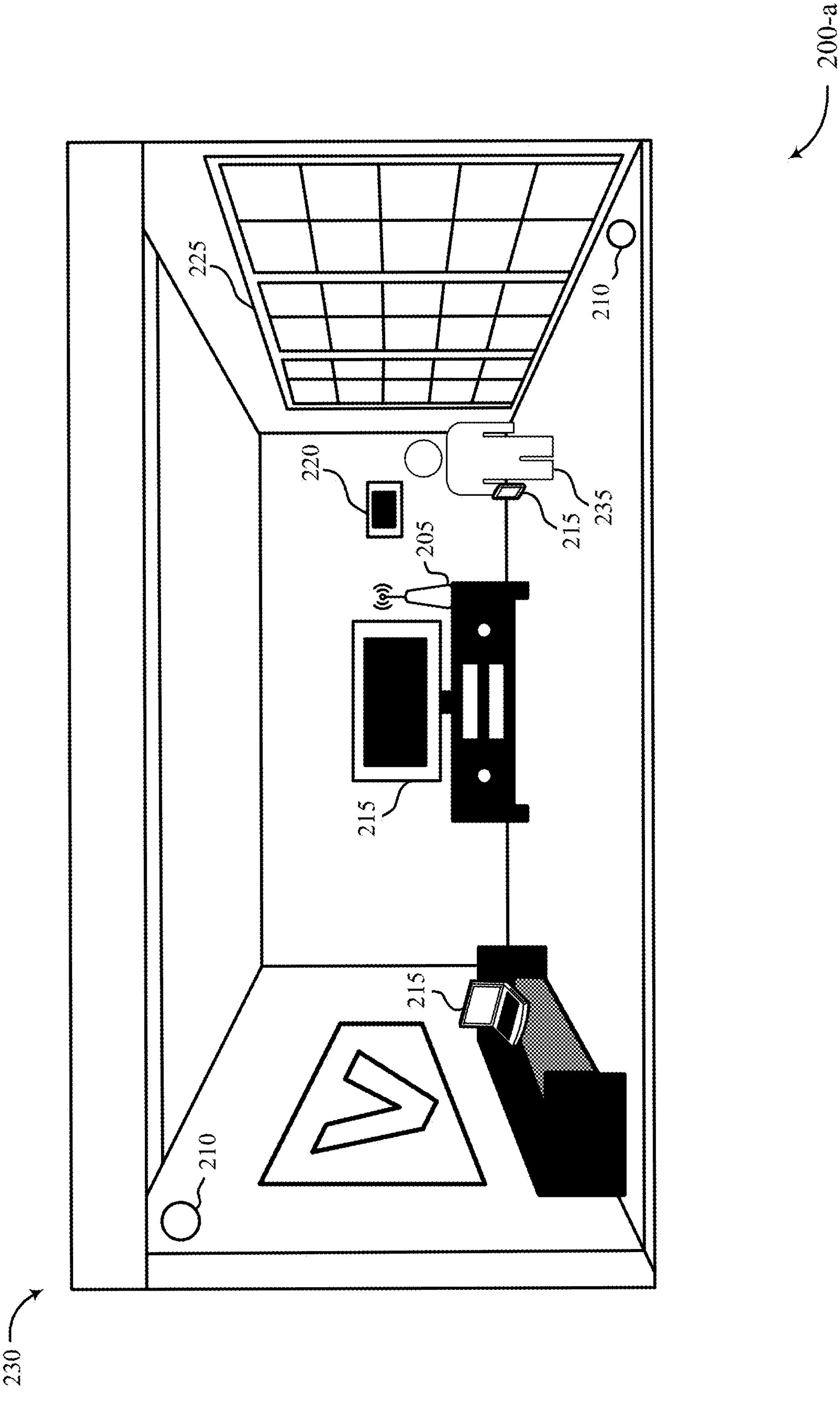
FIGS. 2A and 2B illustrate example diagrams relating to an example security and automation environment that supports a continuous active mode for security and automation systems in accordance with aspects of the present disclosure.

FIG. 2A illustrates an example diagram relating to an example security and automation environment 200-*a* that supports a continuous active mode for security and automation systems techniques in accordance with aspects of the present disclosure. In some examples, the security and automation environment 200-*a* may implement aspects of the system 100. The security and automation environment 200-*a* may include a control panel 220, a network access point 205, sensor devices 210, local computing devices 215, and access points 225. The network access point 205 may be, for example, an 802.11 (Wi-Fi) access point, an IEEE 802.16 (WiMAX) access point, a ZigBee protocol access point, or the like. The access points 225 may include windows or doors of a smart room 230. The sensor devices 210 may be installed, mounted, or integrated with one or more of the access points 225, or alternatively with an interior and/or an exterior surface (e.g., walls, floors) of the smart room 230. The sensor devices 210 may implement aspects of the sensor devices 110 described with reference to FIG. 1. The sensor devices 210, local computing devices 215, and control panel 220 may implement aspects of the sensor devices 110, local computing devices 115, and control panel 120 described with reference to FIG. 1, respectively.

The control panel 220 may be located within the smart room 230. The control panel 220, the sensor devices 210, and the local computing devices 215 may communicate according to a radio access technology (RAT) such as 5G New Radio (NR) RAT, Long Term Evolution (LTE), Institute of Electrical and Electronics Engineers (IEEE) 802.11 (Wi-Fi), IEEE 802.16 (WiMAX), NFC, ZigBee protocol, Bluetooth, among others. In some aspects, the control panel 220 may directly communicate and receive data (e.g., near-filed communication (NFC), Bluetooth) from the sensor devices 210 or the local computing devices 215. In some aspects, the control panel 220 may indirectly communicate and receive data (e.g., via the network access point 205, via NR rat, LTE, ZigBee protocol, or the like) from the sensor devices 210 or the local computing devices 215. The control panel 220 may communicate and receive data periodically, continuously, or on demand from the sensor devices 210 or the local computing devices 215.

In an example, a first sensor device 210 (e.g., a motion sensor) may be installed and mounted on a wall of the smart room 230, and second sensor device 210 (e.g., a vibration sensor) may be installed, mounted, or integrated with a floor of the smart room 230. Additionally or alternatively, a third sensor device 210 (e.g., a motion sensor) may be installed or integrated with a light fixture in the smart room 230. In some examples, the control panel 220 may communicate and receive data periodically or continuously from the sensor devices 210. The control panel 220, the sensor devices 210 may communicate according to a RAT.

In some examples, the sensor devices 210 may include an RF motion sensor, an infrared motion sensor (e.g., a passive infrared motion sensor), a radar motion sensor, an audio recognition sensor, an ultrasonic sensor (e.g., echolocation), a camera device, a pressure sensor (e.g., a weight sensor), or the like. In some examples, the sensor devices 210 may include a temperature sensor or a vibration sensor, among others. In some other examples, the sensor devices 210 may include a flow meter sensor (e.g. a water flow sensor, a gas flow sensor). The sensor devices 210 may represent separate sensors or a combination of two or more sensors in a single sensor device. In some aspects, the sensor devices 210 may be integrated with a home appliance (e.g., a refrigerator) or a fixture such as a light bulb fixture.

Each sensor device 210 may be capable of sensing multiple parameters associated with the interior of the smart room 230 (e.g., an access point 225, motion information or presence information associated with the interior of the smart room 230). The sensor devices 210 may include any combination of a motion sensor (e.g., an RF motion sensor, an infrared motion sensor (e.g., a passive infrared motion sensor), a radar motion sensor), an ultrasonic sensor (e.g., echolocation), a thermal camera device, an audio recognition sensor (e.g., a microphone), a camera device, a temperature sensor, a vibration sensor, flow meter sensor, or the like. In some aspects, based on information detected or determined by the sensor devices 210, the control panel 120 may detect conditions within the interior of the smart room 230. For example, the control panel 120 may determine (e.g., detect) the presence (e.g., via motion sensing or thermal imaging) or identifying characteristics (e.g., via audio recognition, facial recognition, or the like) of personnel within the smart room 230 (e.g., personnel entering or exiting from the smart room 230).

The sensor devices 210 may timestamp sensor data associated with the smart room 230. In some aspects, the sensor data may also include metadata. For example, the metadata may correlate the sensor data with a sensor device 210. The sensor devices 210 may transmit the sensor data associated with the smart room 230 (e.g., motion information or presence information associated with the interior of the smart room 230, access points 225) to the control panel 220.

The local computing devices 215 may include, for example, a smart display, a smart television, or the like. In some examples, the local computing devices 215 may include a smartwatch, a smartphone, a laptop computer, or the like which may be worn, operated, or carried by a user 235. The local computing devices 215 may implement aspects of the local computing devices 115 described with reference to FIG. 1. The local computing devices 215 may be integrated with a camera device.

In some aspects, the access point 205, the sensor devices 210, or the local computing devices 215 (and remote computing devices 130) may be registered with the security and automation environment 200-*a*. For example, the access point 205, the sensor devices 210, or the local computing devices 215 (and the remote computing devices 130 may be registered with the security and automation environment 200-*a* via an executable application associated with the security and automation environment 200-*a* (e.g., an application accessible via the control panel 220 or an application installed on the local computing devices 215).

The sensor devices 210 may be registered with the control panel 220. As part of configuring the sensor devices 210 with the control panel 220, each sensor device 210 may establish a connection with the control panel 220. For example, each sensor device 210 may (e.g., during initialization) broadcast a beacon signal to the control panel 220. Additionally, the control panel 220 may broadcast a beacon signal to indicate its presence to the sensor devices 210. The beacon signal may include configuration information for the sensor devices 210 to configure and synchronize with the control panel 220. In some cases, the beacon signal broadcasted from each sensor device 210 may include registration information. The registration information may include specification information and a unique identifier (e.g. serial number) identifying each sensor device 210. The specification information may include manufacturer information, specification information, or any combination thereof.

The control panel 220 may store the registration information in a local memory or remotely (e.g., in a remote database). In some cases, based on the size of the registration information, the control panel 220 may determine to save a copy of a portion of the registration information (e.g., serial number of each sensor device 210) in local memory and save the full registration information in a remote database. The local memory may be a relational database. The relational database may include a table that may have a set of data elements (e.g., sensor information). For example, the table may include a number of columns, and a number of rows. Each row may be associated with a sensor device 210, and each column may include information (e.g., sensor values, timestamps for sensor data, status indicators (e.g., a power, a failure, or a maintenance indicator)) associated with each sensor device 210. In some examples, the remote database may also be a relational database.

The sensor devices 210 may capture and transmit user identifying information (e.g., captured images or video, captured audio, or the like) or detection information (e.g. detected motion information, detected thermal information, vibration information, or the like) to the control panel 220. In some examples, the control panel 220 may communicate and receive data periodically or continuously from the network access point 205, the sensor devices 210, or the local computing devices 215. In some examples, the control panel 220 may communicate and receive data on demand from the network access point 205, the sensor devices 210, or the local computing devices 215. The control panel 220, a sensor device 210, and another sensor device 210 may communicate according to RAT.

The control panel 220 may receive the sensor data and perform post-processing. For example, the control panel 220 may analyze the sensor data to determine occupancy of the smart room 230. For example, the control panel 220 may determine the presence and activity level of users within the smart room 230. In some aspects, the control panel 220 may analyze the sensor data to determine whether to arm or disarm the security and automation system of the smart room 230 (e.g., set the security and automation system to an 'armed away' state, an 'armed stay' state, or a 'standby' state).

Figure 2B:
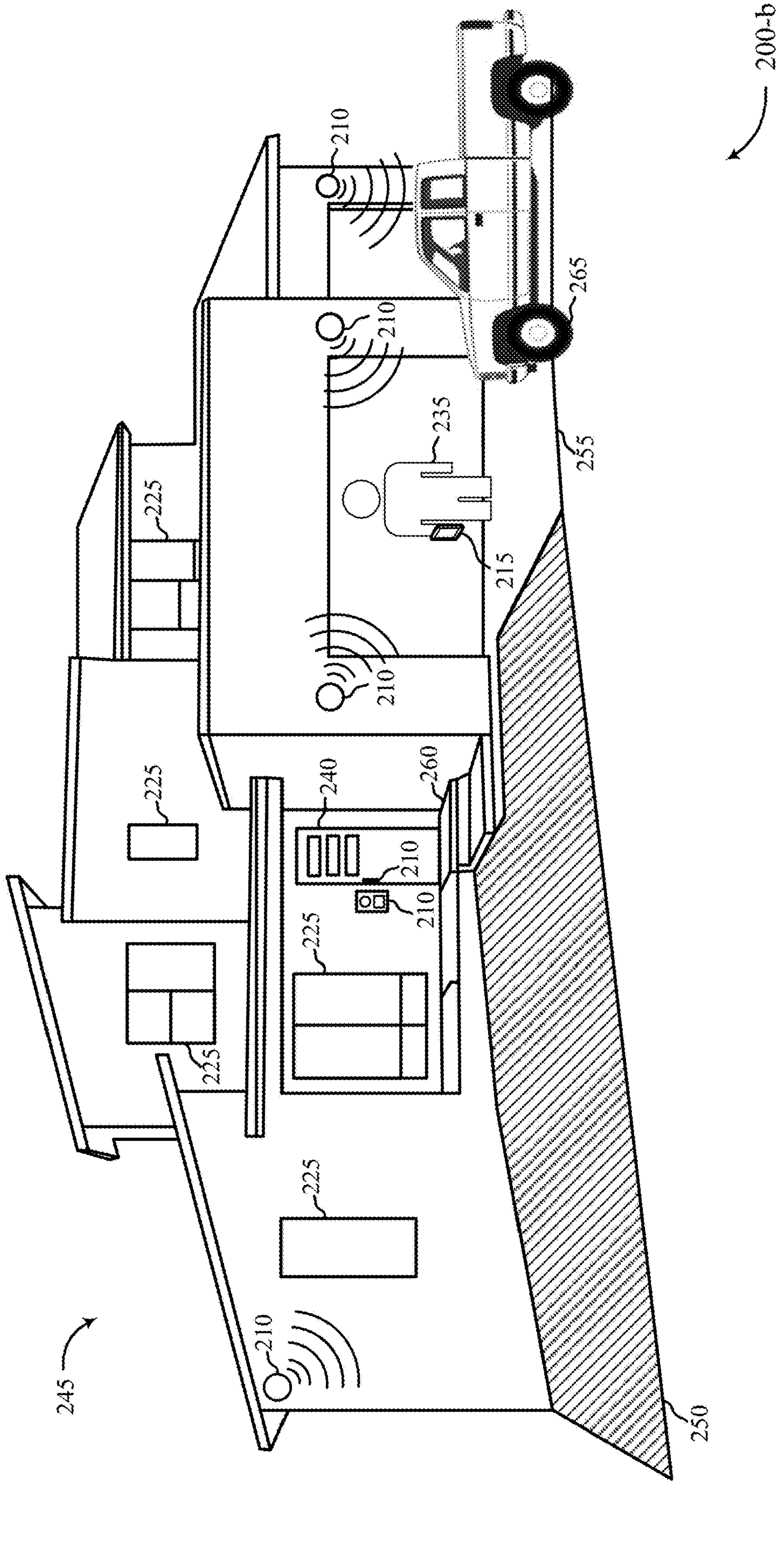

FIG. 2B illustrates an example diagram relating to an example security and automation environment 200-*b* that supports a continuous active mode for security and automation systems techniques in accordance with aspects of the present disclosure. In some examples, the security and automation environment 200-*b* may implement aspects of the system 100 and the security and automation environment 200-*a*. The security and automation environment 200-*b* may include sensor devices 210 and access points 225 and 240. For example, the access points 225 may include windows of a smart home 245, and the access points 240 may include an entrance door to the smart home 245. In some examples, an access point 240 of the smart home 245 may include a garage door. The sensor devices 210 may be installed, mounted, or integrated with one or more of the access points 225 and 240. Additionally or alternatively, the sensor devices 210 may be installed, mounted, or integrated with an interior and/or an exterior surface of the smart home 245.

The control panel 220 may be located within the smart home 245. The control panel 220 may receive data from sensor devices 210 that may be installed, mounted, or integrated with an exterior surface of the smart home 245. In some aspects, the control panel 220 may receive data from sensor devices 210 that may be installed exterior to the smart home 245 (e.g., at areas or locations surrounding the smart home 245, for example, at a perimeter of the smart home 245). The sensor devices 210 exterior the smart home 245 may be registered with the control panel 220 as described with reference to FIG. 2A.

In some examples, the sensor devices 210 may include an RF motion sensor, an infrared motion sensor (e.g., a passive infrared motion sensor), a radar motion sensor, an audio recognition sensor, an ultrasonic sensor (e.g., echolocation), a camera device, a thermal camera device, a pressure sensor (e.g., a weight sensor), or the like. The sensor devices 210 may represent separate sensors or a combination of two or more sensors in a single sensor device. For example, multiple sensor devices 210 (e.g., a camera device, an audio sensor, a motion sensor) may be integrated as a smart doorbell installed, mounted, or integrated with an exterior surface of the smart home 245. In some examples, multiple sensor devices 210 (e.g., a biometric sensor, a camera device, an audio sensor) may be integrated as a part of a smart lock installed, mounted, or integrated with an access point 225 (e.g., a door) of the smart home 245. In some examples, the sensor devices 210 may be installed at or beneath points (e.g., zones) of a driveway 255 of the smart home 245. In some examples, the sensor devices 210 may be installed at points (e.g., zones) of a lawn 250 of the smart home 245 (e.g., beneath the lawn 250).

Each sensor device 210 may be capable of sensing multiple parameters associated with the exterior of the smart home 245 (e.g., an access point 225, the lawn 250, the driveway 255, a walkway 260 in front of the smart home 245, or the like). The sensor devices 210 may include any combination of a motion sensor (e.g., an RF motion sensor, an infrared motion sensor (e.g., a passive infrared motion sensor), a radar motion sensor), an ultrasonic sensor (e.g., echolocation), a thermal camera device, an audio recognition sensor (e.g., a microphone), a camera device, or the like. In some aspects, based on information detected or determined by the sensor devices 210, the control panel 120 may detect conditions exterior the smart home 245. For example, the control panel 120 may determine (e.g., detect) the presence (e.g., via motion sensing or thermal imaging) or identifying characteristics (e.g., via audio recognition, facial recognition, or the like) of personnel or vehicle located exterior to the smart home 245 (e.g., personnel approaching or headed away from the smart home 245, a vehicle approaching or headed away from the smart home 245).

In the example of a sensor device 210 including a camera device, the camera device may be a wide-angle camera having a field-of-view which may cover a portion or the entirety of the exterior of the smart home 245. For example, a sensor device 210 including a camera device may capture images or video of areas or portions of areas around the perimeter of the smart home 245 (e.g., the front, sides, or rear of the smart home 245, the access points 225 or 240, the lawn 250, the driveway 255, the walkway 260, or the like). The camera device may also have pan/tilt or zoom capabilities.

In some examples, the sensor device 210 may be a drone with a camera device, or the sensor device 210 may be a camera device that is mounted, installed, or configured to an exterior surface of the smart home 245. In the example that the sensor device 210 is a drone with a camera device or a standalone camera device, the camera device may be configured to capture aerial snapshots of the exterior of the smart home 245 (e.g., access points 225 or 240, areas or locations surrounding the smart home 245 such as the lawn 250, the driveway 255, the walkway 260). In some examples, the camera device may be a narrow-field-of-view camera device compared to the wide-angle camera and may monitor a portion of the exterior of the smart home (e.g., a portion of the perimeter of the smart home 245).

In some cases, the smart home 245 may be a member of a smart neighborhood. The smart neighborhood may include a cluster of smart homes that may share resources amongst each other. For example, a remote database may be a local memory of a neighboring smart home. The smart home 245 may transmit sensor data to the neighboring smart home for storage. In the case that the smart neighborhood is associated with a security service, each smart home of the neighborhood may be subscribed with the security service. For example, to transmit sensor data for storing at a neighboring home, both the smart home and the neighboring home may have to be subscribed with the same security service. The security service may provide security transmission protocols to mitigate possibility of data being compromised during exchange between two or more smart homes. A security transmission protocol may be a wireless protected access (WPA), WPA2, among others. In some examples, the control panel 220 may communicate with one or more of the sensor devices 210 using the security transmission protocol.

With reference to sensor devices 210 that may be installed exterior to the smart home 245 (e.g., at or around a perimeter of the smart home 245), the lawn 250 may include a single zone or may be separated into multiple subzones, and the driveway 255 may include a single zone or may be separated into multiple subzones. The control panel 220 may automatically configure a zone or two or more subzones for the lawn 250, the driveway 255, the walkway 260, or the like based on dimensions of the lawn 250 and the driveway 255 and the number of sensor devices 210 monitoring (e.g., installed at, adjacent, or beneath) the lawn 250 and the driveway 255.

In an example, the control panel 220 may receive a snapshot (e.g., a captured image) of the lawn 250, the driveway 255, or the walkway 260. For example, a sensor device 210 (e.g., a drone) may capture an aerial snapshot (e.g., an image) of the smart home 245 including the perimeter of the smart home 245 (e.g., the lawn 250, the driveway 255, the walkway 260, or the like). In some aspects, the drone may be configured with laser scanning techniques to measure dimensions of the perimeter of the smart home 245 (e.g., the lawn 250, the driveway 255, the walkway 260, or the like). The snapshot and the measured dimensions may be transmitted to the control panel 220. For example, a sensor device 210 (e.g., the drone) may transmit the snapshot and the measured dimensions to the control panel 220 via an established connection (e.g., Wi-Fi connection).

The control panel 220 may determine to automatically assign a single zone or a number of subzones to the perimeter of the smart home 245 (e.g., the lawn 250, the driveway 255, the walkway 260, or the like) based on the measured dimensions. In some cases, the control panel 220 may also be aware of a lighting configuration of the perimeter of the smart home 245 (e.g., the lawn 250, the driveway 255, the walkway 260, or the like). For example, the control panel 220 may identify locations (e.g., positions, coordinates) of lighting sources installed at or around the perimeter of the smart home 245 (e.g., the lawn 250, the driveway 255, the walkway 260, or the like). In some aspects, the control panel 220 may control the lighting sources in combination with the continuous active mode for security and automation systems techniques.

The control panel 220 may provide a visualization of the smart home 245 including the perimeter of the smart home 245 (e.g., the lawn 250, the driveway 255, the walkway 260, or the like) via an application running on the control panel 220. To identify the perimeter of the smart home 245, the control panel 220 may perform image processing techniques on the captured snapshot. For example, the control panel 220 may load and provide for display, via a user interface of the control panel 220, the captured snapshot and identifying information (e.g., the measured dimensions) of the perimeter of the smart home 245 (e.g., the lawn 250, the driveway 255, the walkway 260, or the like). In some aspects, assigning a zone or two or more subzones may be provided manually by personnel (e.g., administrator).

In an example, the user may assign a zone or a number of subzones to the perimeter of the smart home 245 (e.g., the lawn 250, the driveway 255, the walkway 260, or the like) via an application. For example, the individual may assign at least one of the sensor devices 210 to a single zone or assign to each subzone at least one sensor device 210 using an application installed on the control panel 220, an application installed on the local computing device 215, or an application an application installed on a remote computing device 130. In some aspects, the control panel 220 may receive the assignment via a user interface or an input device (e.g., a keyboard, a mouse, a stylus, a touch display) of the control panel 220. In some cases, the control panel 220 may receive the assignment from the local computing device 215 or the remote computing device 130. The local computing device 215, or the remote computing device 130 may access the control panel 220 remotely to perform an operation (e.g., zone assignment, check a status of the smart home 245, or the lawn 250).

A sensor device 210 may be installed or inserted at or around the perimeter of the smart home 245 (e.g., at points or zones of the lawn 250, the driveway 255, the walkway 260, or the like). For example, a sensor device 210 may be inserted in the ground of the lawn 250. In some examples, a sensor device 210 may be installed on, beneath, or adjacent the driveway 255. In some examples, a sensor device 210 may be installed on, beneath, or adjacent the walkway 260. A sensor device 210 inserted at or around the perimeter of the smart home 245 may include any combination of a motion sensor (e.g., an RF motion sensor, an infrared motion sensor (e.g., a passive infrared motion sensor), a radar motion sensor), an ultrasonic sensor (e.g., echolocation), a thermal camera device, an audio recognition sensor (e.g., a microphone), a camera device, or the like. For example, a sensor device 210 inserted at or around the perimeter of the smart home 245 (e.g., at points or zones of the lawn 250, the driveway 255, the walkway 260, or the like) may be integrated with path lighting installed or inserted at or around the perimeter of the smart home 245.

The sensor devices 210 may timestamp sensor data associated with the smart home 245. In some aspects, the sensor data may also include metadata. For example, the metadata may correlate the sensor data with a sensor device 210. The sensor devices 210 may transmit the sensor data associated with the exterior of the smart home 245 (e.g., access points 225 or 240, the exterior of the smart home 245 such as the lawn 250, the driveway 255, the walkway 260) to the control panel 220.

The control panel 220 may receive the sensor data and perform post-processing. For example, the control panel 220 may analyze the sensor data to determine occupancy of the smart home 245. For example, the control panel 220 may detect and identify users entering, approaching, or exiting the smart home 245. In some aspects, the control panel 220 may analyze the sensor data to determine whether to arm or disarm the security and automation system of the smart home 245 (e.g., set the security and automation system to an 'armed away' state, an 'armed stay' state, or a 'standby' state).

Referring to FIGS. 2A and 2B, the control panel 220 may collect user information associated with users of the system 100 (e.g., the security and automation environments 200-*a* and 200-*b*). For example, the control panel 220 may receive discovery signals from user devices (e.g., local computing devices 215, remote computing device 130) associated with the system 100. In some aspects, the control panel 220 may receive device information from the user devices. The device information may include a state of the user devices, a device identifier associated with each of the user devices, or both. The control panel 220 may determine occupancy information for a premises associated with (e.g., protected by) the system 100 based on the discovery signals, the device information, or both. In some aspects, the control panel 220 may determine user profile information for users associated (e.g., registered) with the system 100 based on the discovery signals, the device information, or both.

The control panel 220 may collect sensor information from sensor devices 210 of the system 100. The sensor information may include, for example, motion information (e.g., motion detection information), multimedia information (e.g., video, audio), or a combination thereof. The control panel 220 may generate a set of data points based on the user information, the sensor information, or both. In some examples, the control panel 220 may determine a pattern associated with the set of data points by using a learning network. The pattern or the data points may indicate activity patterns of personnel associated (e.g., registered) with the system 100.

The control panel 220 may track the set of data points or the pattern associated with the set of data points using the learning network over one or more temporal periods. The control panel 220 (e.g., using the learning network) may determine a change in the set of data points or the pattern associated with the set of data points over the one or more temporal periods. For example, the control panel 220 may compare a set of data points associated with the collected user information (or the pattern associated with the set of data points) to an additional set of data points associated with previous collected user information (or a pattern associated with the additional set of data points). In some aspects, the control panel 220 may compare a set of data points associated with the collected sensor information (or the pattern associated with the set of data points) to an additional set of data points associated with previous collected sensor information (or a pattern associated with the additional set of data points). In some aspects, the control panel 220 may manage a database including sets of data points (and patterns associated with the sets of data points) associated with users of the system 100. The control panel 220 may authenticate users associated (e.g., registered) with the system 100 based on the database (e.g., a user directory included in the database).

The control panel 220 may change a state of the system 100 (e.g., arm or disarm the system 100) based on the pattern associated with the data points. For example, the control panel 220 may change a state of the system 100 based on tracking the data points over the one or more temporal periods. In an example, the control panel 220 may change a state of the system 100 based on the change in the set of data points (or the pattern associated with the set of data points) over the one or more temporal periods (e.g., based on the collected user information, the previously collected user information, the collected sensor information, or the previous collected sensor information). In some aspects, the control panel 220, the local computing device 215, or the remote computing device 130 may output a representation including an indication of changing the state of the system 100, a request message to confirm changing the state of the system 100, or both. The control panel 220 may automatically change the state of the system 100 based on an absence of receiving a response message within a temporal period.

In some aspects, the control panel 220 may generate and adaptively modify a user model for personnel associated (e.g., registered) with the system 100. For example, the control panel 220 may map the user information to the sensor information and generate a user model based on the mapping. The user model may include, for example, a representation of user activity and user occupancy related to the premises associated with (e.g., protected by) the system. The control panel 220 may change the state of the system 100 (e.g., arm or disarm the system 100) based on the user model.

The control panel 220 may adaptively modify the user model based on additional data points associated with additionally collected user information (e.g., based on additional discovery signals from the local computing device 215 or the remote computing device 130) or additionally collected sensor information (e.g., from the sensors 210, the local computing device 215, or the remote computing device 130). In some examples, the control panel 220 may adaptively modify the user model based on a user input from the user associated with the user model (e.g., a user input via the local computing device 215, the remote computing device 130, or the control panel 220, confirming or rejecting an automated change of state of the system 100 by the control panel 220).

According to examples of a continuous active mode for security and automation systems techniques described herein, the sensor devices 210 may capture and transmit user identifying information (e.g., biometric information entered via a smart lock installed at an access point 240, images, video, or audio captured by a sensor device 210 located in the smart room 230 or exterior the smart home 245, or the like) or detection information (e.g. motion information, thermal information, vibration information, or the like detected in the smart room 230 or exterior the smart home 245) to the control panel 220. The control panel 220 may receive the sensor data and perform post-processing. For example, the control panel 220 may analyze the sensor data to determine occupancy of the smart home 245 (or the smart room 230 within the smart home 245). In some aspects, the control panel 220 may analyze the sensor data to determine whether to arm or disarm the security and automation system of the smart home 245 (e.g., set the security and automation system to an 'armed away' state, an 'armed stay' state, or a 'standby' state).

In an example aspect, the control panel 220 may support smart arming of the system 100 (e.g., the security and automation environment 200-*a* and 200-*b*). For example, the control panel 220 may change the state of the system 100 (e.g., arm or disarm the system 100) based on occupancy information for the premises associated with (e.g., protected by) the system 100. In some aspects, the control panel 220 may change the state of the system 100 based on an activity level within the premises associated with the system 100. In some aspects, the control panel 220 may change the state of the system 100 with minimal or no input from personnel associated with the system 100 (e.g., a registered user, an authorized user). The control panel 220 may determine occupancy information and activity levels associated with the system 100 at a high accuracy.

In an example, the control panel 220 may scan the premises (e.g., the smart room 230, the exterior of the smart home 245) for user devices connected to the system 100. For example, the control panel 220 may scan the smart room 230 and the smart home 245 for local computing devices 215 located within a target area determined (e.g., set) by the control panel 220. The target area may correspond to features of the premises. For example, the target area may include the interior of the smart home 245 (e.g., multiple smart rooms 230) or a perimeter area (e.g., boundaries) including the smart home 245. In some aspects, the control panel 220 may set the target area using a combination of latitude, longitude, and radius values.

The control panel 220 may identify the presence of local computing devices 215 located within the target area using location-based techniques (e.g., geofencing, Bluetooth®, or the like). For example, the control panel 220 may identify the local computing devices 215 using a combination of discovery signals such as a Bluetooth® signal, a cellular signal, a Wi-Fi signal, a global positioning system (GPS) signal, a radio frequency (RF) signal, a radar signal, an acoustic signal, an infrared signal, or the like. In an example, the control panel 220 may determine the presence and identities of users within the target area based on user information associated with the local computing devices 215. In some aspects, the control panel 220 may determine an activity level of the users within the target area based on activity associated with the local computing devices 215. For example, where a local computing device 215 is a smartphone, the control panel 220 may identify whether the local computing device 215 is in use (e.g., in an unlocked state, actively running an application, actively transmitting or receiving data) or not in use (e.g., in a locked state).

The control panel 220 may determine the presence and identities of the users within the target area based on sensor information from the sensor devices 210. In some aspects, the control panel 220 may determine an activity level of the users within the target area based on the sensor information from the sensor devices 210. For example, the control panel 220 may collect motion information (e.g., motion detection information). In some examples, the control panel 220 may collect multimedia information (e.g., image information such as captured video, audio information such as captured audio). In an example, the control panel 220 may collect activity information (e.g., opening, closing) associated with access points 225 (e.g., a window) or access points 240 (e.g., a door, a garage door) via sensor devices 210 mounted or integrated with the access points 225 and access points 240. In some other examples, the control panel 220 may collect activity information (e.g., water usage) within the premises (e.g., a bathroom or kitchen of the smart home 245) via sensor devices 210 (e.g., a flow meter sensor).

The system 100 (e.g., the security and automation environment 200-*a*, the security and automation environment 200-*b*) may support a continuous active mode for security and automation systems. The continuous active mode may be a mode in which the system 100 is continuously providing various types of security and automation features, such as monitoring, sensing, communication, notification, among other examples. The continuous active mode may support multiple states of the system 100. For example, the system 100 may actively switch between the multiple states. In an example, the system 100 may include an 'armed away' state, an 'armed stay' state, and a 'standby' state).

In an example in which the system 100 is in the 'armed away' state, all sensor devices 210 inside and outside the smart home 245 may be in an active state (e.g., turned on). In an example in which the system 100 is in the 'armed stay' state, sensor devices 210 outside the smart home 245 may be in an active state (e.g., turned on), sensor devices 210 installed at access points 225 and 240 may be in an active state (e.g., turned on), and sensor devices 210 inside the smart home 245 may be in an inactive state (e.g., turned off). In an example in which the system 100 is in the 'standby' state, all sensor devices 210 inside and outside the smart home 245 may be inactive for a temporal period until the system 100 changes to the 'armed away' state or the 'armed stay' state. In some aspects, setting the system 100 to the 'armed away' state or the 'armed stay' state according to the continuous active mode may be referred to as arming the system 100. In some aspects, setting the system 100 to the 'standby' state according to the continuous active mode may be referred to as disarming the system 100. The security and automation system may remain in a continuous active mode (e.g., remain on) while switching between different security states.

In some aspects, when the system 100 is in the 'armed stay' state, the system 100 may allow authorized users to enter and exit the smart home 245 without setting off an alarm. For example, the system 100 (e.g., via the control panel 220 and sensor devices 210) may detect motion within the smart home 245 and distinguish when an access point 240 (e.g., a door) or a smart lock integrated with the access point 240 is unlocked from inside the smart home 245. In some aspects, the sensor devices 210 which are activated or deactivated for each state of the system 100 may be configured based on a user input (e.g., user preferences), for example, via the control panel 220 or a local computing device 215.

In an example, the system 100 may be in a 'standby' state, and the control panel 220 may determine that a user at the smart home 245 is in bed and sleeping. For example, the control panel may identify that the user is in the smart home 245 based on the presence of a local computing device 215 (e.g., a smartwatch) associated with the user (e.g., using geofencing, Bluetooth, or the like). The control panel 220 may collect motion information (e.g., motion detection information) from sensor devices 210 located in a smart room 230 (e.g., the user's bedroom) and determine that the user has been in bed for a duration exceeding a temporal period (e.g., one hour). The control panel 220 may collect sensor information (e.g., a heart rate) from the local computing device 215 (e.g., a smartwatch) of the user indicating that the user is sleeping (e.g., a resting heart rate of 40 to 50 beats per minute). The control panel 220 may collect multimedia information (e.g., captured audio, snoring) indicating that the user is sleeping. The control panel 220 may collect sensor information from additional local computing devices 215 (e.g., a smart television) indicating no activity (e.g., the smart television is off). In an example aspect, the control panel 220 may change the state of the system 100 (e.g., set the system 100 to 'armed stay') based on the collected information (e.g., collected user information and collected sensor information).

In some aspects, the control panel 220 may change the state of the system 100 (e.g., set the system 100 to 'armed stay') based an additional verification, for example, based on a comparison of the collected information (e.g., collected user information, collected sensor information) to historical data associated with the user. For example, the control panel 220 may generate a set of data points from the collected information and determine a pattern associated with the set of data points by using a learning network (e.g., a machine learning network). The control panel 220 may compare the set of data points (or the pattern) to an additional set of data points (or a pattern), for example, to historical data. The control panel 220 may change the state of the system 100 (e.g., set the system 100 to 'armed stay') based on the comparison. For example, the control panel 220 may determine the current time is 11:00 pm. The control panel 220 may verify from the historical data that the user typically is sleeping from 10:00 pm to 6:00 am on weekdays. Based on the verification, for example, the control panel 220 may change the state of the system 100 (e.g., set the system 100 to 'armed stay').

In another example, the system 100 may be in an 'armed stay' state, and the control panel 220 may determine that a user has exited the smart home 245. For example, the control panel 220 may collect motion information (e.g., motion detection information) from sensor devices 210 located in smart rooms 230 and determine that the user has exited the smart home 245 (e.g., no motion within the smart home 245). The control panel may identify that the user has left the smart home 245 based on a local computing device 215 (e.g., a smartwatch) associated with the user (e.g., using geofencing, Bluetooth®, or the like) and sensor devices 110 integrated with an access point 240 (e.g., sensor information from a smart door lock and a door sensor indicate that the door was opened, closed, and then locked).

In some aspects, the control panel 220 may collect motion information (e.g., motion detection information) from sensor devices 210 located exterior the smart home 245 (e.g., indicating the user exited the smart home 245). The control panel 220 may collect multimedia information (e.g., video images captured by camera devices inside and outside the smart home 245) indicating that the user exited the smart home 245 for a morning run (e.g., based on captured video images indicating that the user was wearing exercise clothing when exiting the smart home 245). The control panel 220 may collect sensor information (e.g., a heart rate) from the local computing device 215 (e.g., the smartwatch) of the user indicating that the user is exercising (e.g., an increased heart rate of 120 beats per minute). The control panel 220 may arm the system 100 (e.g., set the system 100 to 'armed away') based on the collected information (e.g., collected user information and collected sensor information). In some aspects, the control panel 220 may verify the collected information based on historical data associated with the user and, based on the verification, the control panel 220 may change the state of the system 100 (e.g., set the system 100 to 'armed away').

In an example aspect, the control panel 120 may set the system 100 from an armed state (e.g., 'armed stay') to a 'standby' state while the user is inside the smart home 245 prior to leaving the smart home 245 (e.g., the user is getting dressed). Based on detecting the user has exited the smart home 245 and that no other users are present in the smart home 245, the control panel 120 may arm the system 100 (e.g., set the system 100 to 'armed away'). In another example aspect, the control panel 120 may detect the user has exited the smart home 245 (while wearing a local computing device 215 (e.g., a smartwatch)), detect that other users (e.g., other occupants) are present in the smart home 245, and detect that another local computing device 215 (e.g., a smart phone) of the user is still present in the smart home 245. The control panel 120 may change the state of the system 100 (e.g., set the system 100 from the 'standby' state to 'armed stay').

In another example, the control panel 220 may determine that four users (e.g., two adults and two children) are in the smart home 245 on a weekend evening at 5:00 pm. The control panel 220 may determine that, at 5:30 pm, the two adults exit the smart home 245, the two children remain in the smart home 245, and a fifth user (e.g., a babysitter) arrives at the smart home 245. The control panel 220 may maintain a state of the system 100 (e.g., maintain an 'armed stay' state) based on collected information (e.g., collected user information and collected sensor information). In some aspects, the control panel 220 may verify the collected information based on historical data associated with the users and, based on the verification, the control panel 220 may maintain the state of the system 100 (e.g., maintain the 'armed stay' state).

Referring to the two adults exiting the smart home 245, the control panel 220 may collect motion information (e.g., motion detection information) from sensor devices 210 located in smart rooms 230 and determine the change in occupancy in the smart home 245 (e.g., the two adults exiting the smart home 245). The control panel 220 may identify the users exiting the smart home 245 (e.g., the two adults) based on local computing devices 215 (e.g., smartwatches, smart phones) associated with the users (e.g., using geofencing, Bluetooth®, or the like). The control panel 220 may identify a vehicle 265 carrying the users exiting the smart home 245 (e.g., using geofencing and a remote computing device 130 installed in the vehicle 265).

In an example aspect, the control panel 220 may identify changes in state of a sensor device 110 integrated with an access point 240 of the smart home 245 (e.g., sensor information from a garage door sensor indicating that the garage door was opened and then closed). The control panel 220 may collect motion information (e.g., motion detection information) from sensor devices 210 located exterior the smart home 245 (e.g., indicating the vehicle 265 exited the garage of the smart home 245). The control panel 220 may collect multimedia information (e.g., video images by captured a camera device located above a garage door) indicating that the vehicle 265 exited the driveway 255 of the smart home 245. The control panel 220 may verify the vehicle 265 based on vehicle information (e.g., a license plate, color information, vehicle type) determined by the control panel 220 from a captured video image.

Referring to the babysitter entering the smart home 245, the control panel 220 may collect motion information (e.g., motion detection information) from sensor devices 210 located in smart rooms 230 and determine the change in occupancy in the smart home 245 (e.g., the babysitter entering the smart home 245). The control panel 220 may identify the babysitter entering the smart home 245 based on local computing devices 215 (e.g., smartwatches, smart phones) associated with the user (e.g., using geofencing, Bluetooth®, or the like). The control panel 220 may identify a vehicle 265 carrying the babysitter arriving at the driveway 255 (e.g., using motion sensors installed at the driveway 255 and a camera device located above the garage door). The control panel 220 may verify the vehicle 265 carrying the babysitter based on vehicle information (e.g., a license plate, color information, vehicle type) determined by the control panel 220 from the captured video image.

In an example aspect, the control panel 220 may identify changes in state of a sensor device 110 integrated with an access point 240 of the smart home 245 (e.g., sensor information from a smart door lock and a door sensor indicate that a front door was opened, closed, and then locked). The control panel 220 may collect motion information (e.g., motion detection information) from sensor devices 210 located exterior the smart home 245 (e.g., a motion sensor integrated with a smart doorbell). The control panel 220 may collect multimedia information (e.g., video images captured by a camera device integrated with the smart doorbell) indicating that the babysitter approached the access point 240 (e.g., the front door) of the smart home 245 via the walkway 260.

In another example, the system 100 may be in an 'armed away' state, and the control panel 220 may determine that a user arrives at the smart home 245 (e.g., returns home from shopping). For example, the control panel 220 may collect motion information (e.g., motion detection information) from sensor devices 210 located in smart rooms 230 and determine a change in occupancy in the smart home 245 (e.g., the user entering the smart home 245). The control panel 220 may identify the user entering the smart home 245 based on local computing devices 215 (e.g., smartwatches, smart phones) associated with the user (e.g., using geofencing, Bluetooth, or the like). The control panel 220 may identify changes in state of a sensor device 110 integrated with an access point 240 (e.g., sensor information from a smart door lock and a door sensor indicate that a front door was opened, closed, and then locked).

In an example aspect, the control panel 220 may collect motion information (e.g., motion detection information) from sensor devices 210 located exterior the smart home 245 (e.g., a motion sensor integrated with a smart doorbell). In some examples, the control panel 220 may collect multimedia information (e.g., captured video images from a camera device integrated with the smart doorbell) indicating that the user entered the smart home 245 via the access point 240 (e.g., the front door) of the smart home 245. The control panel 220 may change the state of the system 100 from 'armed away' to 'armed stay' based on the collected information (e.g., collected user information and collected sensor information). In some examples, the control panel 220 may change the state of the system 100 from 'armed away' to 'standby' based on the collected information (e.g., collected user information and collected sensor information).

In some aspects, the control panel 220 may verify the collected information based on historical data associated with the user and, based on the verification, the control panel 220 may change the state of the system 100 to 'armed stay'. In some examples, the control panel 220 may change the state of the system 100 from 'armed away' to 'standby' based on Bluetooth disarm techniques. For example, the control panel 220 may disarm the system 100 based on detecting that the user is carrying a local computing device 215 (e.g., smart phone) associated with the user and registered with the system 100. Upon opening an access point 240 (e.g., the front door) to enter the smart home 245, the local computing device 215 may reconnect to the control panel 220 via Bluetooth.

In another example, the system 100 may be in an 'armed away' state, and the control panel 220 may identify a guest user approaching the smart home 245. The control panel 220 may collect motion information (e.g., motion detection information) from sensor devices 210 located exterior the smart home 245 (e.g., a motion sensor integrated with a smart doorbell). The control panel 220 may collect multimedia information associated with the guest user (e.g., a facial image captured by a camera device integrated with the smart doorbell, a voice input captured by an audio recognition device integrated with the smart doorbell) at the access point 240 (e.g., the front door) of the smart home 245. In some aspects, the control panel 220 may collect user information associated with the guest user (e.g., biometric information captured by a fingerprint sensor integrated with a smart lock, a security code input at a keypad integrated with the smart lock) at the access point 240 (e.g., the front door) of the smart home 245.

In some aspects, the control panel 220 may identify the guest user or provide the guest user access to the smart home 245 based on the collected multimedia information. For example, the control panel 220 may comparing the facial image, the voice input, the biometric information, the security code, or the like against a database associated with authorized guest users. The control panel 220 may change the state of the system 100 from 'armed away' to 'armed stay' based on the collected information (e.g., collected user information and collected sensor information). In some aspects, authorized users of the smart home 245 (e.g., residents of the smart home 245) may modify the database of authorized guest users or details associated with guest access (e.g., temporal periods for guest access, PIN codes, or the like).

According to some examples of a continuous active mode for security and automation systems techniques described herein, the control panel 220 may output a representation including an indication of changing the state of the system 100 (e.g., an automated change of the state by the control panel 220). The control panel 220 may output the indication via a display, a speaker, or both of the control panel 220. In some aspects, the control panel 220 may output the indication via a display, a speaker, or both of a local computing device 215. In some aspects, the control panel 220 may output the indication via a display, a speaker, or both of a remote computing device 130. In some examples, the indication may include a message (e.g., a text message, an audio message) indicating the state of the system 100 (e.g., "armed away," "armed stay," 'standby').

In an example, the control panel 220 may output a request message to confirm changing the state of the system 100 (e.g., the automated change of the state by the control panel 220). The control panel 220 may output the request message via a display, a speaker, or both of the control panel 220. In some aspects, the control panel 220 may output the request message via a display, a speaker, or both of a local computing device 215. In some aspects, the control panel 220 may output the request message via a display, a speaker, or both of a remote computing device 130.

A user may confirm or reject the change of state of the system 100 via a user input (e.g., a touch input, a voice input). The user may provide the user input via the control panel 220, the local computing device 215, or the remote computing device 130. The control panel 220 may change or maintain the state of the system 100 based on the user input. For example, the control panel 220 may change the state of the system 100 based on a user input confirming the change, or alternatively, maintain the state of the system 100 based on a user input rejecting the change. In some aspects, the control panel 220 may automatically change the state of the system 100 based on an absence of receiving a user input (e.g., a response message) within a temporal period.

According to some examples of a continuous active mode for security and automation systems techniques described herein, the control panel 220 may generate and adaptively modify a user model for personnel associated (e.g., registered) with the system 100. For example, the control panel 220 may map the user information to the sensor information collected from the sensor devices 210 and generate a user model based on the mapping. The user model may include, for example, a representation of user activity and user occupancy related to the smart home 245 associated with (e.g., protected by) the system 100. The control panel 220 may change the state of the system 100 (e.g., arm or disarm the system 100) based on the user model.

In some aspects, the control panel 220 may automatically change or maintain the state of the system 100 based on training of the user model. For example, the system 100 (e.g., a machine learning component of the system 100) may train the user model for the prediction of occupancy information for the smart home 245 according to temporal instances (e.g., according time of day, for example, based on historical data of user activity for the user model). In some examples, the system 100 (e.g., the machine learning component of the system 100) may train the user model for the prediction of occupancy information for the smart home 245 according to an event or multiple events (e.g., detecting an event or multiple events associated with a user exiting the smart home 245, such as a user putting on exercise clothing and a smartwatch in the morning). The control panel 220 may automatically change the state of the system according to the user model.

The control panel 220 may adaptively modify the user model based on additional data points associated with additionally collected user information (e.g., based on additional discovery signals from the local computing device 215 or the remote computing device 130) or additionally collected sensor information (e.g., from the sensors 210, the local computing device 215, or the remote computing device 130). In some examples, the control panel 220 may adaptively modify the user model based on user responses from the user associated with the user model. For example, the control panel 220 may adaptively modify the user model based on a user input from the user associated with the user model (e.g., a user input via the local computing device 215, the remote computing device 130, or the control panel 220, confirming or rejecting an automated change of state of the system 100 by the control panel 220). In some examples, the control panel 220 may adaptively modify the user model based on cases in which there was an absence of receiving a user input (e.g., a response message) within the temporal period of the control panel 220 outputting a request message to confirm changing the state of the system 100.

In the examples described herein, the control panel 220 may collect any combination of user information (e.g., discovery signals from any combination of local computing devices 215, occupancy information of a smart home 245 (or smart room 230) based on the discovery signals, user profile information based on the discovery signals, or the like) and sensor information (e.g., motion information, multimedia information, or the like from any combination of sensor devices 210). The control panel 220 may determine data points (e.g., a pattern of the data points) determined from the sensor information, the user information, or both. The control panel 220 may change or maintain a state of the system 100 based on the data points, additional data points (e.g., historical data), user inputs (e.g., user confirmation or rejection of a change of state of the system 100), or any combination thereof.

In an example, the control panel 220 may utilize the user information as primary information for changing or maintaining the state of the system 100 and utilize the sensor information as secondary information (e.g., secondary verification for reducing false positives). In another example, the control panel 220 may utilize the sensor information as the primary information for changing or maintaining the state of the system 100 and utilize the user information as the secondary information (e.g., secondary verification for reducing false positives). In some examples, the control panel 220 may utilize a first set of user information (e.g., a discovery signal such as a Bluetooth signal from a local computing device 215) as primary information for changing or maintaining the state of the system 100 and utilize a second set of user information (e.g., a discovery signal such as a GPS signal from the same or another local computing device 215) as secondary information. In some other examples, the control panel 220 may utilize a first set of sensor information (e.g., motion information detected by a sensor device 210) as primary information for changing or maintaining the state of the system 100 and utilize a second set of sensor information (e.g., multimedia information, for example, a facial image captured by a sensor device 210) as secondary information. The operations described herein may be performed in a different order than the example order described, or the operations may be performed in different orders or at different times. Some operations may also be omitted, and other operations may be added.

Figure 3A:
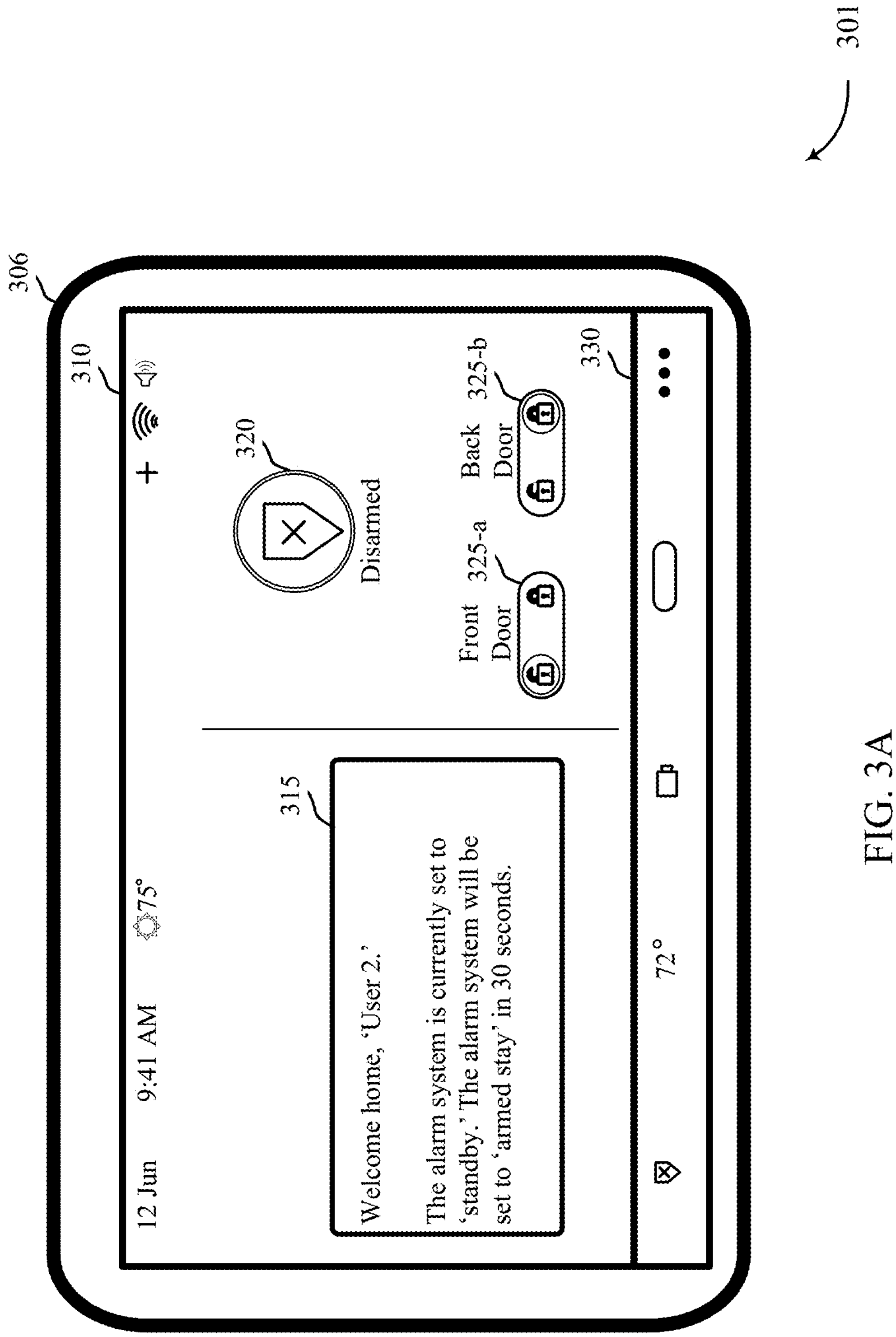
FIGS. 3A through 3F illustrate examples of process flows that support a continuous active mode for security and automation systems in accordance with aspects of the present disclosure.

FIG. 3A illustrates an example of a process flow 300 that supports a continuous active mode for security and automation systems in accordance with aspects of the present disclosure. In some examples, the process flow 300 may be implemented by a control panel 306. The control panel 306 may be the control panel 120 described with reference to FIG. 1. The control panel 306 may also be the control panel 220 described with reference to FIGS. 2A and 2B. In some examples, the process flow 300 may illustrate registering a user device using the control panel 306.

The control panel 306 may include a user interface 310. The user interface 310 may be a touch screen that may display one or more graphics, and recognize a touch input from a user, stylus, or the like. The control panel 306 may include one or more physical buttons. The user interface 310 may display a home screen including a number of visual elements associated with the user interface 310. For example, visual elements displayed at the top of the user interface 310 may include the date, time, outside temperature and weather. In some aspects, the visual elements may include a signal strength indicator for wireless communications, a volume indicator, or other visual elements associated with features of the control panel 306.

The user interface 310 may include a visual element 320 for arming or disarming the system 100 (e.g., setting the system 100 to an 'armed away' state, an 'armed stay' state, or a 'standby' state). The visual element 320 may indicate the state of the system 100. For example, the visual element 320 may indicate 'Armed' corresponding to an 'armed stay' state or an 'armed away' state. In an example, the visual element 320 may indicate 'Disarmed' corresponding to a 'standby' state. The user interface 310 may include a visual elements 325-*a* and 325-*b* for unlocking access points 240 (e.g., front and back doors) of the smart home 245. The visual elements 325-*a* and 325-*b* may indicate the states (e.g., locked or unlocked) of the access points 240.

The user interface 310 may include a menu bar 330. The user interface 310 may include a visual element for displaying the state of the system and arming or disarming the system 100 (e.g., setting the system 100 to an 'armed away' state, an 'armed stay' state, or a 'standby' state). In an example, the user interface 310 may include a visual element for displaying and adjusting the internal temperature of the smart home 245 (e.g., thermostat). In an example, the user interface 310 may include a visual element for accessing video captured by sensor devices 110 and 210 (e.g., camera devices) of the smart home 245. In an example aspect, the user interface 310 may include a visual element " . . . " for accessing settings of the control panel 306 or the system 100 (e.g., the smart home 245).

The user interface 310 may include a dialogue window 315. The control panel 306 may display a notification message via the dialogue window 315. The notification message may be, for example, a message confirming changing the state of the system 100 (e.g., the automated change of the state by the control panel 120). In some aspects, the control panel 306 may output the notification message (e.g., as an audio notification message) via a speaker of the control panel 306. In an example, the notification message may include the text, "Welcome home, 'User 2.' The alarm system is currently set to 'standby.' The alarm system will be set to 'armed stay' in 30 seconds."

The control panel 306 may register or link users, user devices (e.g., local computing devices 115, local computing devices 215, remote computing devices 130), and sensor devices (e.g., sensor devices 110, sensor devices 210) with the system 100 (e.g., with the smart home 245). Aspects of the registering the users, user devise, and sensor devices are described herein with reference to the process flow of FIG. 3B.

Figure 3B:
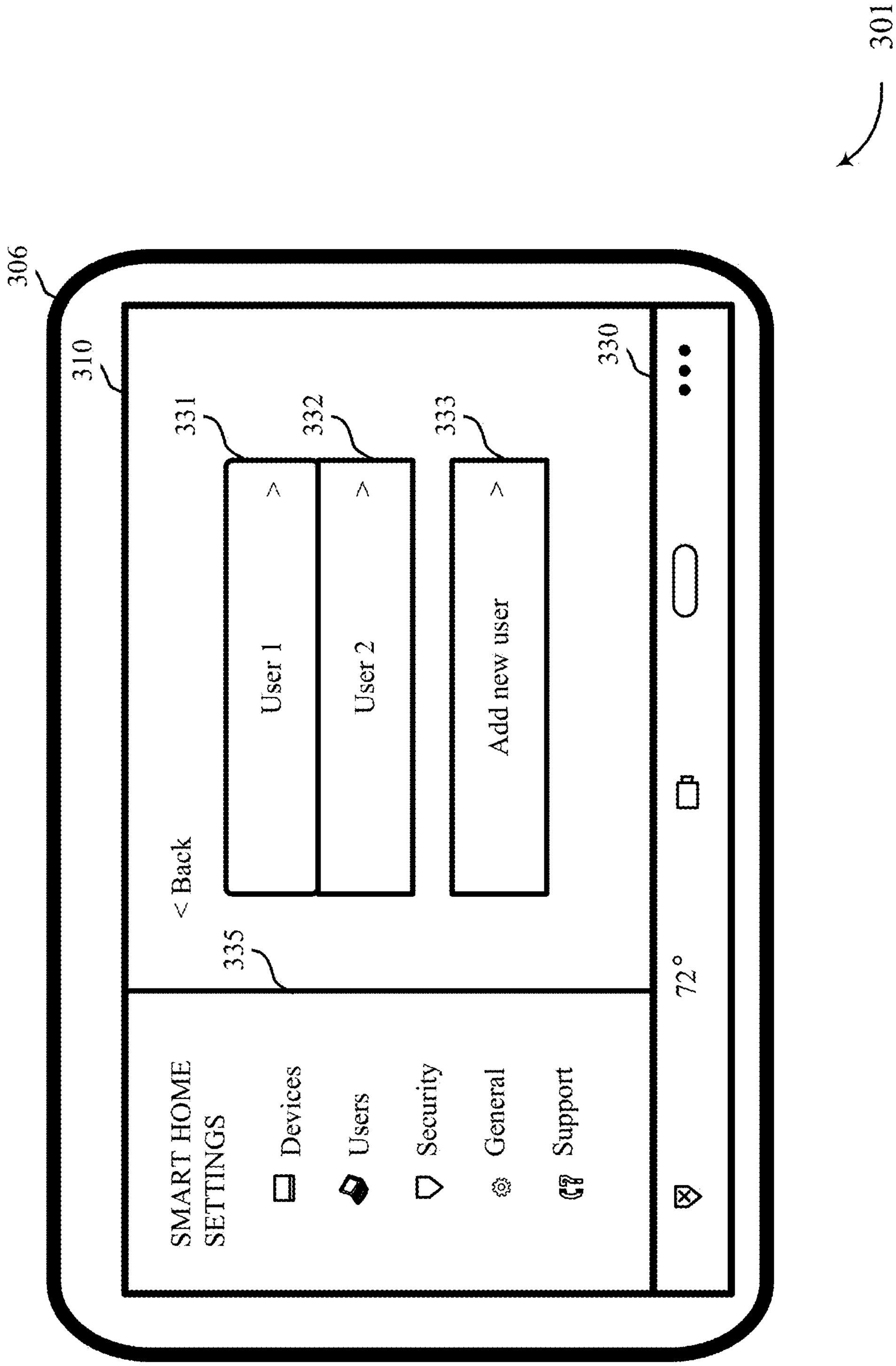

FIG. 3B illustrates an example of a process flow 301 that supports a continuous active mode for security and automation systems in accordance with aspects of the present disclosure. In some examples, the process flow 301 may be implemented by a control panel 306. The control panel 306 may be the control panel 120 described with reference to FIG. 1. The control panel 306 may also be the control panel 220 described with reference to FIGS. 2A and 2B. In some examples, the process flow 301 may illustrate registering a user device using the control panel 306.

The process flow 301 may illustrate an example of accessing settings associated with the system 100 (e.g., the smart home 245). For example, based on a user input selecting the visual element " . . . " of the menu bar 330, the control panel 306 may display a menu 335 via the user interface 310. The menu 355 may include visual elements for accessing device settings (e.g., sensor devices 110 or 210, local computing devices 115 or 215, or remote computing devices 130), user settings, security settings, general settings, and support information (e.g., user manuals, technical support) associated with the system 100. Based on a user input selecting 'Users' from the menu 335, the control panel 306 may display visual elements 331 and 332 on the user interface 310 for accessing user profiles (e.g., 'User 1,' 'User 2') of users registered with the system 100. In some aspects, the control panel 306 may display a visual element 333 (e.g., 'Add new user') for registering new users with the system 100.

Figure 3C:
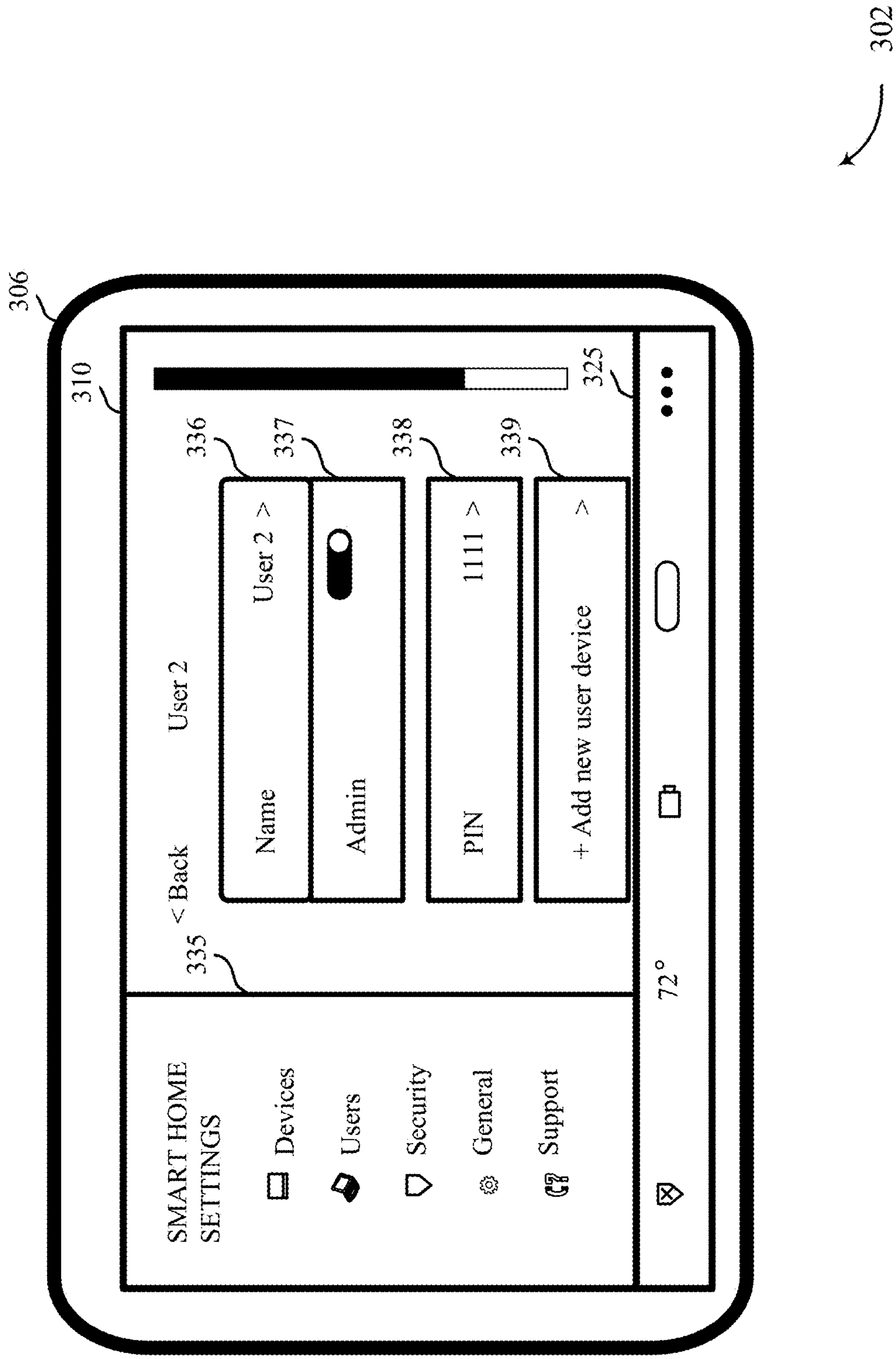

FIG. 3C illustrates an example of a process flow 302 that supports a continuous active mode for security and automation systems in accordance with aspects of the present disclosure. In some examples, the process flow 302 may be implemented by a control panel 306. The control panel 306 may be the control panel 120 described with reference to FIG. 1. The control panel 306 may also be the control panel 220 described with reference to FIGS. 2A and 2B. In some examples, the process flow 302 may illustrate registering a user device using the control panel 306.

The process flow 302 may illustrate an example of accessing settings associated with a user (e.g., a 'User 2') registered with the system 100. For example, based on a user input selecting the visual element 332 (e.g., 'User 2') with reference to FIG. 3B, the control panel 306 may display visual elements for accessing modifiable profile information and user settings associated with the 'User 2.' In some aspects, the control panel 306 may display a visual element 336 (e.g., Name, for example, 'User 2'), a visual element 337 (e.g., 'Admin', for administrative privileges), and a visual element 338 (e.g., a PIN for the 'User 2'). In some examples, the control panel 306 may display a visual element 339 (e.g., 'Add new user device') for registering a user device (e.g., a local computing device 115 or 215, a remote computing device 130) with the system 100.

Figure 3D:
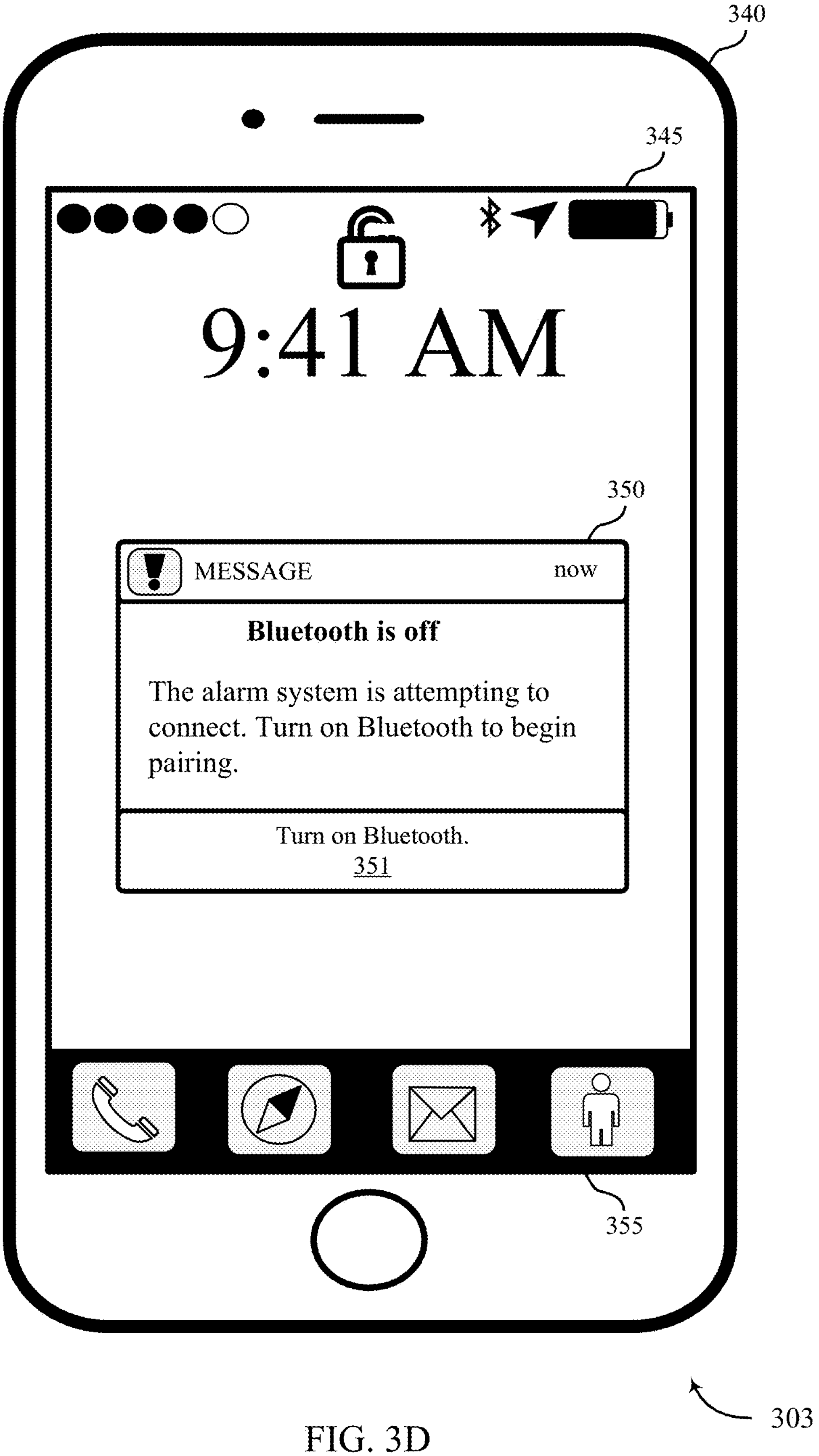
Figure 3E:
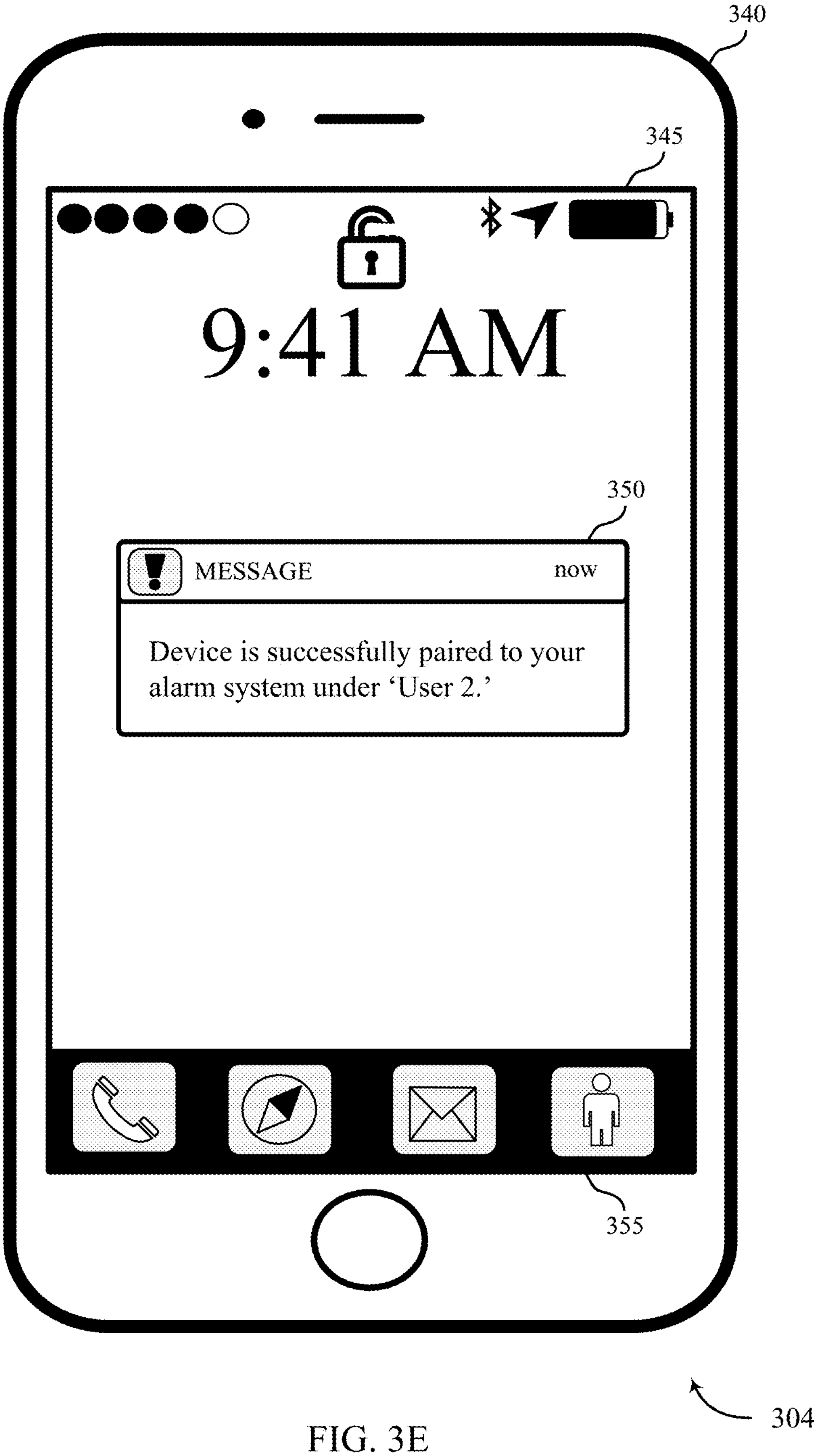

FIGS. 3D and 3E illustrates an example of process flows 303 and 304 that support a continuous active mode for security and automation systems in accordance with aspects of the present disclosure. In some examples, the process flows 303 and 304 may be implemented by a control panel 306. The control panel 306 may be the control panel 120 described with reference to FIG. 1. The control panel 306 may also be the control panel 220 described with reference to FIGS. 2A and 2B. In some examples, the process flows 303 and 304 may illustrate registering a user device using the control panel 306.

The process flows 303 and 304 may illustrate an example of registering the user device with the system 100 (e.g., the smart home 245). The user device may be a smartphone 340. In an example, based on a user input selecting the visual element 339 (e.g., 'Add new user device') with reference to FIG. 3C, the control panel 306 may register the smartphone 340 with the system 100. In some aspects, the control panel 306 may connect (e.g., communicate) to the smartphone 340 via Bluetooth communications. In the example 303, Bluetooth is currently turned off at the smartphone 340, and the control panel 306 may transmit a notification (e.g., via Wi-Fi, cellular) to the smartphone 340 indicating that the system 100 is attempting to connect (e.g. pair) with the smartphone 340. The notification may include the text, "The alarm system is attempting to connect. Turn on Bluetooth to begin pairing."

The smartphone 340 may include a user interface 345. The user interface 345 may be a touch screen that may display one or more graphics, and recognize a touch input from a user, stylus, or the like. The smartphone 340 may receive and display the notification message via dialogue window 350 on the user interface 345. In some aspects, the smartphone 340 may output the notification message (e.g., as an audio notification message) via a speaker of the smartphone 340.

The smartphone 340 may display a virtual button 351 (also referred to as a digital button or a display button of the smartphone 340) for responding to the notification message and for turning on (e.g., enabling) Bluetooth communications for the smartphone 340. The virtual button 351 may include the text, "Turn on Bluetooth." Based on a user input selecting the virtual button 351, the control panel 306 may complete registration (e.g., pairing) with the smartphone 340. For example, as illustrated with reference to FIG. 3D, the smartphone 340 may display a notification message including the text, "Device is successfully paired to your alarm system under 'User 2.'"

Figure 3F:
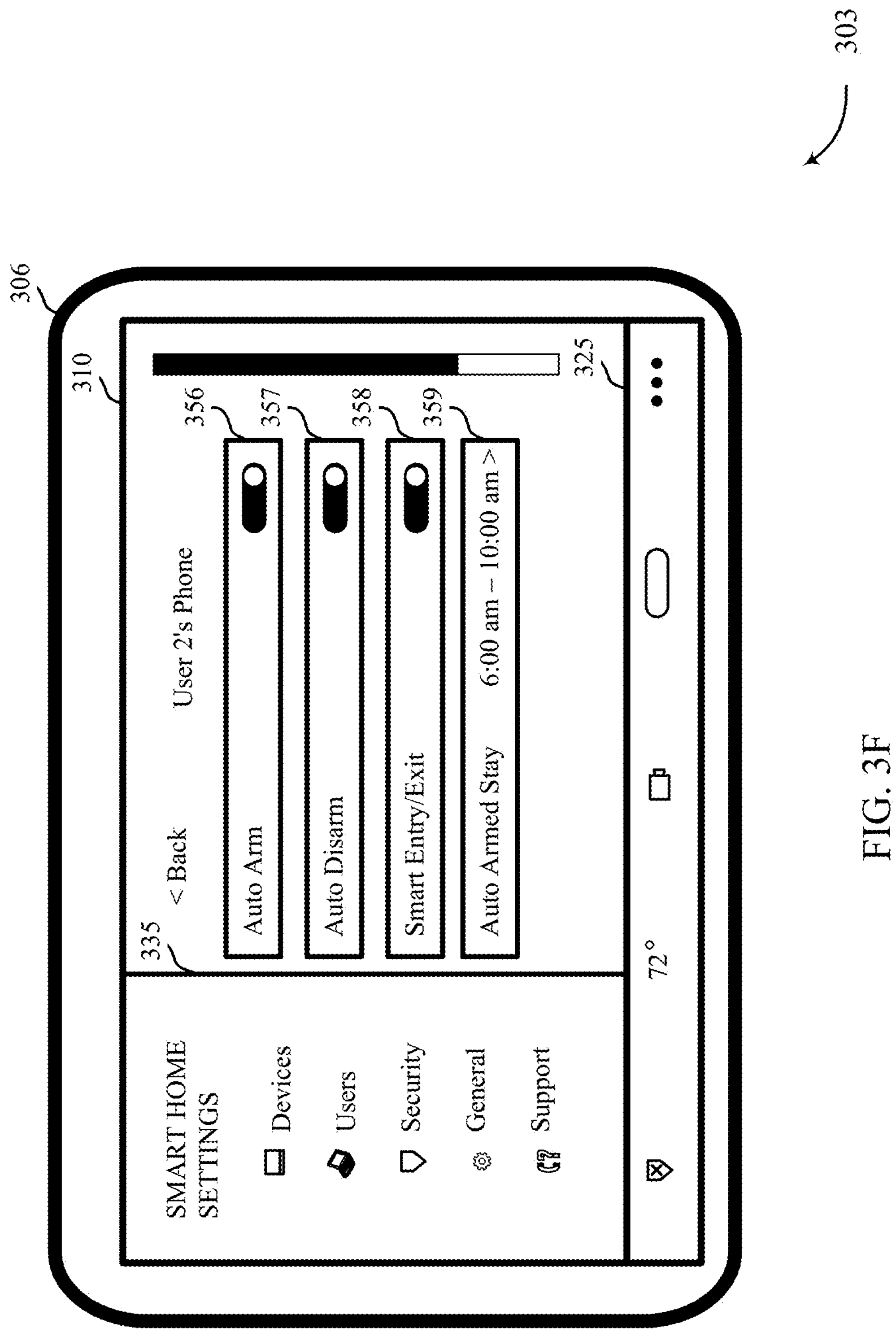

FIG. 3F illustrates an example of a process flow 305 that supports a continuous active mode for security and automation systems in accordance with aspects of the present disclosure. In some examples, the process flow 305 may be implemented by a control panel 306. The control panel 306 may be the control panel 120 described with reference to FIG. 1. The control panel 306 may also be the control panel 220 described with reference to FIGS. 2A and 2B. In some examples, the process flow 305 may illustrate registering a user device using the control panel 306.

The process flow 305 may illustrate an example of accessing settings associated with the user device (e.g., the smartphone 340) registered with the system 100. For example, based on the completion of the registration (e.g., pairing) of the control panel 306 and the smartphone 340, the control panel 306 may display visual elements 356 through 359 for accessing modifiable security settings associated with the smartphone 340 of the 'User 2.' In some aspects, the control panel 306 may display the visual element 356 (e.g., 'Auto Arm'), the visual element 357 (e.g., 'Auto Disarm'), and the visual element 358 (e.g., 'Smart Entry/Exit'). Based on user inputs selecting the visual elements 356 through 358, the control panel 306 may enable or disable features for automatically arming the system 100, automatically arming the system 100, or providing smart entry/exit of the system 100 by the smartphone 340. Based on user inputs selecting the visual element 359, the control panel 306 may set a temporal period associated with automatically setting the system 100 to 'armed stay' by the smartphone 340.

The operations described herein with reference to FIGS. 3A through 3F may be performed in a different order than the example order described, or the operations may be performed in different orders or at different times. Some operations may also be omitted, and other operations may be added.

Figure 4A:
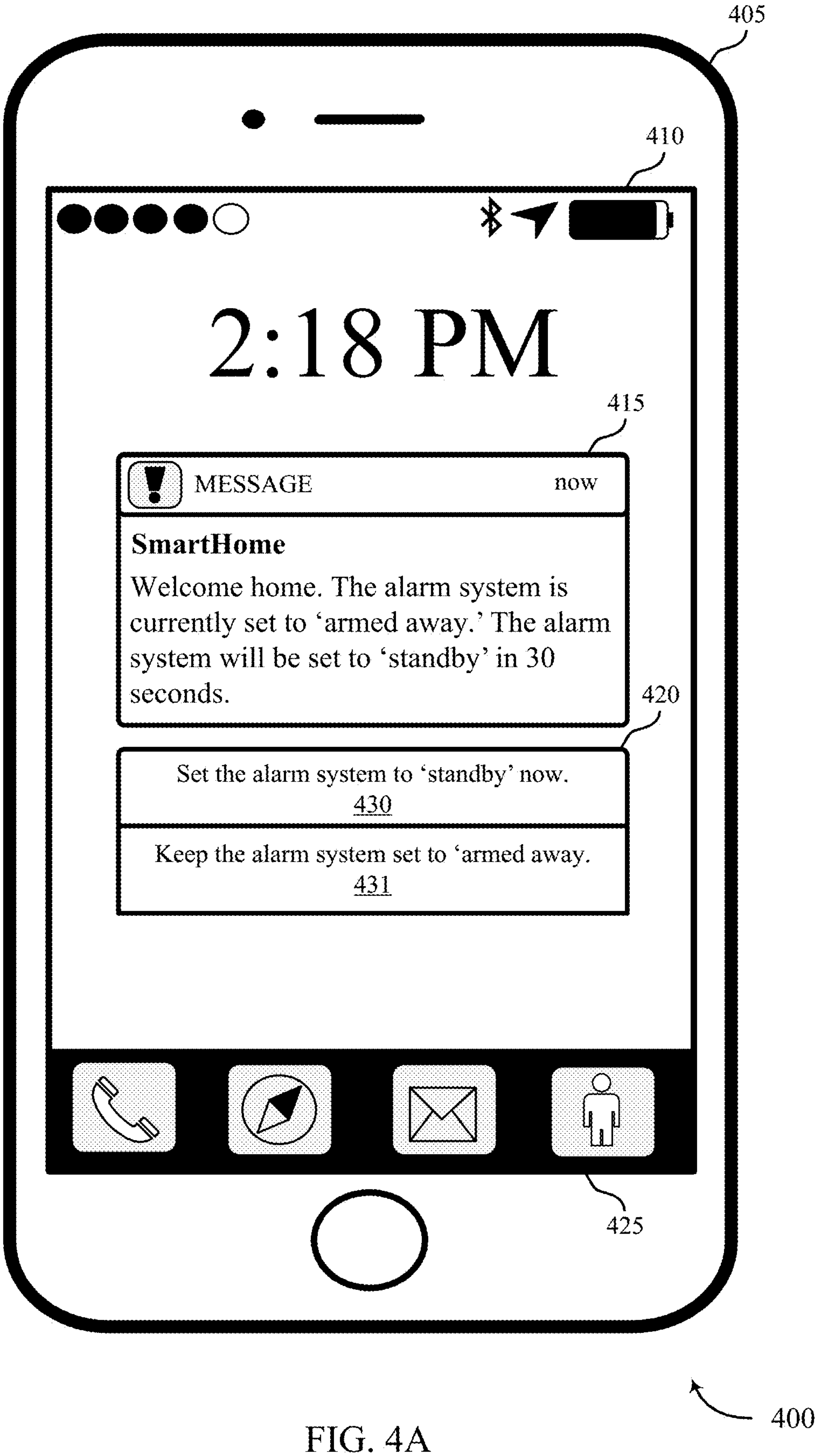
FIGS. 4A and 4B illustrate examples of a wireless device that supports a continuous active mode for security and automation systems in accordance with aspects of the present disclosure.
Figure 4B:
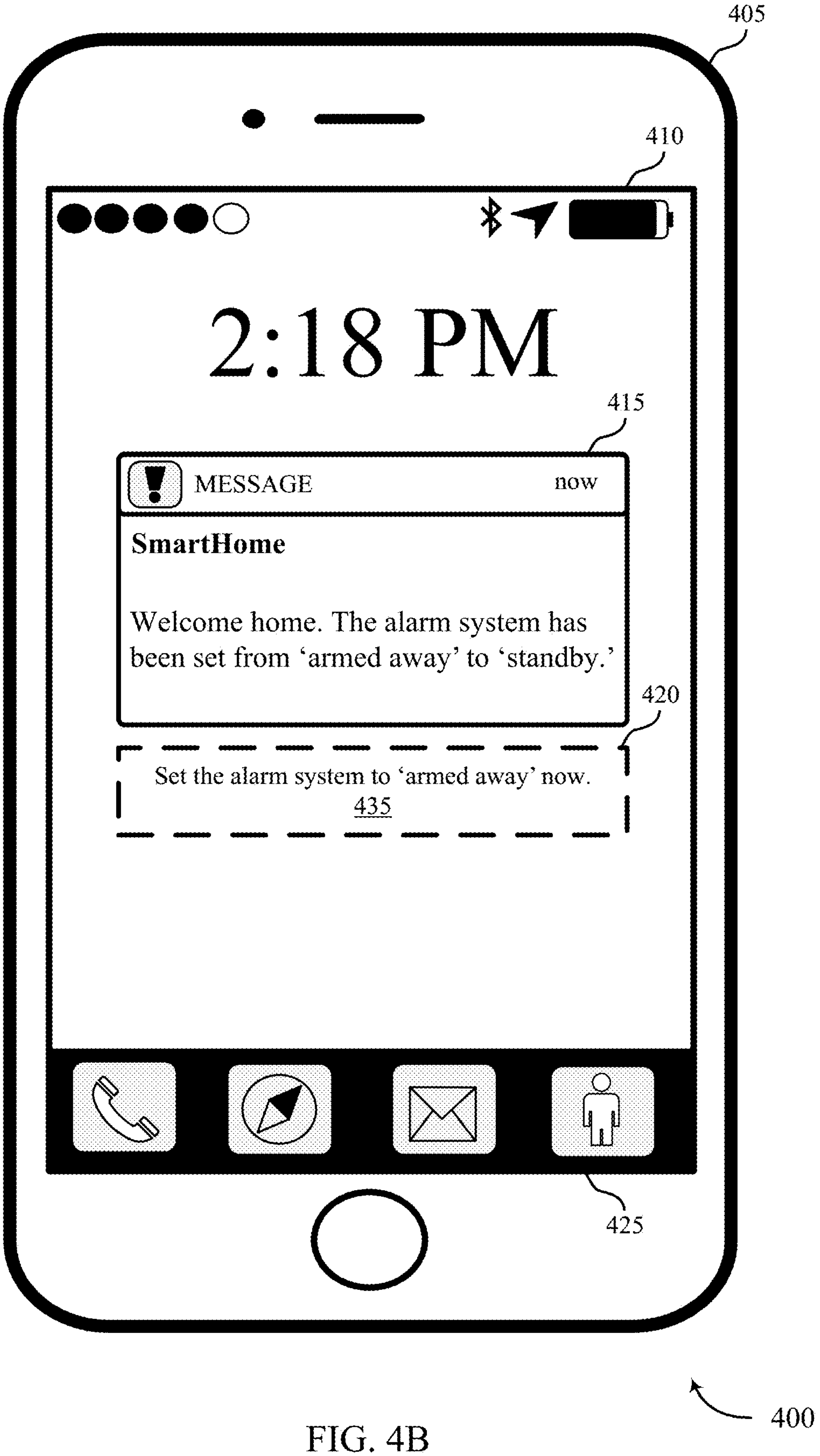

FIGS. 4A and 4B illustrate example of a wireless device 400 that supports a continuous active mode for security and automation systems in accordance with aspects of the present disclosure. The wireless device 400 may be a smartphone 405. The wireless device 400 may be the control panel 120, the local computing device 115, or the remote computing device 130 described with reference to FIG. 1. The wireless device 400 may be the control panel 220 or the local computing device 215 as described with reference to FIGS. 2A and 2B. The wireless device 400 may be the control panel 306 or the smartphone 340 as described with reference to FIGS. 3A through 3F.

The smartphone 405 may include a user interface 410. The user interface 410 may be a touch screen that may display one or more graphics, and recognize a touch input from a user, stylus, or the like. The smartphone 405 may include one or more physical buttons. The user interface 410 may display a home screen including a number of visual elements associated with the user interface 410. For example, a visual element may include a signal strength indicator for wireless communications, a time, and a battery status indicator. The user interface 410 may include a menu bar 425.

The control panel 120 (e.g., the control panel 220) may transmit a notification message to the smartphone 405. The notification message may be, for example, a request message to confirm changing the state of the system 100 (e.g., the automated change of the state by the control panel 120). The smartphone 405 may receive and display the notification message via dialogue window 415 on the user interface 410. In some aspects, the smartphone 405 may output the notification message (e.g., as an audio notification message) via a speaker of the smartphone 405.

In some aspects, the notification message may be preprogrammed with the control panel 120. That is, the control panel 120 may be preconfigured with a number of pre-generated messages that may be communicated or broadcasted (e.g., from the control panel 120). The notification message may provide personnel with a pre-generated notification message associated with the smart home 245. The individual may respond to the notification message (e.g., confirm or reject a change of state of the system 100 indicated in a request message) by entering a user input (e.g., a touch input via the user interface 410, a voice input via a microphone of the smartphone 405). In some cases, the user interface 410 may be configured to recognize any number of different types of inputs. In some aspects, the dialogue window 415 may be a modal dialog window that may require the user associated with the smartphone 405 to respond to the notification message before enabling or reenabling other features (e.g., applications, messaging, audio or video communications) of the smartphone 405.

In an example with reference to FIG. 4A, the system 100 may be in an 'armed away' state, and the control panel 120 (e.g., the control panel 220) may determine that a user arrives at the smart home 245 (e.g., returns home from shopping). The control panel 120 may change the state of the system 100 from 'armed away' to 'standby' based on collected information (e.g., collected user information and collected sensor information) as described herein. The control panel 120 may transmit a request message to the smartphone 405 to confirm changing the state of the system 100 (e.g., the automated change of the state by the control panel 120). The smartphone 405 may receive and display the request message via dialogue window 415 on the user interface 410.

In an example, the request message may include the text, "Welcome home. The alarm system is currently set to 'armed away.' The alarm system will be set to 'standby' in 30 seconds." The smartphone 405 may display virtual buttons 430 and 431 (e.g., via an input window 420) for responding to the request message. The virtual button 430 (also referred to as a digital button or a display button of the smartphone 405) may include the text, "Set the alarm system to 'standby' now." The virtual button 431 may include the text, "Keep the alarm system set to 'armed away.'"

The control panel 120 (e.g., the control panel 220) may change or maintain the state of the system 100 based on the user input. For example, the control panel 120 may change the state of the system 100 to 'standby' based on a user input confirming the change (e.g., a user input selecting the virtual button 430). The control panel 120 may automatically change the state of the system 100 to 'standby' based on an absence of receiving a user input (e.g., a user selection of the virtual button 430 or the virtual button 431) within a temporal period. The control panel 120 may maintain the system 100 in the 'armed away' state based on a user input rejecting the change (e.g., a user input selecting the virtual button 431).

The control panel 120 (e.g., the control panel 220) may adaptively modify (e.g., train) a user model for the user, for example, based on the user input confirming or rejecting request message for changing the state of the system 100 to 'standby'. For example, based on the user input confirming the change (e.g., a user input selecting the virtual button 430), the control panel 120 may automatically change the state of the system 100 (e.g., set the system 100 to 'standby') based on the user model. For example, for future instances when the user arrives at the smart home 245 (e.g., returns home from shopping) and the system 100 is in the 'armed away' state, the control panel 120 may automatically change the state of the system 100 (e.g., set the system 100 to 'standby').

In an example with reference to FIG. 4B, the system 100 may be in an 'armed away' state, and the control panel 120 (e.g., the control panel 220) may determine that a user arrives at the smart home 245 (e.g., returns home from shopping). The control panel 120 may automatically change the state of the system 100 from 'armed away' to 'standby' based on the collected information (e.g., collected user information and collected sensor information) as described herein and the user model. The control panel 120 may transmit a notification message to the smartphone 405 indicating the automated change of the state of the system 100. The smartphone 405 may receive and display the notification message via dialogue window 415 on the user interface 410. The notification message may include the text, "Welcome home. The alarm system has been set from 'armed away' to 'standby.'"

In some examples, the smartphone 405 may display the notification message without providing a user option for rejecting (e.g., overriding) the automated change. In some other examples, the smartphone 405 may display a virtual button 435 for rejecting the automated change. The virtual button 430 may include the text, "Set the alarm system to 'armed away' now." The control panel 120 (e.g., the control panel 220) may further adaptively modify (e.g., train) the user model for the user, for example, based on whether the user rejects the automated change.

Figure 5A:
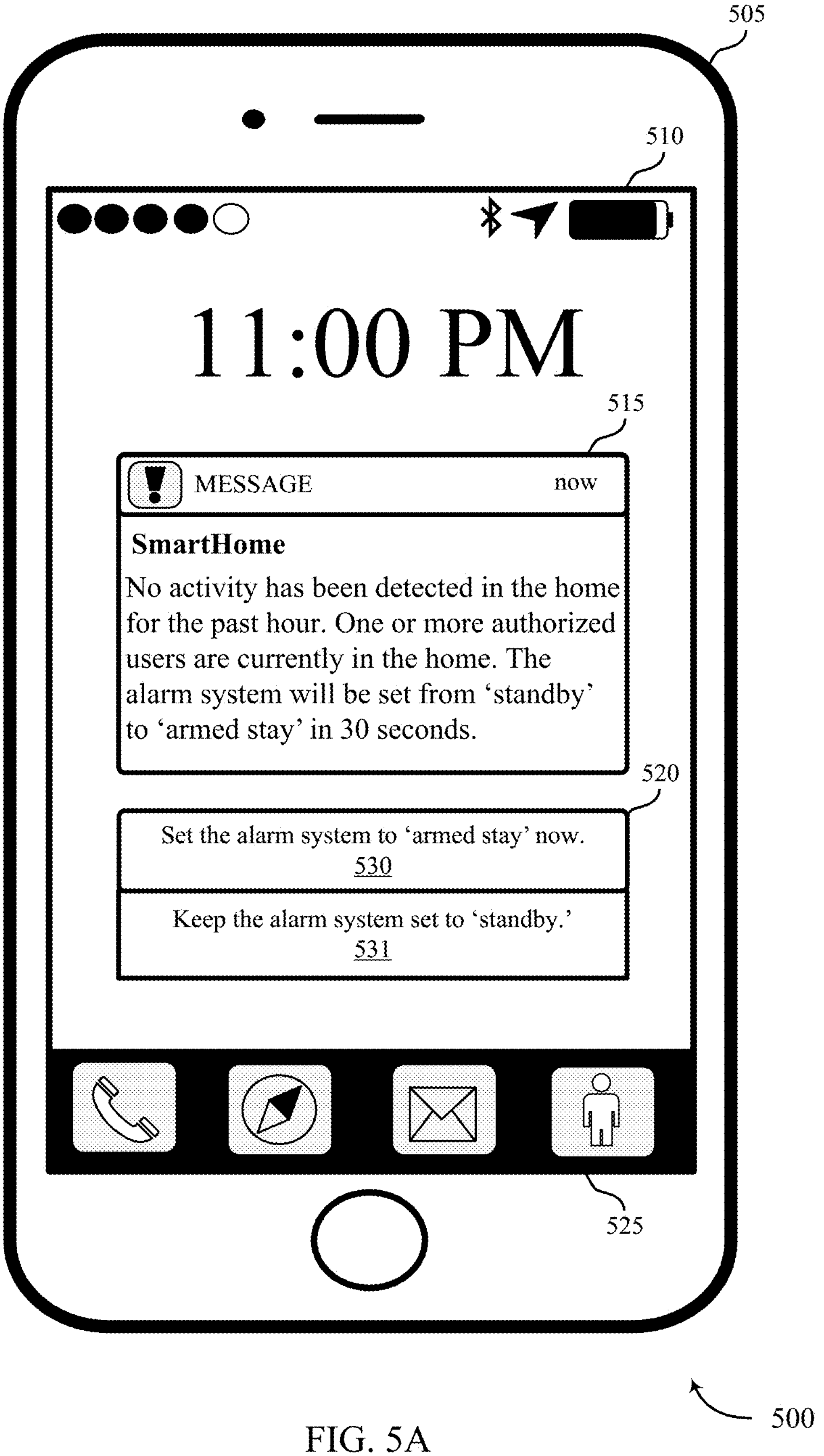
FIGS. 5A and 5B illustrate examples of a wireless device that supports a continuous active mode for security and automation systems in accordance with aspects of the present disclosure.
Figure 5B:
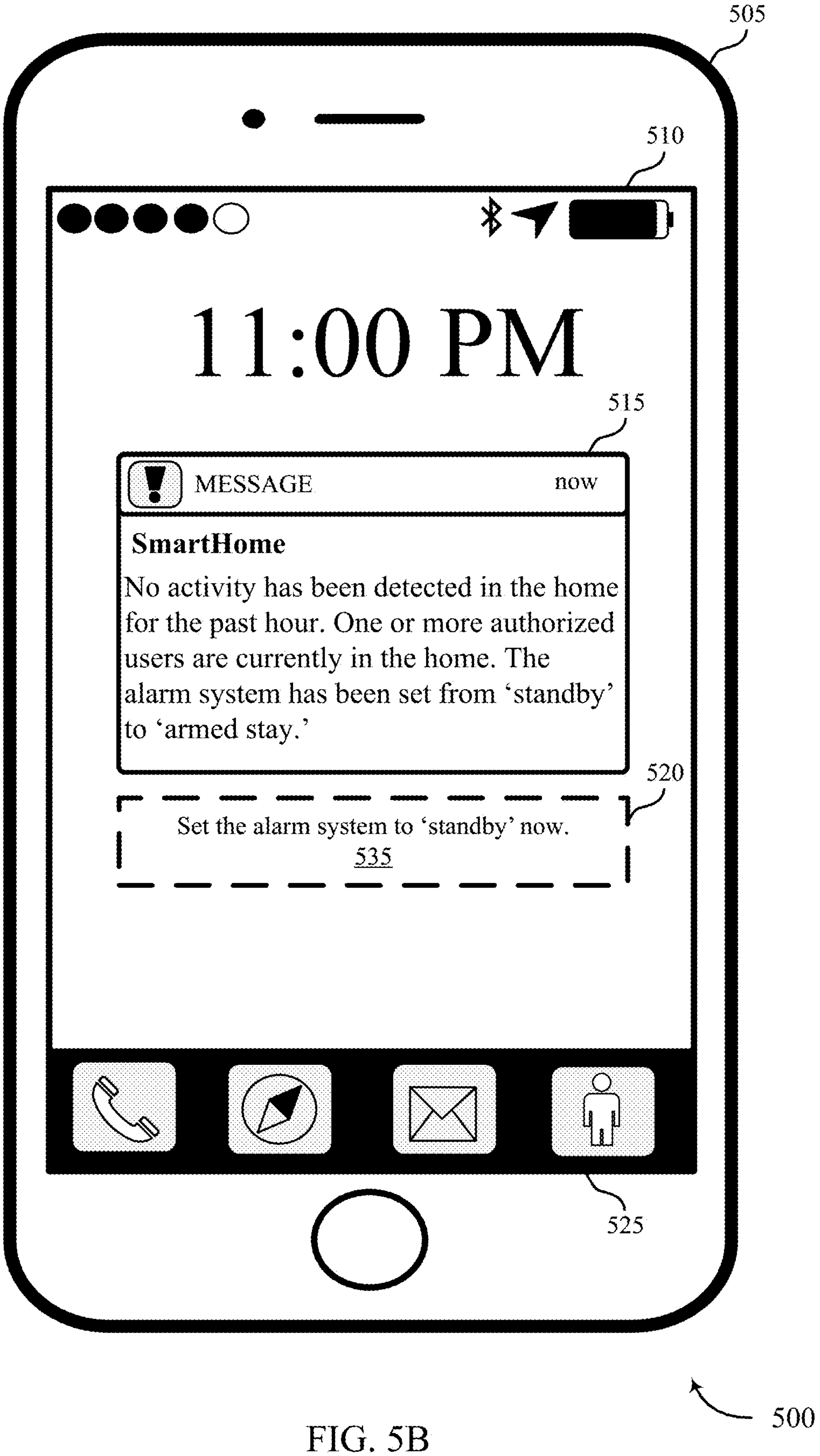

FIGS. 5A and 5B illustrate examples of a wireless device 500 that supports a continuous active mode for security and automation systems in accordance with aspects of the present disclosure. The wireless device 500 may be a smartphone 505. The wireless device 500 may be the control panel 120, the local computing device 115, or the remote computing device 130 described with reference to FIG. 1. The wireless device 500 may be the control panel 220 or the local computing device 215 as described with reference to FIGS. 2A and 2B. The wireless device 500 may be the control panel 306 or the smartphone 340 as described with reference to FIGS. 3A through 3F. The wireless device 500 may be the smartphone 405 as described with reference to FIGS. 4A and 4B.

The smartphone 505 may include a user interface 510, a dialogue window 515, an input window 520, and a menu bar 525. The wireless device 500, the user interface 510, the dialogue window 515, the input window 520, and the menu bar 525 may implement aspects of the wireless device 400, the user interface 410, the dialogue window 415, the input window 420, and the menu bar 425 described with reference to FIGS. 4A and 4B.

In an example with reference to FIG. 5A, the system 100 may be in a 'standby' state, and the control panel 120 (e.g., the control panel 220) may determine that a user at the smart home 245 is in bed and sleeping. The control panel 120 may change the state of the system 100 from 'standby' to 'armed stay' based on collected information (e.g., collected user information and collected sensor information) as described herein. The control panel 120 may transmit a request message to the smartphone 505 to confirm changing the state of the system 100 (e.g., the automated change of the state by the control panel 120). The smartphone 505 may receive and display the request message via the dialogue window 515 on the user interface 510.

In an example, the request message may include the text, "No activity has been detected in the home for the past hour. One or more authorized users are currently in the home. The alarm system will be set from 'standby' to 'armed stay' in 30 seconds." The smartphone 505 may display virtual buttons 530 and 531 (also referred to as a digital button or a display button of the smartphone 505) for responding to the request message. The virtual button 530 may include the text, "Set the alarm system to 'armed stay' now." The virtual button 531 may include the text, "Keep the alarm system set to 'standby.'"

The control panel 120 (e.g., the control panel 220) may change or maintain the state of the system 100 based on the user input. For example, the control panel 120 may change the state of the system 100 to 'armed stay' based on a user input confirming the change (e.g., a user input selecting the virtual button 530). The control panel 120 may automatically change the state of the system 100 to 'armed stay' based on an absence of receiving a user input (e.g., a user selection of the virtual button 530 or the virtual button 531) within a temporal period. The control panel 120 may maintain the system 100 in the 'standby' state based on a user input rejecting the change (e.g., a user input selecting the virtual button 531).

The control panel 120 (e.g., the control panel 220) may adaptively modify (e.g., train) a user model for the user, for example, based on the user input confirming or rejecting request message for changing the state of the system 100 to 'armed stay'. For example, based on the user input confirming the change (e.g., a user input selecting the virtual button 530), the control panel 120 may automatically change the state of the system 100 (e.g., set the system 100 to 'armed stay') based on the user model. For example, for future instances when the user is in bed and sleeping at the smart home 245 and the system 100 is in the 'standby' state, the control panel 120 may automatically change the state of the system 100 (e.g., set the system 100 to 'armed away').

In an example with reference to FIG. 5B, the system 100 may be in a 'standby' state, and the control panel 120 (e.g., the control panel 220) may determine that a user at the smart home 245 is in bed and sleeping. The control panel 120 may automatically change the state of the system 100 from 'standby' to 'armed stay' based on the collected information (e.g., collected user information and collected sensor information) as described herein and the user model. The control panel 120 may transmit a notification message to the smartphone 505 indicating the automated change of the state of the system 100. The smartphone 505 may receive and display the notification message via the dialogue window 515 on the user interface 510. The notification message may include the text, "No activity has been detected in the home for the past hour. One or more authorized users are currently in the home. The alarm system has been set from 'standby' to 'armed stay.'"

In some examples, the smartphone 505 may display the notification message without providing a user option for rejecting (e.g., overriding) the automated change. In some other examples, the smartphone 505 may display a virtual button 535 for rejecting the automated change. The virtual button 530 may include the text, "Set the alarm system to 'standby' now." The control panel 120 (e.g., the control panel 220) may further adaptively modify (e.g., train) the user model for the user, for example, based on whether the user rejects the automated change.

Figure 6A:
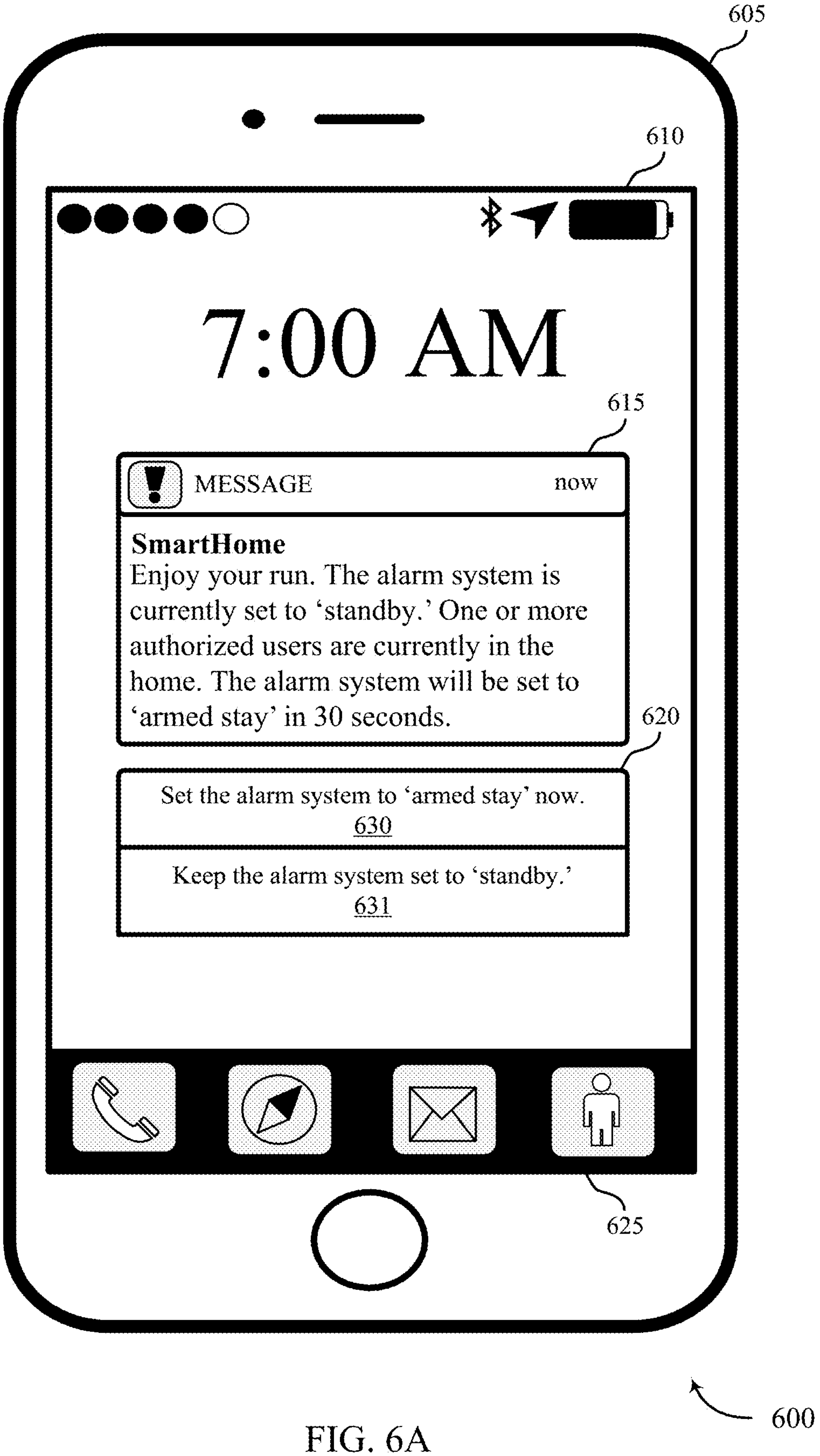
FIGS. 6A and 6B illustrate examples of a wireless device that supports a continuous active mode for security and automation systems in accordance with aspects of the present disclosure.
Figure 6B:
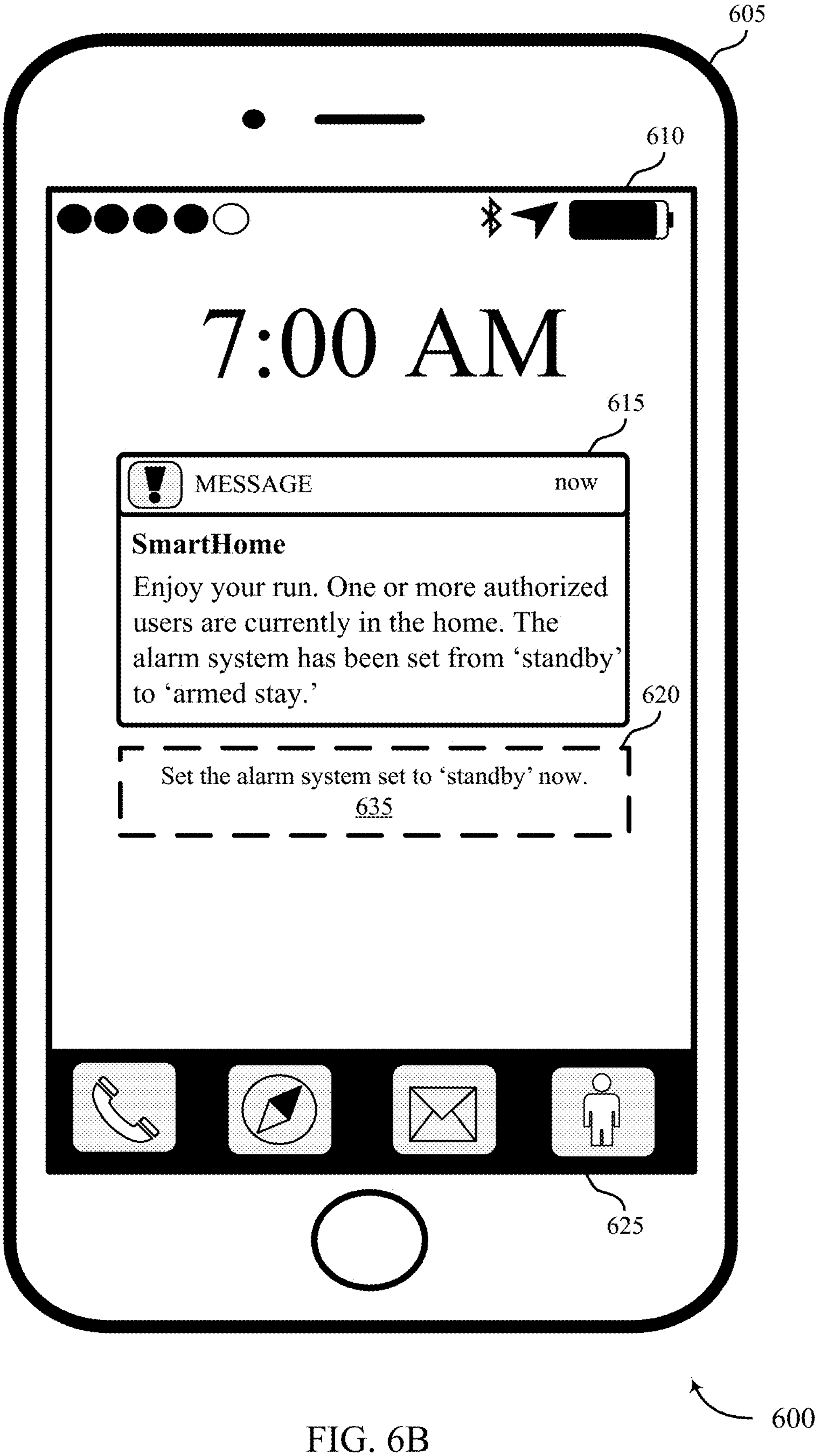

FIGS. 6A and 6B illustrate examples of a wireless device 600 that supports a continuous active mode for security and automation systems in accordance with aspects of the present disclosure. The wireless device 600 may be a smartphone 605. The wireless device 600 may be the control panel 120, the local computing device 115, or the remote computing device 130 described with reference to FIG. 1. The wireless device 600 may be the control panel 220 or the local computing device 215 as described with reference to FIGS. 2A and 2B. The wireless device 600 may be the control panel 306 or the smartphone 340 as described with reference to FIGS. 3A through 3F. The wireless device 600 may be the smartphone 405 as described with reference to FIGS. 4A and 4B. The wireless device 600 may be the smartphone 505 as described with reference to FIGS. 5A and 5B.

The smartphone 605 may include a user interface 610, a dialogue window 615, an input window 620, and a menu bar 625. The wireless device 600, the user interface 610, the dialogue window 615, the input window 620, and the menu bar 625 may implement aspects of the wireless device 400, the user interface 410, the dialogue window 415, the input window 420, and the menu bar 425 described with reference to FIG. 4 and the wireless device 500, the user interface 510, the dialogue window 515, the input window 520, and the menu bar 525 described with reference to FIG. 5.

In an example with reference to FIG. 6A, the system 100 may be in an 'armed stay' state, and the control panel 120 (e.g., the control panel 220) may determine that a user is getting dressed for a morning run. The control panel 120 may change the state of the system 100 from 'armed stay' to 'standby' based on initial collected information (e.g., collected user information and collected sensor information) as described herein. In some aspects, the control panel 120 may change the state of the system 100 from 'armed stay' to 'standby' with or without transmitting a request message to the smartphone 605 to confirm changing the state of the system 100. For example, the control panel 120 may transmit a notification message to the smartphone 605 to indicate changing the state of the system 100. In some examples, the control panel 120 may transmit no notification message to the smartphone 605 to indicate the change.

The control panel 120 may detect the user has exited the smart home 245 (and that additional users are still inside the smart home 245) based on additional collected information (e.g., collected user information and collected sensor information). The control panel 120 may change the state of the system 100 from 'standby' to 'armed stay' based on the additional collected information. The control panel 120 may transmit a request message to the smartphone 605 to confirm changing the state of the system 100 (e.g., the automated change of the state from 'standby' to 'armed stay' by the control panel 120). The smartphone 605 may receive and display the request message via the dialogue window 615 on the user interface 610.

In an example, the request message may include the text, "Enjoy your run. The alarm system is currently set to 'standby.' One or more authorized users are currently in the home. The alarm system will be set to 'armed stay in 30 seconds." The smartphone 605 may display virtual buttons 630 and 631 (also referred to as a digital button or a display button of the smartphone 605) for responding to the request message. The virtual button 630 may include the text, "Set the alarm system to 'armed stay' now." The virtual button 631 may include the text, "Keep the alarm system set to 'standby.'"

The control panel 120 (e.g., the control panel 220) may change or maintain the state of the system 100 based on the user input. For example, the control panel 120 may change the state of the system 100 to 'armed stay' based on a user input confirming the change (e.g., a user input selecting the virtual button 630). The control panel 120 may automatically change the state of the system 100 to 'armed stay' based on an absence of receiving a user input (e.g., a user selection of the virtual button 630 or the virtual button 631) within a temporal period. The control panel 120 may maintain the system 100 in the 'standby' state based on a user input rejecting the change (e.g., a user input selecting the virtual button 631).

The control panel 120 (e.g., the control panel 220) may adaptively modify (e.g., train) a user model for the user, for example, based on the user input confirming or rejecting request message for changing the state of the system 100 to 'armed stay'. For example, based on the user input confirming the change (e.g., a user input selecting the virtual button 630), the control panel 120 may automatically change the state of the system 100 (e.g., set the system 100 to 'armed stay') based on the user model. For example, for future instances when the user exits the smart home 245 for a morning run and the system 100 is in the 'standby' state (e.g., the control panel 120 has automatically changed the state of the system 100 from 'armed stay' to 'standby' based on initial collected information), the control panel 120 may automatically change the state of the system 100 (e.g., set the system 100 to 'armed stay' based on additional collected information and the user model).

In an example with reference to FIG. 6B, the system 100 may be in a 'standby' state, and the control panel 120 (e.g., the control panel 220) may determine that the user has exited the smart home 245 for a morning run (and that additional users are still inside the smart home 245). The control panel 120 may automatically change the state of the system 100 from 'standby' to 'armed stay' based on the collected information (e.g., collected user information and collected sensor information) as described herein and the user model. The control panel 120 may transmit a notification message to the smartphone 605 indicating the automated change of the state of the system 100. The smartphone 605 may receive and display the notification message via the dialogue window 615 on the user interface 610. The notification message may include the text, "Enjoy your run. One or more authorized users are currently in the home. The alarm system has been set from 'standby' to 'armed stay.'"

In some examples, the smartphone 605 may display the notification message without providing a user option for rejecting (e.g., overriding) the automated change. In some other examples, the smartphone 605 may display a virtual button 635 for rejecting the automated change. The virtual button 630 may include the text, "Set the alarm system to 'standby' now." The control panel 120 (e.g., the control panel 220) may further adaptively modify (e.g., train) the user model for the user, for example, based on whether the user rejects the automated change.

Figure 7:
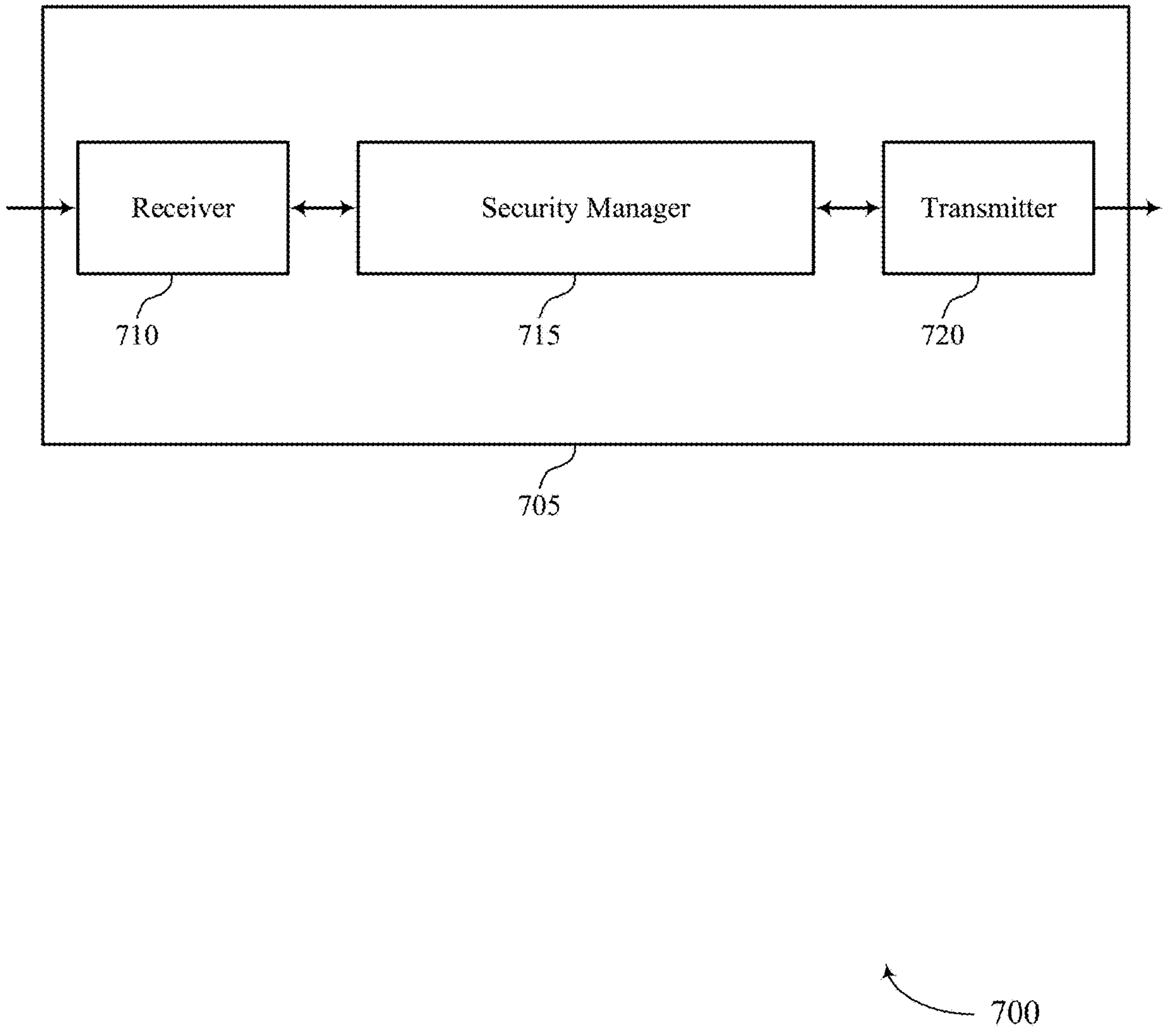
FIGS. 7 and 8 show block diagrams of devices that support a continuous active mode for security and automation systems in accordance with aspects of the present disclosure.

FIG. 7 shows a block diagram 700 of a device 705 that supports a continuous active mode for security and automation systems in accordance with aspects of the present disclosure. The device 705 may be an example of aspects of a control panel 120, a control panel 220, a local computing device 115, a local computing device 215, or a server 140 as described herein. The device 705 may include a receiver 710, a security manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to a continuous active mode for security and automation systems continuous active mode for security and automation systems, etc.). Information may be passed on to other components of the device 705. The receiver 710 may be an example of aspects of a transceiver. The receiver 710 may utilize a single antenna or a set of antennas.

The security manager 715 and/or at least some of its various sub-components may be implemented in hardware, software executed by a processor, firmware, or any combination thereof. If implemented in software executed by a processor, the functions of the security manager 715 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The security manager 715 may collect user information associated with one or more users of the security and automation system or sensor information from one or more sensors of the security and automation system, or both, generate a set of data points based on the collecting, determine a pattern associated with the set of data points using a learning network, and change a state of the security and automation system based on the determining. The security manager 715 may be an example of aspects of the security manager 1015 described herein.

The security manager 715, or its sub-components, may be implemented in hardware, code (e.g., software or firmware) executed by a processor, or any combination thereof. If implemented in code executed by a processor, the functions of the security manager 715, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The security manager 715, or its sub-components, may be physically located at various positions, including being distributed such that portions of functions are implemented at different physical locations by one or more physical components. In some examples, the security manager 715, or its sub-components, may be a separate and distinct component in accordance with various aspects of the present disclosure. In some examples, the security manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of a transceiver. The transmitter 720 may utilize a single antenna or a set of antennas.

Figure 8:
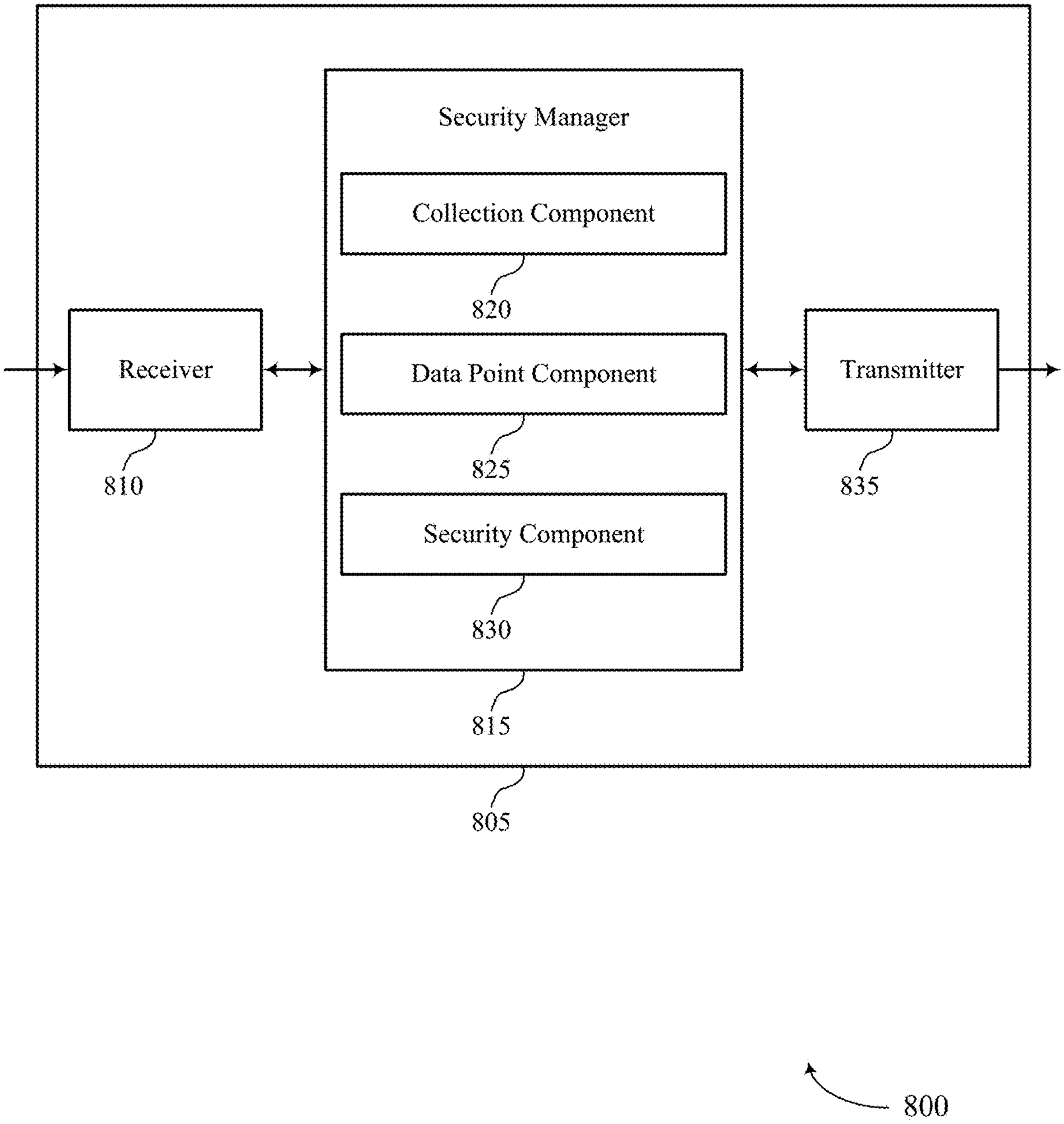

FIG. 8 shows a block diagram 800 of a device 805 that supports a continuous active mode for security and automation systems in accordance with aspects of the present disclosure. The device 805 may be an example of aspects of a device 705 or a control panel 120, a control panel 220, a local computing device 115, a local computing device 215, or a server 140 as described herein. The device 805 may include a receiver 810, a security manager 815, and a transmitter 835. The device 805 may also include a processor. Each of these components may be in communication with one another (e.g., via one or more buses).

The receiver 810 may receive information such as packets, user data, or control information associated with various information channels (e.g., control channels, data channels, and information related to a continuous active mode for security and automation systems continuous active mode for security and automation systems, etc.). Information may be passed on to other components of the device 805. The receiver 810 may be an example of aspects of a transceiver. The receiver 810 may utilize a single antenna or a set of antennas.

The security manager 815 may be an example of aspects of the security manager 715 as described herein. The security manager 815 may include a collection component 820, a data point component 825, and a security component 830. The security manager 815 may be an example of aspects of the security manager 1015 described herein.

The collection component 820 may collect user information associated with one or more users of the security and automation system or sensor information from one or more sensors of the security and automation system, or both. The data point component 825 may generate a set of data points based on the collecting and determine a pattern associated with the set of data points using a learning network. The security component 830 may change a state of the security and automation system based on the determining.

The transmitter 835 may transmit signals generated by other components of the device 805. In some examples, the transmitter 835 may be collocated with a receiver 810 in a transceiver. For example, the transmitter 835 may be an example of aspects of a transceiver. The transmitter 835 may utilize a single antenna or a set of antennas.

Figure 9:
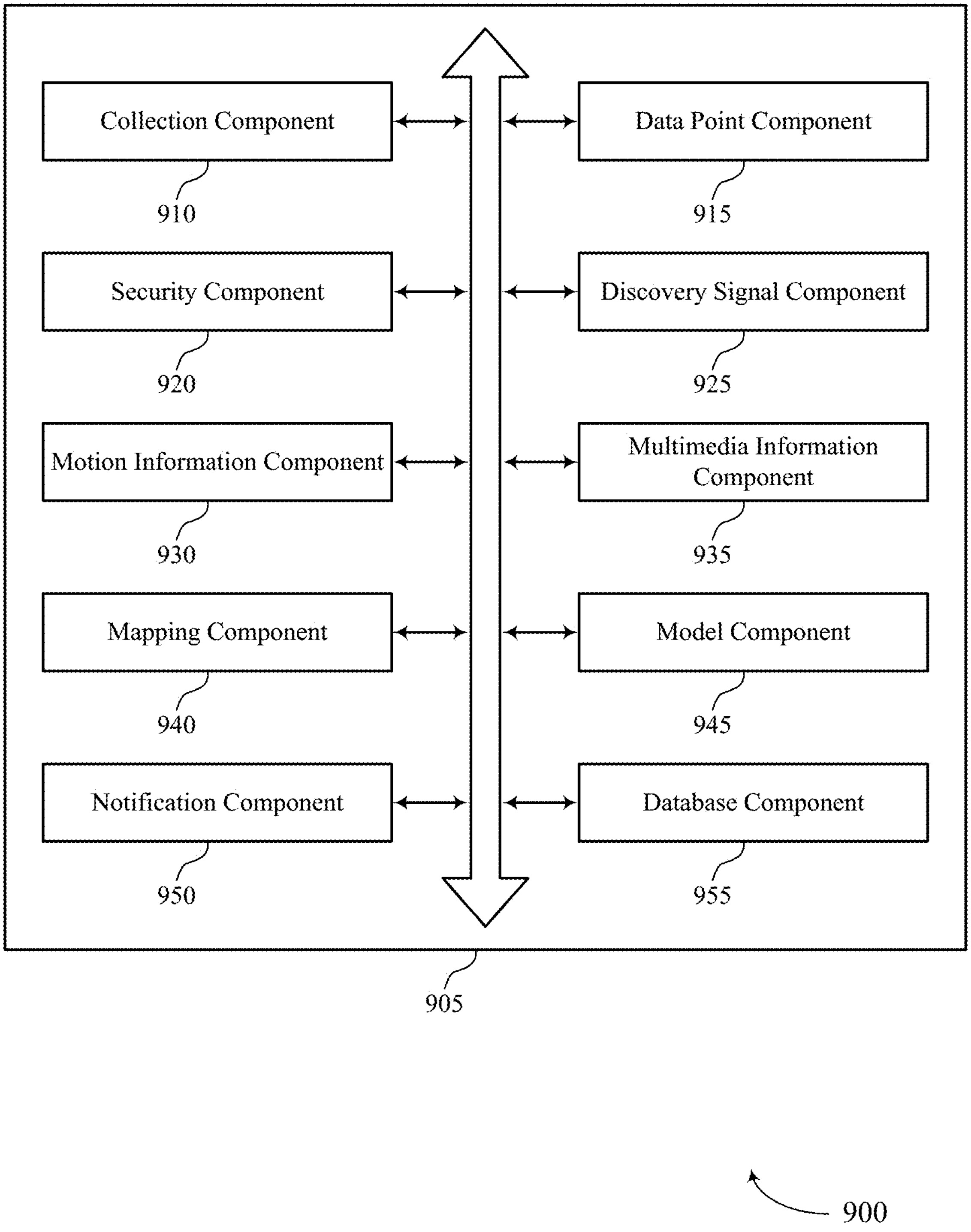
FIG. 9 shows a block diagram of a security manager that supports a continuous active mode for security and automation systems in accordance with aspects of the present disclosure.

FIG. 9 shows a block diagram 900 of a security manager 905 that supports a continuous active mode for security and automation systems in accordance with aspects of the present disclosure. The security manager 905 may be an example of aspects of a security manager 715, a security manager 815, or a security manager 1015 described herein. The security manager 905 may include a collection component 910, a data point component 915, a security component 920, a discovery signal component 925, a motion information component 930, a multimedia information component 935, a mapping component 940, a model component 945, a notification component 950, and a database component 955. Each of these components may communicate, directly or indirectly, with one another (e.g., via one or more buses).

The collection component 910 may collect user information associated with one or more users of the security and automation system or sensor information from one or more sensors of the security and automation system, or both. In some examples, the collection component 910 may determine one or more of occupancy information or user profile information based on the one or more discovery signals. In some examples, the collection component 910 may receive device information from the one or more user devices associated with the security and automation system, the device information including a state of the one or more user devices, a device identifier associated with each device of the one or more user devices, or both. In some examples, the collection component 910 may determine one or more of the occupancy information or the user profile information is based on the device information.

In some examples, the sensor information includes the motion information sensed by the one or more sensors of the security and automation system. In some examples, the sensor information includes the multimedia information sensed by the one or more sensors of the security and automation system, and the multimedia information includes audio or video, or both. In some cases, the one or more discovery signals includes a Bluetooth signal, a cellular signal, a Wi-Fi signal, or a GPS signal, a RF signal, a radar signal, an acoustic signal, an infrared signal, or a fluid sensing signal, or any combination thereof.

The data point component 915 may generate a set of data points based on the collecting. In some examples, the data point component 915 may determine a pattern associated with the set of data points using a learning network. In some examples, the data point component 915 may compare the set of data points to an additional set of data points associated with previous collected user information associated with the one or more users of the security and automation system or previous collected sensor information from the one or more sensors of the security and automation system, or both. In some examples, the data point component 915 may determine a pattern associated with the additional set of data points using the learning network. The data point component 915 may compare the pattern associated with the set of data points and the pattern associated with the additional set of data points. In some examples, the data point component 915 may track one or more of the set of data points or the pattern associated with the set of data points using the learning network over one or more temporal periods. In some examples, the data point component 915 may determine a change in one or more of the set of data points or the pattern associated with the set of data points over the one or more temporal periods based on the tracking.

The security component 920 may change a state of the security and automation system based on the determining. In some examples, the security component 920 may change the state of the security and automation system is based on the comparing. In some examples, the security component 920 may change the state of the security and automation system is based on the tracking. In some examples, the security component 920 may change the state of the security and automation system is based on the change in one or more of the set of data points or the pattern associated with the set of data points over the one or more temporal periods. In some examples, the security component 920 may change the state of the security and automation system is based on the user model. In some examples, the security component 920 may change the state of the security and automation system is based on the outputting.

In some examples, the security component 920 may automatically change the state of the security and automation system based on an absence of receiving a response message within a temporal period. In some examples, the security component 920 may arm the security and automation system or disarming the security and automation system. In some examples, the security component 920 may authenticate the one or more users of the security and automation system based on the database. In some aspects, the database includes a user directory. In some examples, the security component 920 may change the state of the security and automation system based on the authenticating.

The discovery signal component 925 may receive one or more discovery signals from one or more user devices associated with the security and automation system. The motion information component 930 may receive motion information from the one or more sensors of the security and automation system, the one or more sensors including one or more of a RF motion sensor, an infrared motion sensor, a radar motion sensor, an audio recognition sensor, or an ultrasonic sensor, or any combination thereof. The multimedia information component 935 may receive multimedia information from the one or more sensors of the security and automation system. The mapping component 940 may map, using the learning network, the user information associated with one or more users of the security and automation system to the sensor information from the one or more sensors of the security and automation system.

The model component 945 may generate, using the learning network, a user model associated with a user of the one more users of the security and automation system based on the mapping, the user model including a representation of user activity and user occupancy related to a premises associated with the security and automation system. In some examples, the model component 945 may adaptively modify the user model based on one or more of an additional set of data points associated with additional collected user information, a user input from the user associated with the user model, or both. In some examples, the model component 945 may modify the user model based on an additional set of data points associated with additional collected user information associated with the one or more users of the security and automation system or additional collected sensor information from the one or more sensors of the security and automation system, or both. In some aspects, the model component 945 may change the state of the security and automation system based on the modified user model. In some examples, the model component 945 may receive an input from the user associated with the user model. In some examples, the model component 945 may modify the user model based on the received input from the user. In some aspects, the model component 945 may change the state of the security and automation system is based on the modified user model.

The notification component 950 may output a representation including one or more of an indication of changing the state of the security and automation system or a request message to confirm changing the state of the security and automation system. The database component 955 may manage a database including the set of data points associated with the user information associated with one or more users of the security and automation system or the sensor information from one or more sensors of the security and automation system, or both. In some examples, the database component 955 may manage in the database the pattern associated with the set of data points.

Figure 10:
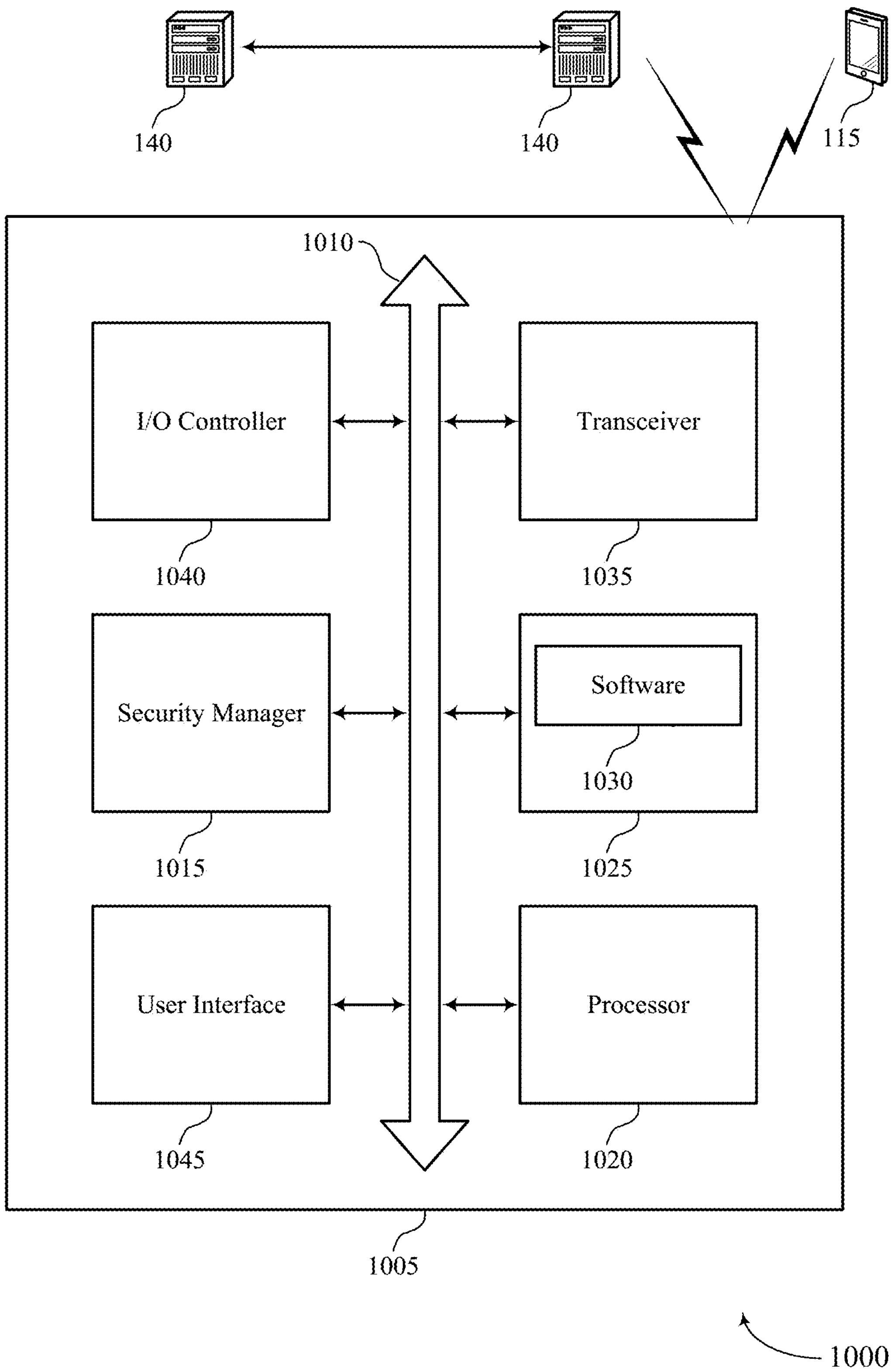
FIG. 10 shows a diagram of a system including a device that supports a continuous active mode for security and automation systems in accordance with aspects of the present disclosure.

FIG. 10 shows a diagram of a system 1000 including a device 1005 that supports a continuous active mode for security and automation systems in accordance with aspects of the present disclosure. The device 1005 may be an example of or include the components of device 705, device 805, or a control panel 120, a control panel 220, a local computing device 115, a local computing device 215, or a server 140 as described herein with reference to FIGS. 1, 2A, 2B, 7, and 8. The device 1005 may include components for bi-directional voice and data communications including components for transmitting and receiving communications, including a security manager 1015, a processor 1020, a memory 1025, a software 1030, a transceiver 1035, an I/O controller 1040, and a user interface 1045. These components may be in electronic communication via one or more buses (e.g., bus 1010).

In some cases, the device 1005 may communicate with a remote computing device 130, and/or a remote server (e.g., a server 155). For example, one or more elements of the device 1005 may provide a direct connection to the server 155 via a direct network link to the Internet via a POP (point of presence). In some cases, one element of the device 1005 (e.g., one or more antennas, transceivers, etc.) may provide a connection using wireless techniques, including digital cellular telephone connection, cellular digital packet data (CDPD) connection, digital satellite data connection, and/or another connection.

Many other devices and/or subsystems may be connected to one or may be included as one or more elements of the system 1000 (e.g., entertainment system, computing device, remote cameras, wireless key fob, wall mounted user interface device, cell radio module, battery, alarm siren, door lock, lighting system, thermostat, home appliance monitor, utility equipment monitor, and so on). In some cases, all of the elements shown in FIG. 10 need not be present to practice the present systems and methods. The devices and subsystems may also be interconnected in different ways from that shown in FIG. 10. In some cases, an aspect of the operations of the system 1000 may be readily known in the art and are not discussed in detail in this disclosure.

The signals associated with the system 1000 may include wireless communication signals such as radio frequency, electromagnetics, LAN, WAN, virtual private network (VPN), wireless network (using 802.11, for example), 345 MHz, Z-WAVE®, cellular network (using 3G and/or Long Term Evolution (LTE), for example), and/or other signals. The radio access technology (RAT) of the system 1000 may be related to, but are not limited to, WWAN (GSM, CDMA, and WCDMA), wireless local area network (WLAN) (including user equipment (UE) BLUETOOTH® and Wi-Fi), WMAN (WiMAX), antennas for mobile communications, antennas for Wireless Personal Area Network (WPAN) applications (including RFID and UWB). In some cases, one or more sensors (e.g., motion, proximity, smoke, light, glass break, door, window, carbon monoxide, and/or another sensor) may connect to some element of the system 1000 via a network using the one or more wired and/or wireless connections.

The processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1020 may be configured to operate a memory array using a memory controller. In other cases, a memory controller may be integrated into the processor 1020. The processor 1020 may be configured to execute computer-readable instructions stored in a memory to perform various functions (e.g., functions or tasks supporting smart sensing techniques).

The memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware or software operation such as the interaction with peripheral components or devices.

The software 1030 may include code to implement aspects of the present disclosure, including code to support smart sensing techniques. The software 1030 may be stored in a non-transitory computer-readable medium such as system memory or other memory. In some cases, the software 1030 may not be directly executable by the processor but may cause a computer (e.g., when compiled and executed) to perform functions described herein.

The transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

The I/O controller 1040 may manage input and output signals for the device 1005. I/O controller 1040 may also manage peripherals not integrated into the device 1005. In some cases, the I/O controller 1040 may represent a physical connection or port to an external peripheral. In some cases, the I/O controller 1040 may utilize an operating system such as iOS®, ANDROID®, MS-DOS®, MS-WINDOWS®, OS/2®, UNIX®, LINUX®, or another known operating system. In other cases, the I/O controller 1040 may represent or interact with a modem, a keyboard, a mouse, a touchscreen, or a similar device. In some cases, the I/O controller 1040 may be implemented as part of a processor. In some cases, a user may interact with the device 1005 via the I/O controller 1040 or via hardware components controlled by the I/O controller 1040.

The user interface 1045 may enable a user to interact with device 1005. In some cases, the user interface 1045 may include an audio device, such as an external speaker system, an external display device such as a display screen, or an input device (e.g., remote control device interfaced with the user interface 1045 directly or through the I/O controller 1040).

Figure 11:
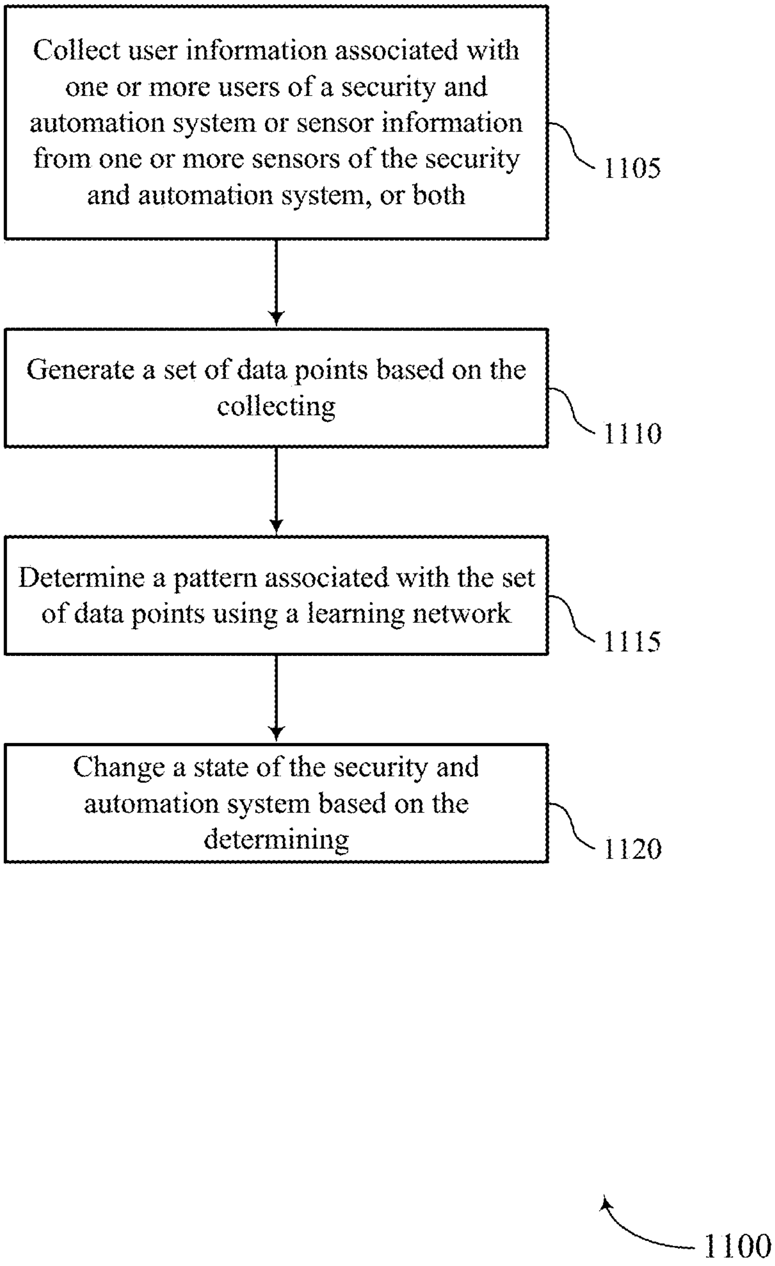
FIGS. 11 through 13 show flowcharts illustrating methods that support a continuous active mode for security and automation systems in accordance with aspects of the present disclosure.

FIG. 11 shows a flowchart illustrating a method 1100 that supports a continuous active mode for security and automation systems in accordance with aspects of the present disclosure. The operations of method 1100 may be implemented by a control panel 120 or its components as described herein. For example, the operations of method 1100 may be performed by a security manager as described with reference to FIGS. 7 through 10. In some examples, a control panel 120 may execute a set of instructions to control the functional elements of the control panel 120 to perform the functions described below. Additionally or alternatively, a control panel 120 may perform aspects of the functions described below using special-purpose hardware.

At 1105, the control panel 120 may collect user information associated with one or more users of a security and automation system or sensor information from one or more sensors of the security and automation system, or both. The operations of 1105 may be performed according to the methods described herein. In some examples, aspects of the operations of 1105 may be performed by a collection component as described with reference to FIGS. 7 through 10.

At 1110, the control panel 120 may generate a set of data points based on the collecting. The operations of 1110 may be performed according to the methods described herein. In some examples, aspects of the operations of 1110 may be performed by a data point component as described with reference to FIGS. 7 through 10.

At 1115, the control panel 120 may determine a pattern associated with the set of data points using a learning network. The operations of 1115 may be performed according to the methods described herein. In some examples, aspects of the operations of 1115 may be performed by a data point component as described with reference to FIGS. 7 through 10.

At 1120, the control panel 120 may change a state of the security and automation system based on the determining. The operations of 1120 may be performed according to the methods described herein. In some examples, aspects of the operations of 1120 may be performed by a security component as described with reference to FIGS. 7 through 10.

Figure 12:
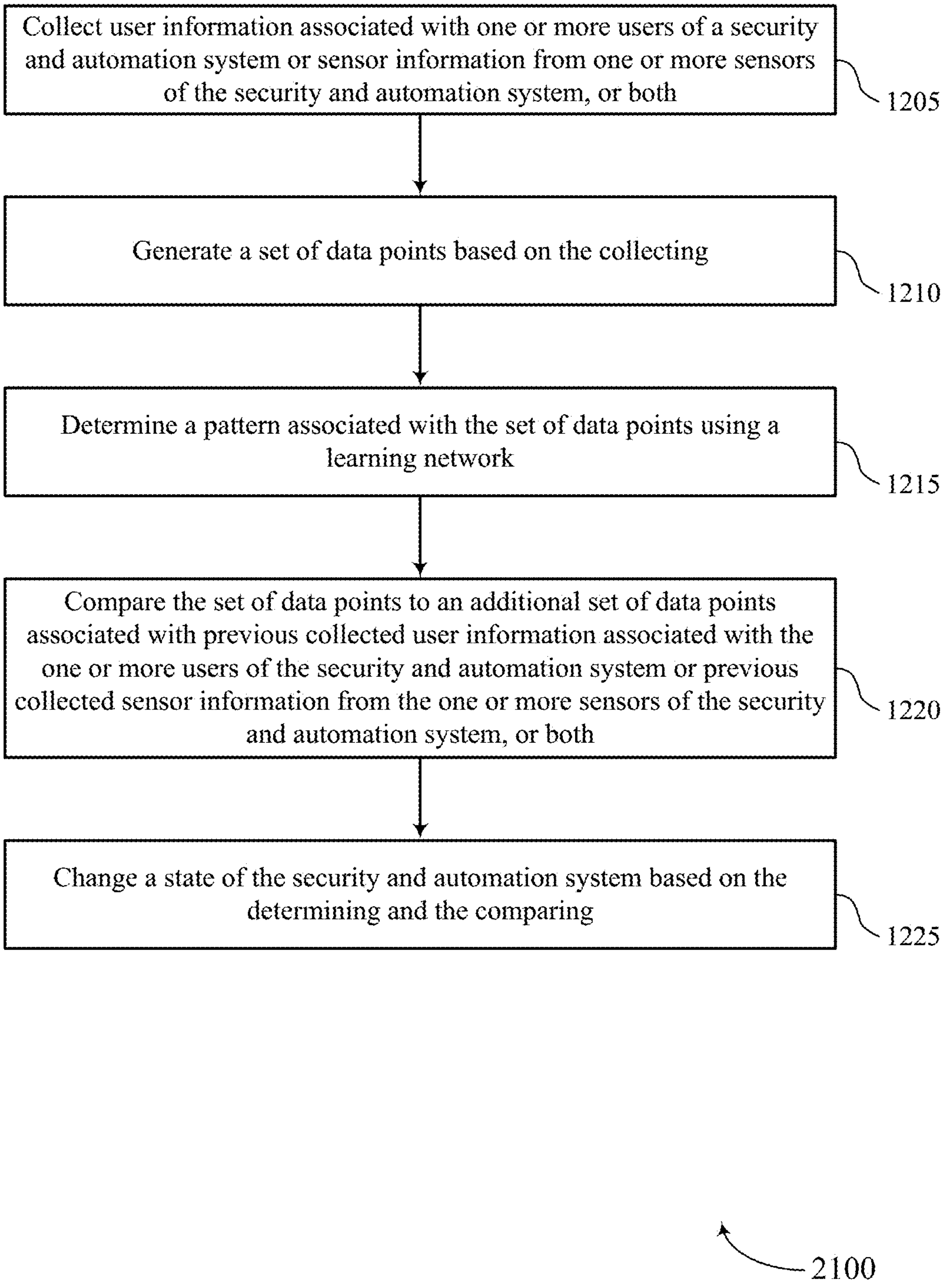

FIG. 12 shows a flowchart illustrating a method 1200 that supports a continuous active mode for security and automation systems in accordance with aspects of the present disclosure. The operations of method 1200 may be implemented by a control panel 120 or its components as described herein. For example, the operations of method 1200 may be performed by a security manager as described with reference to FIGS. 7 through 10. In some examples, a control panel 120 may execute a set of instructions to control the functional elements of the control panel 120 to perform the functions described below. Additionally or alternatively, a control panel 120 may perform aspects of the functions described below using special-purpose hardware.

At 1205, the control panel 120 may collect user information associated with one or more users of a security and automation system or sensor information from one or more sensors of the security and automation system, or both. The operations of 1205 may be performed according to the methods described herein. In some examples, aspects of the operations of 1205 may be performed by a collection component as described with reference to FIGS. 7 through 10.

At 1210, the control panel 120 may generate a set of data points based on the collecting. The operations of 1210 may be performed according to the methods described herein. In some examples, aspects of the operations of 1210 may be performed by a data point component as described with reference to FIGS. 7 through 10.

At 1215, the control panel 120 may determine a pattern associated with the set of data points using a learning network. The operations of 1215 may be performed according to the methods described herein. In some examples, aspects of the operations of 1215 may be performed by a data point component as described with reference to FIGS. 7 through 10.

At 1220, the control panel 120 may compare the set of data points to an additional set of data points associated with previous collected user information associated with the one or more users of the security and automation system or previous collected sensor information from the one or more sensors of the security and automation system, or both. The operations of 1220 may be performed according to the methods described herein. In some examples, aspects of the operations of 1220 may be performed by a data point component as described with reference to FIGS. 7 through 10.

At 1225, the control panel 120 may change a state of the security and automation system based on the determining and the comparing. The operations of 1225 may be performed according to the methods described herein. In some examples, aspects of the operations of 1225 may be performed by a security component as described with reference to FIGS. 7 through 10.

Figure 13:
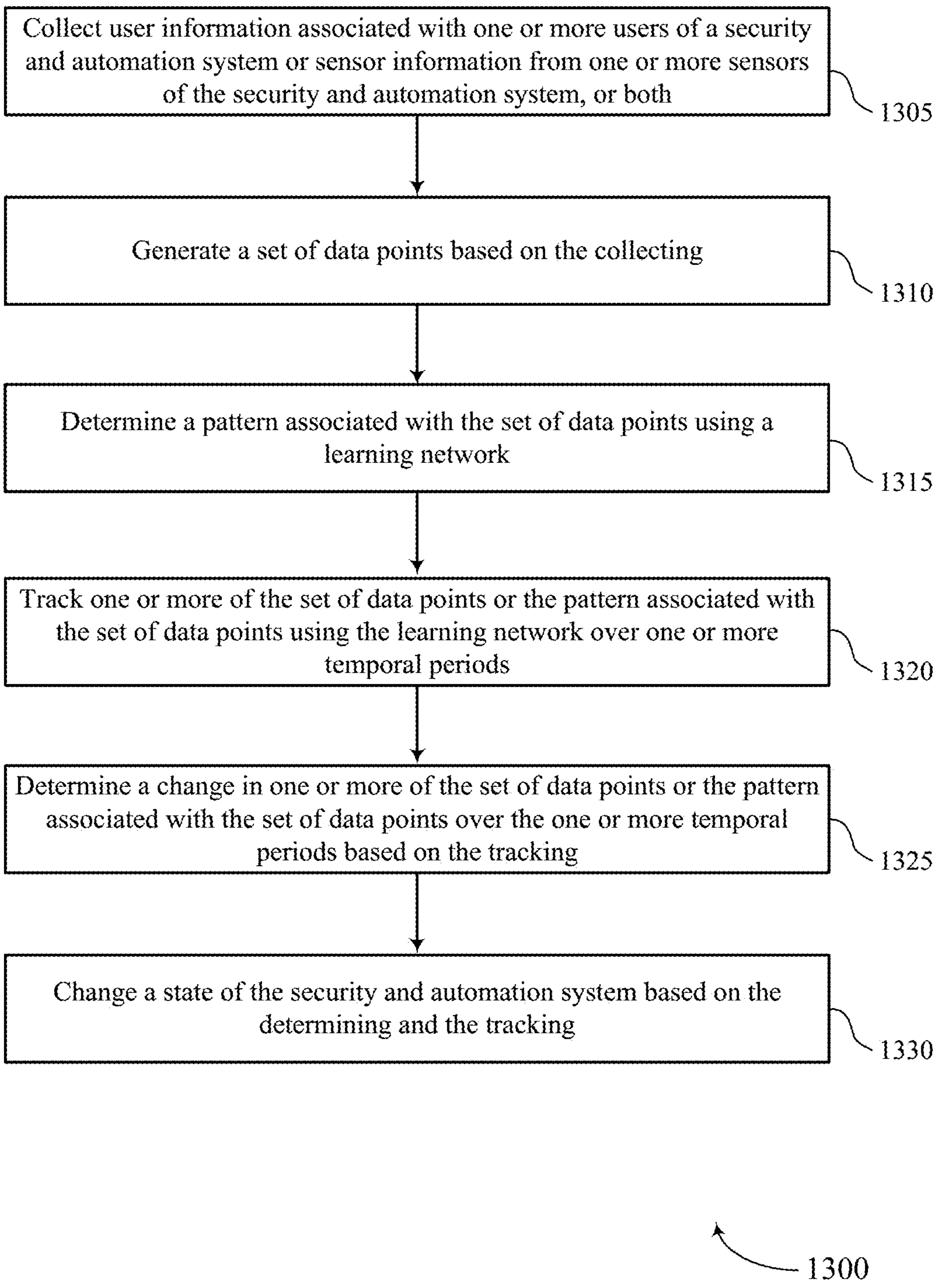

FIG. 13 shows a flowchart illustrating a method 1300 that supports a continuous active mode for security and automation systems in accordance with aspects of the present disclosure. The operations of method 1300 may be implemented by a control panel 120 or its components as described herein. For example, the operations of method 1300 may be performed by a security manager as described with reference to FIGS. 7 through 10. In some examples, a control panel 120 may execute a set of instructions to control the functional elements of the control panel 120 to perform the functions described below. Additionally or alternatively, a control panel 120 may perform aspects of the functions described below using special-purpose hardware.

At 1305, the control panel 120 may collect user information associated with one or more users of a security and automation system or sensor information from one or more sensors of the security and automation system, or both. The operations of 1305 may be performed according to the methods described herein. In some examples, aspects of the operations of 1305 may be performed by a collection component as described with reference to FIGS. 7 through 10.

At 1310, the control panel 120 may generate a set of data points based on the collecting. The operations of 1310 may be performed according to the methods described herein. In some examples, aspects of the operations of 1310 may be performed by a data point component as described with reference to FIGS. 7 through 10.

At 1315, the control panel 120 may determine a pattern associated with the set of data points using a learning network. The operations of 1315 may be performed according to the methods described herein. In some examples, aspects of the operations of 1315 may be performed by a data point component as described with reference to FIGS. 7 through 10.

At 1320, the control panel 120 may track one or more of the set of data points or the pattern associated with the set of data points using the learning network over one or more temporal periods. The operations of 1320 may be performed according to the methods described herein. In some examples, aspects of the operations of 1320 may be performed by a data point component as described with reference to FIGS. 7 through 10.

At 1325, the control panel 120 may determine a change in one or more of the set of data points or the pattern associated with the set of data points over the one or more temporal periods based on the tracking. The operations of 1325 may be performed according to the methods described herein. In some examples, aspects of the operations of 1325 may be performed by a data point component as described with reference to FIGS. 7 through 10.

At 1330, the control panel 120 may change a state of the security and automation system based on the determining and the tracking. In some aspects, the control panel 120 may change the state of the security and automation system based on the change in one or more of the set of data points or the pattern associated with the set of data points over the one or more temporal periods. The operations of 1330 may be performed according to the methods described herein. In some examples, aspects of the operations of 1330 may be performed by a security component as described with reference to FIGS. 7 through 10.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration. An operating system utilized by the processor (or by I/O controller module or another module described above) may be iOS®, ANDROID®, MS-DOS®, MS-WINDOWS®, OS/2®, UNIX®, LINUX®, or another known operating system.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to automation system applications. In some cases, the concepts, the technical descriptions, the features, the methods, the ideas, and/or the descriptions may specifically apply to security and/or automation system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various cases have been described and/or illustrated here in the context of fully functional computing systems, one or more of these exemplary cases may be distributed as a program product in a variety of forms, regardless of the particular type of computer-readable media used to actually carry out the distribution. The cases disclosed herein may also be implemented using software modules that perform certain tasks. These software modules may include script, batch, or other executable files that may be stored on a computer-readable storage medium or in a computing system. In some cases, these software modules may permit and/or instruct a computing system to perform one or more of the exemplary cases disclosed here.

This description, for purposes of explanation, has been described with reference to specific cases. The illustrative discussions above, however, are not intended to be exhaustive or limit the present systems and methods to the precise forms discussed. Many modifications and variations are possible in view of the above teachings. The cases were chosen and described in order to explain the principles of the present systems and methods and their practical applications, to enable others skilled in the art to utilize the present systems, apparatus, and methods and various cases with various modifications as may be suited to the particular use contemplated.

What is claimed is:

1. A system comprising:

one or more sensors to capture sensor data of an environment;

one or more processors configured to execute instructions to perform operations to cause the system to:

collect, using the one or more sensor devices, information associated with a user of the environment;

determine, according to the information associated with the user, a pattern of activity of the user in the environment;

set the system to an armed state, based at least in part on the pattern of occupancy of the user;

detect, using the one or more sensor devices, an individual at the environment;

determine that the detected individual is the user and that the user is authorized to be in the environment, based at least in part on the pattern of occupancy of the user in the environment; and suppress an alarm of the system based on the determination that the detected person is the user and that the user is authorized to be in the environment, wherein the alarm is suppressed so that the authorized user may enter and exit the premises while the system is in the armed state, without triggering the alarm.

2. The system of claim 1, wherein, to determine the pattern associated with the user, the one or more processors are configured to execute instructions to perform operations to cause the system to:

generate a data point based at least in part on the information associated with the user; and compare the data point to a previously collected data point associated with the user.

3. The system of claim 1, wherein, to determine the pattern, the one or more processors are configured to execute instructions to perform operations to cause the system to determine the pattern utilizing a learning network.

4. The system of claim 1, wherein, to collect the information associated with the user, the one or more processors are configured to execute instructions to perform operations to cause the system to:

receive one or more discovery signals; and determine one or more of occupancy information and user profile information based at least in part on the one or more discovery signals.

5. The system of claim 4, wherein the one or more discovery signals comprises one or more of a Bluetooth signal, a cellular signal, a Wi-Fi signal, a global positioning system (GPS) signal, a radio frequency (RF) signal, a radar signal, an acoustic signal, an infrared signal, and a fluid sensing signal.

6. The system of claim 4, wherein, to collect the information associated with the user, the one or more processors are configured to execute instructions to perform operations to cause the system further to:

receive device information from one or more user devices, the device information comprising a state of the one or more user devices, a device identifier associated with each device of the one or more user devices, or both, wherein determining one or more of the occupancy information and the user profile information is based at least in part on the device information.

7. The system of claim 1, wherein the one or more processors are configured to execute instructions to perform operations to cause the system further to:

set the system to a second state, based at least in part on the pattern associated with the user.

8. The system of claim 7, wherein the armed state is one of an armed away state or an armed stay state and the second state is the other of the armed away state or the armed stay state.

9. The system of claim 7, wherein the second state is one of an armed away state, an armed stay state, or a standby state.

10. The system of claim 1, wherein the one or more sensor devices comprises one or more of a radio frequency (RF) motion sensor, an infrared motion sensor, a radar motion sensor, an audio recognition sensor, and an ultrasonic sensor, wherein the information associated with the user comprises the motion information sensed by the one or more sensors of the security and automation system.

11. The system of claim 1, wherein the one or more sensor devices comprises an image capture sensor, and wherein the information associated with the user comprises image data.

12. The system of claim 1, wherein the one or more processors are configured to execute instructions to perform operations to cause the system further to:

track the pattern using a learning network over one or more temporal periods, wherein setting the security and automation system to the armed state is based at least in part on the tracking.

13. The system of claim 12, wherein the one or more processors are configured to execute instructions to perform operations to cause the system further to:

determine a change in the pattern over the one or more temporal periods based at least in part on the tracking, wherein setting the security and automation system to the armed state is based at least in part on the change in the pattern over the one or more temporal periods.

14. The system of claim 1, wherein, to collect the information associated with the user, the one or more processors are configured to execute instructions to perform operations to cause the system further to:

map, using a learning network, user information associated with the user to the sensor information from the one or more sensors of the security and automation system; and generate, using the learning network, a user model associated with the user based at least in part on the mapping, the user model comprising a representation of user activity and user occupancy related to the environment associated with the security and automation system, wherein setting the system to the armed state is based at least in part on the user model.

15. The system of claim 14, wherein the one or more processors are configured to execute instructions to perform operations to cause the system further to:

adaptively modify the user model based at least in part on one or more of additional collected user information, a user input from the user associated with the user model, or both.

16. The system of claim 14, wherein the one or more processors are configured to execute instructions to perform operations to cause the system further to:

modify the user model based at least in part on additional collected user information associated with the user or additional collected sensor information from the one or more sensors of the security and automation system, or both, wherein setting the security and automation system to the first state of the plurality of states is based at least in part on the modified user model.

17. The system of claim 14, wherein the one or more processors are configured to execute instructions to perform operations to cause the system further to:

receive an input from the user associated with the user model; and modify the user model based at least in part on the received input from the user, wherein setting the security and automation system to the armed state is based at least in part on the modified user model.

18. The system of claim 1, wherein the one or more processors are configured to execute instructions to perform operations to cause the system further to:

output a representation comprising one or more of an indication of changing a state of the security and automation system or a request message to confirm changing the state of the security and automation system.

19. The system of claim 18, wherein the one or more processors are configured to execute instructions to perform operations to cause the system further to:

automatically set the security and automation system to the armed state based at least in part on an absence of receiving a response message within a temporal period.

20. A method comprising:

collecting, using one or more sensor devices, information associated with a user of the environment;

determining, according to the information associated with the user, a pattern of occupancy of the user in the environment;

setting the system to a first state, based at least in part on the pattern associated with the user;

detecting, using the one or more sensor devices, an individual at the environment;

determining that the detected individual is the user and is authorized to be in the environment, based at least in part on the pattern associated with the user; and setting the system to a second state to suppress an alarm of the system, based on the determination that the detected individual is the user, wherein the second state is to suppress the alarm to allow the user to be in the environment while the system is in the second state, without triggering the alarm.

* * * * *